(12) United States Patent
Leichsenring et al.

(10) Patent No.: US 8,165,458 B2
(45) Date of Patent: Apr. 24, 2012

(54) PLAYBACK DEVICE, PLAYBACK METHOD, PLAYBACK PROGRAM, AND INTEGRATED CIRCUIT

(75) Inventors: Germano Leichsenring, Osaka (JP);
Yoshiichiro Kashiwagi, Kyoto (JP);
Yoshihiro Mori, Osaka (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 12/608,574

(22) Filed: Oct. 29, 2009

(65) Prior Publication Data

US 2010/0150529 A1 Jun. 17, 2010

Related U.S. Application Data

(60) Provisional application No. 61/111,840, filed on Nov. 6, 2008.

(51) Int. Cl.
*H04N 9/80* (2006.01)
*H04N 5/89* (2006.01)

(52) U.S. Cl. ........................................ 386/336; 386/248

(58) Field of Classification Search .................. 386/248, 386/326, 335–336
See application file for complete search history.

(56) References Cited

U.S. PATENT DOCUMENTS

| | | | |
|---|---|---|---|
| 7,783,161 B2 * | 8/2010 | Seo et al. ....................... | 386/240 |
| 7,831,131 B2 * | 11/2010 | Seo et al. ....................... | 386/248 |
| 2002/0118275 A1 | 8/2002 | Harman | |
| 2006/0282612 A1 | 12/2006 | Ikeda et al. | |
| 2007/0089146 A1 | 4/2007 | Ikeda et al. | |
| 2007/0089156 A1 | 4/2007 | Ikeda et al. | |
| 2007/0274680 A1 | 11/2007 | Ikeda et al. | |
| 2008/0036854 A1 | 2/2008 | Elliott et al. | |
| 2008/0145031 A1 | 6/2008 | Tanaka et al. | |
| 2008/0205859 A1 | 8/2008 | Ikeda et al. | |
| 2008/0304811 A1 | 12/2008 | Ikeda et al. | |
| 2009/0165024 A1 | 6/2009 | Ikeda et al. | |
| 2009/0202228 A1 | 8/2009 | Tanaka et al. | |
| 2010/0021145 A1 | 1/2010 | Oashi et al. | |

FOREIGN PATENT DOCUMENTS

| | | |
|---|---|---|
| WO | 2005/036555 | 4/2005 |
| WO | 2005-119675 | 12/2005 |
| WO | 2009/157159 | 12/2009 |

OTHER PUBLICATIONS

Lenny Lipton, "Foundations of the stereoscopic Cinema", pp. 68, 69 and 260-262, Van Nostrand Reinhold, New York, 1982.

* cited by examiner

*Primary Examiner* — Thai Tran
*Assistant Examiner* — Nigar Chowdhury
(74) *Attorney, Agent, or Firm* — Greenblum & Bernstein, P.L.C.

(57) ABSTRACT

The reading unit reads an application program, image data, a video stream, and an application management file from a recording medium. The virtual machine unit executes the application program. The memory unit includes an image data area for storing the image data. The playback unit plays back video data with use of the image data and the video stream in accordance with the application program. The management unit, in accordance with the application management file, instructs the virtual machine unit to start and terminate the application program and instructs the memory unit to change the image data area. Before instructing the memory unit to change the image data area, the management unit causes the virtual machine unit to forcibly terminate the application program even when the application management file specifies the continuous execution of the application program.

6 Claims, 26 Drawing Sheets

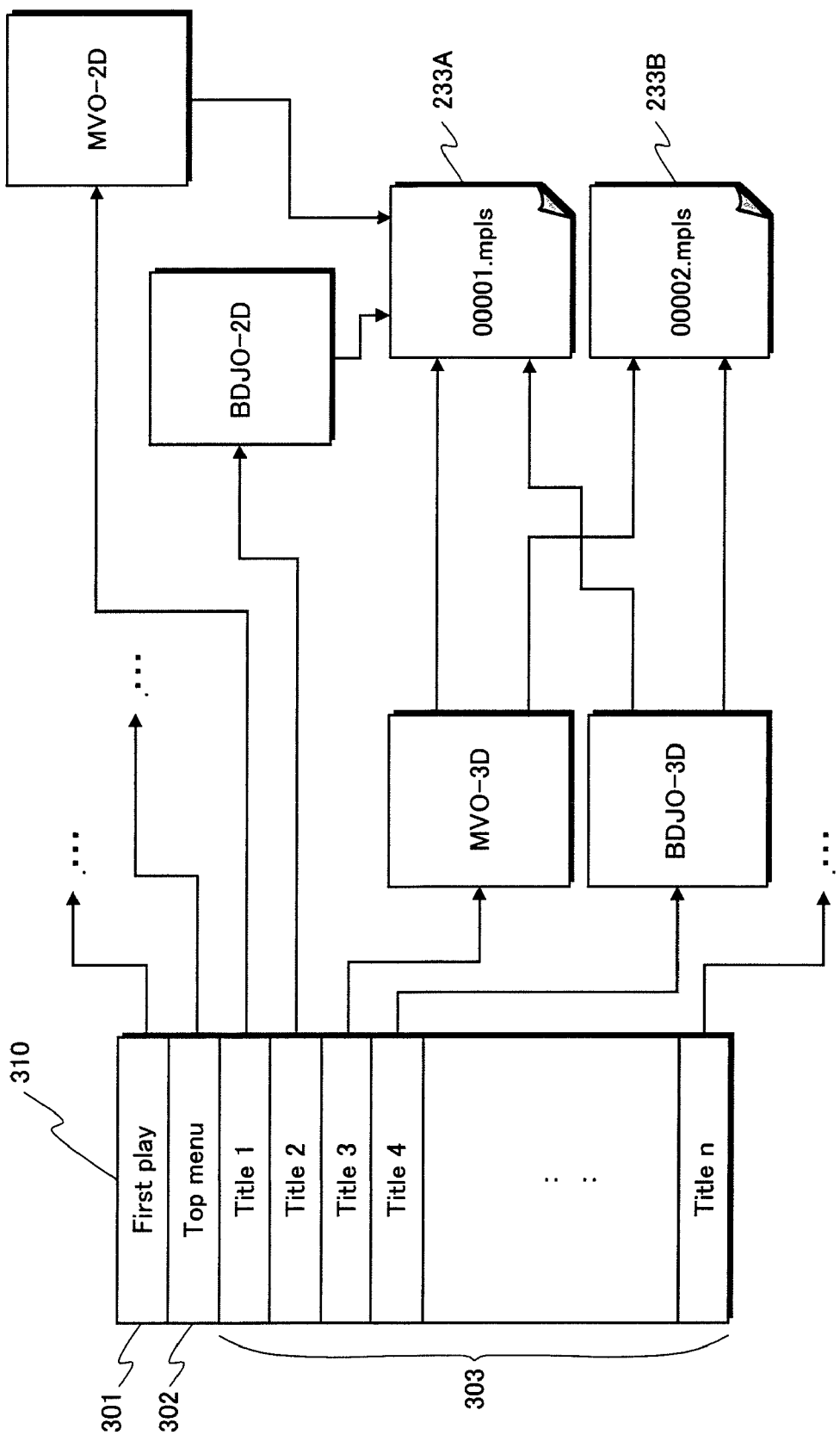

| PID=0x1011 | Left-view video stream | 901L |
| --- | --- | --- |
| 0x1100 | Primary audio stream | 902A |
| 0x1101 | Primary audio stream | 902B |
| 0x1200 | PG stream | 903A |
| 0x1201 | PG stream | 903B |
| 0x1400 | IG stream | 904 |
| 0x1A00 | Secondary audio stream | 905 |
| 0x1B00 | Secondary video stream | 906 |

| PID=0x1012 | Right-view video stream | 901R |
| --- | --- | --- |

PLAYBACK DEVICE, PLAYBACK METHOD, PLAYBACK PROGRAM, AND INTEGRATED CIRCUIT

CROSS-REFERENCE TO RELATED APPLICATIONS

This application claims the benefit of U.S. Provisional Application No. 61/111,840, filed Nov. 6, 2008.

BACKGROUND OF THE INVENTION (1) Field of the Invention

The present invention relates to a technology for playing back a stereoscopic video image and especially to a technology for displaying a stereoscopic video image superimposed with a graphics image.

(2) Description of the Related Art

In recent years, an increasing number of digital contents have been recorded on read-only Blu-ray Discs™, namely, BD-ROM discs. In line with the increase, the use of playback devices conforming to the BD-ROM standard, namely, BD-ROM playback devices, has been spreading at a rapid pace. A content recorded on a BD-ROM disc includes at least one title. The "title" is represented by a combination of application programs, video/audio streams, and image data. The image data represents graphics images of subtitles, a graphics user interface (GUI) and the like, and background images. The video/audio streams and the image data each include a variety of types from which suitable ones can be selected in various playback environments. In particular, the video streams can have a variety of resolutions ranging from 720×480 for the standard definition by the NTSC standard up to 1920×1080 for high definition. For example, when a user specifies a title, the BD-ROM playback device reads application programs corresponding to the title from a BD-ROM disc, and executes the application programs. The application programs cause the BD-ROM playback device to select, from the image data for the title, data suitable for the playback environment, and write the selected data pieces into different plane memories depending on which types the data pieces are; video, graphics, or background. The data stored in the plane memories, namely, planes, are processed in parallel with each other, and then synthesized into one video frame. In this way, the BD-ROM playback device can reproduce appropriate video/audio outputs on various display devices (see, for example, Patent Literature 1).

According to the BD-ROM standard, when the playback device can be connected with an external network such as the Internet, the application programs can cause the playback device to download digital contents from the external network. The contents that can be downloaded include additional contents to the contents recorded on the BD-ROM disc such as bonus video images and subtitles, and interactive contents such as browser screens and games. The application programs can further cause the playback device to display the downloaded subtitles superimposed on the video images being played back from the BD-ROM disc, and display the downloaded browser screen superimposed on the screen on which the video images are displayed. These functions are called "BD-Live"™. As the use of BD-ROM playback devices has been spreading, an increasing number of users have been interested in the BD-Live function.

The spread of the BD-ROM playback devices has also increased the possibility that the display technology of the stereoscopic video images (also referred to as three-dimensional (3D) video images) may be used in homes. The display technology of stereoscopic video images is expected to become a next-generation display technology, and is being developed at a rapid pace. The display technology of stereoscopic video images basically uses the fact that "a person perceives the three-dimensional shape and depth of an object from binocular parallax" (see, for example, Patent Literatures 1 through 3 and Non-Patent Literature 1). More specifically, first, two video frames (namely, a left-view video frame and a right-view video frame) are prepared for one scene. The two video frames slightly differ in the horizontal location and position of the same object. Next, the left-view video frame is projected to the left eye of a viewer, and substantially at the same time, the right-view video frame is projected to the right eye of the viewer. At that time, the viewer perceives the three-dimensional shape and depth of the object from binocular parallax, namely, a slight change in location and position of the object between the frames projected to both eyes of the viewer. Thus, the display technology of stereoscopic video images requires two frames for each scene. Accordingly, stereoscopic video images require a larger amount of data for a fixed display time than monoscopic video images (also referred to as two-dimensional (2D) video images). For this reason, BD-ROM discs and BD-ROM playback devices have an advantage in the display technology of stereoscopic video images.

CITATION LIST

Patent Literature

[Patent Literature 1]
WO 2005/119675, pamphlet
[Patent Literature 2]
U.S. Publication No. 2008/0036854, specification
[Patent Literature 3]
U.S. Publication No. 2002/0118275, specification

Non-Patent Literature

[Non-Patent Literature 1]
Lenny Lipton, "Foundations of the Stereoscopic Cinema", Van Nostrand Reinhold, N.Y., 1982

SUMMARY OF THE INVENTION

The Problems the Invention is Going to Solve

As described above, the BD-ROM playback device is implemented with a lot of plane memories. Furthermore, each plane has a capacity that is sufficient enough to deal with high-quality images of 1920×1080. Still furthermore, an image data area is provided in the memory device that is embedded in the BD-ROM playback device. The image data area stores image data in a decoded form after the image data was read from the BD-ROM disc. The image data pieces stored in the image data area are written into different plane memories depending on which types the image data pieces are; for example, interactive screen and background. In addition to these, when the BD-Live function is implemented into the BD-ROM playback device, a cache area is provided in the embedded memory device. The cache area stores image data downloaded from the external network. As described so far, the BD-ROM playback device requires large-capacity memory for storing and processing the image data. Therefore when the display function of stereoscopic video images is added into the BD-ROM playback device, the greatest possible reduction in the capacity of memory to be added, such as the necessary capacity of additional plane memories, is desirable for suppressing an increase in manufacturing cost of the playback device as much as possible.

According to conventional display technologies of stereoscopic video images, two types of video streams, namely, left-view and right-view video streams, are prepared on a recording medium. Therefore, two plane memories for video streams are implemented in a usual playback device. On the other hand, two different types of image data each representing usual monoscopic images, one type for graphics images and the other for background images, are prepared on the recording medium. The playback device first generates one image plane from each type of the image data. The playback device next shifts individual monoscopic video images to the left or right in the horizontal direction within the image plane, and thus generates a pair of left-view and right-view image planes. In order to perform these processes, for example, the playback device only has to be implemented with one plane memory for each of subtitles, interactive screens, and background images. This structure suppresses the total capacity of the plane memories to be implemented in the playback device.

However, limited stereoscopic effect on graphics and background images can be represented by the pairs of image planes generated as described above. On the other hand, further improvement in the user experience of stereoscopic video images, desires further enhancement of the stereoscopic effect on graphics and background images. For this reason, for each of graphics and background images, it is preferable that both the left-view and right-view image data types are prepared on the recording medium.

In order to hold both the left-view and right-view image planes without adding any plane memory in the playback device, the memory area for storing the image data may be changed dynamically. Especially, since the use frequency of the BD-Live function is generally low, it would be sufficient that the cache area used for the BD-Live function can be also used to hold the left- and right-view image planes. However, in conventional playback devices, both the memory area for storing image data and the cache area are fixed from the hardware environment such as whether or not the playback device is connected with an external network. Furthermore, application programs belonging to each title are designed on the assumption of the static allocation of memory areas. In particular, application programs using the BD-Live function require a cache area whose capacity is equivalent to a fixed value. Therefore, if memory areas are changed while such application programs are executed, there is a risk that a malfunction may occur. For example, image data downloaded by the application programs from the external network may be written into a memory area different from the cache area.

An object of the present invention is therefore to solve the above-described problems, and especially to provide a playback device that can play back digital contents with higher stereoscopic effects of graphics images but without increasing memory capacity.

Means to Solve the Problems

A playback device according to an embodiment of the present invention includes a reading unit, a virtual machine unit, a memory unit, a playback unit, and a management unit. The reading unit reads an application program, image data, a video stream, and an application management file from a recording medium. The virtual machine unit executes the application program. The memory unit includes an image data area for storing the image data. The playback unit plays back video data with use of the image data and the video stream in accordance with the application program. The management unit, in accordance with the application management file, instructs the virtual machine unit to start and terminate the application program and instructs the memory unit to change the image data area. The management unit further causes the virtual machine unit to forcibly terminate the application program before instructing the memory unit to the image data area, even when the application management file specifies continuous execution of the application program.

Effects of the Invention

The playback device of the present invention forcibly terminates application programs read from a recording medium, and after that, changes the image data area. Thus, the playback device can dynamically change the image data area while reliably preventing a malfunction of the application programs. As a result, it is possible to reduce the image data area, and then use a free area available by the reduction to store both the left-view and right-view image planes. In this way, the playback device of the present invention can play back digital contents with higher stereoscopic effects of graphics images but without increasing memory capacity.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a schematic diagram showing an index table 310 in the index file 231 shown in FIG. 2;

DESCRIPTION OF THE PREFERRED EMBODIMENTS

The following describes preferred embodiments of the present invention with reference to the drawings.

Embodiment 1

Figure 1:
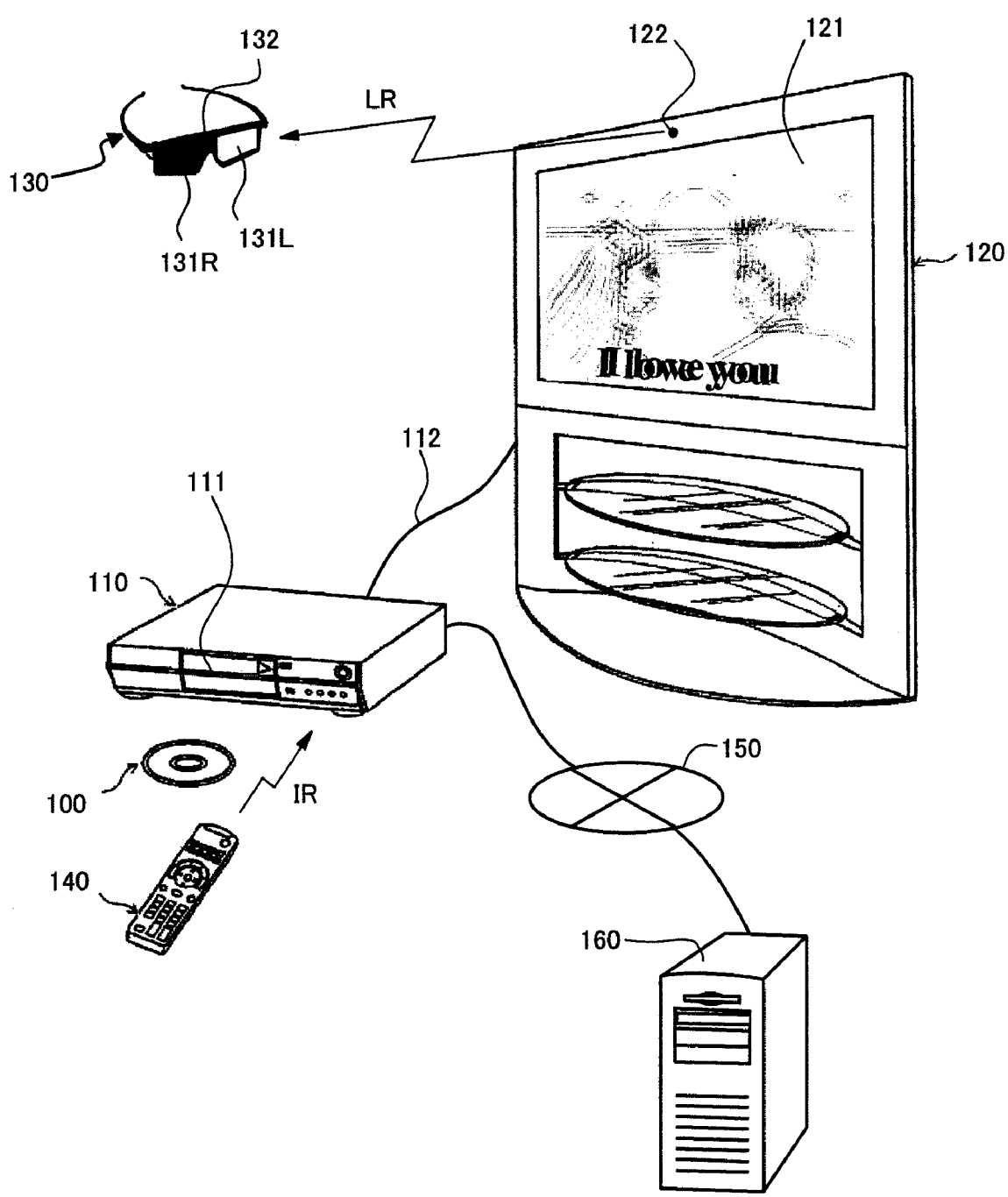
FIG. 1 is a schematic diagram showing a home theater system including a playback device according to Embodiment 1 of the present invention.

FIG. 1 is a schematic diagram showing a home theater system including a playback device according to Embodiment 1 of the present invention. With reference to FIG. 1, the home theater system includes a recording medium 100, a playback device 110, a display device 120, shutter glasses 130, and a remote control 140.

The recording medium 100 is a BD-ROM disc. The recording medium 100 can be a different portable recording medium, such as an optical disc with a different format such as DVD or the like, a magnetooptical disc, a flexible disk, a removable hard disk drive (HDD), or a semiconductor memory device such as an SD memory card. The BD-ROM disc 100 stores a movie content as a 3D video image. The movie content includes a pair of a left-view video stream and a right-view video stream.

A BD-ROM drive 111 is mounted on the playback device 110. The BD-ROM drive 111 is an optical disc drive conforming to the BD-ROM format. The playback device 110 uses the BD-ROM drive 111 to read the movie content from the BD-ROM disc 100. The playback device 110 further decodes the movie content into video data/audio data. When the playback device 110 or the display device 120 supports only display of a plane image (also referred to as a two-dimensional (2D) image), then the video data only includes either a left-view or a right-view video frame. On the other hand, when both the playback device 110 and the display device 120 support display of a 3D image, then the video data includes both left-view and right-view video frames.

The playback device 110 is connected to the display device 120 via an HDMI (High-Definition Multimedia Interface) cable 112. The playback device 110 converts the video data/audio data into a video signal/audio signal in the HDMI format and sends the signals to the display device 120 via the HDMI cable 112. Additionally, the playback device 110 exchanges CEC messages with the display device 120 via the HDMI cable 112. In this way, the playback device 110 asks the display device 120 whether it supports display of 3D video images.

The playback device 110 is connected with an external network 150 such as the Internet, and can communicate with the server device 160 via the external network 150. Especially, the playback device 110 supports the BD-Live function. With this function, the playback device 110 can download a new content from the server device 160 and play back the downloaded content. The new content includes an additional content and an interactive content, where the additional content is to be added to the movie content stored in the BD-ROM disc 100. The additional content includes a sub-audio, subtitles, and an application program to be added to the movie content, and a bonus image pertaining to the movie content. The interactive content includes a browser screen and a game. When the playback device 110 plays back the video image stored in the BD-ROM disc 100, it superimposes the image, such as a subtitle, of the additional content onto the video image, or displays the video image together with the image, such as a browser screen, of the interactive content, on the same screen.

The display device 120 is a liquid crystal display. Alternatively, the display device 120 can be another type of flat panel display, such as a plasma display or an organic EL display, or a projector. The display device 120 displays video on the screen 121 in accordance with a video signal, and causes an embedded speaker to produce audio in accordance with an audio signal. Especially, when the playback device 110 and the display device 120 both support display of 3D video images, then the left-view and the right-view are displayed alternately on the screen 121.

When the display device 120 supports display of 3D video images, a left/right signal transmitting unit 122 is further mounted on the display device 120. The left/right signal transmitting unit 122 transmits a left/right signal LR to the shutter glasses 130 via infrared rays or by radio transmission. The left/right signal LR indicates whether the image currently displayed on the screen 121 is a left-view or a right-view video frame. The display device 120 distinguishes between a left-view video frame and a right-view video frame using the control signal that accompanies a video signal and causes the left/right signal transmitting unit 122 to change the left/right signal LR in synchronization with the switching between video frames.

The shutter glasses 130 include two liquid crystal display panels 131L and 131R and a left/right signal receiving unit 132. The liquid crystal display panels 131L and 131R constitute the left and right lens portions, respectively. The left/right signal receiving unit 132 receives a left/right signal LR, and in accordance with the change of the received left/right signal LR, sends a signal to the left and right liquid crystal display panels 131L and 131R. In accordance with the signal, each of the liquid crystal display panels 131L and 131R either lets light pass through the entire panel or shuts light out. For example, when the left/right signal LR indicates a left-view display, the liquid crystal display panel 131L for the left eye lets light pass through, while the liquid crystal display panel 131R for the right eye shuts light out. When the left/right signal LR indicates a right-view display, the display panels act oppositely. In this way, the two liquid crystal display panels 131L and 131R alternately let light pass through in sync with the switching between frames. As a result, when a viewer looks at the screen while wearing the shutter glasses 130, the left-view is shown only to the viewer's left eye, and the right-view is shown only to the right eye. At that time, the viewer is made to perceive the difference between the images seen by each eye as the binocular parallax for a single virtual three-dimensional object. That is to say, the viewer views the two video frames as one virtual three-dimensional object.

The remote control 140 includes an operation unit and a transmitting unit. The operation unit includes a plurality of buttons. The buttons correspond to each of the functions of the playback device 110 and the display device 120, such as turning the power on or off, starting or stopping playback of the BD-ROM disc 100, etc. The operation unit detects when the user presses a button and passes a signal that specifies the button to the transmitting unit. The transmitting unit sends this signal as a signal IR via infrared rays or radio transmission to the playback device 110 or the display device 120. In this way, the user can remotely control the playback device 110 or the display device 120.

<Data Structure of the BD-ROM Disc>

Figure 2:
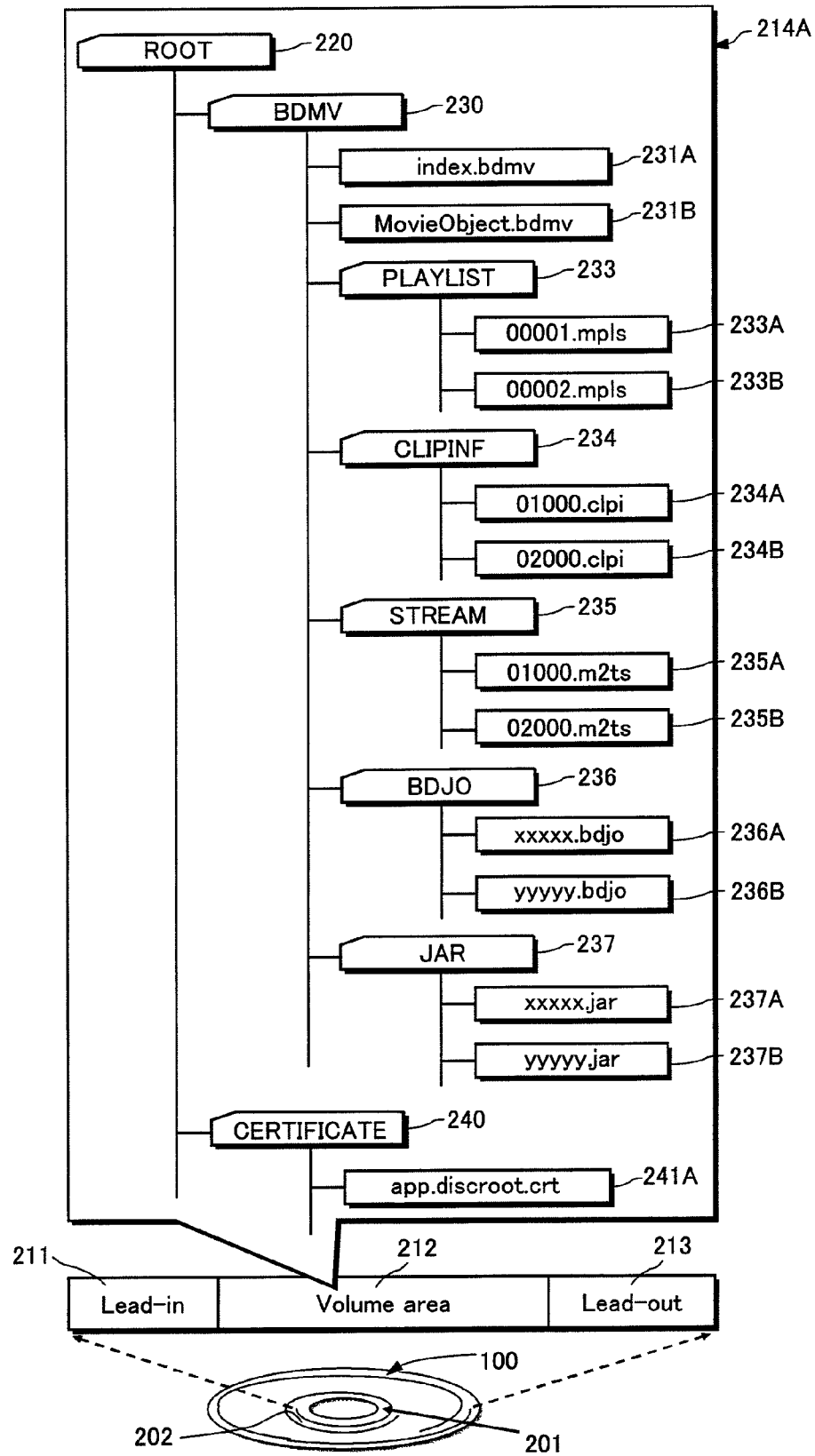
FIG. 2 is a schematic diagram showing the data structure of the BD-ROM disc 100 according to Embodiment 1 of the present invention.

FIG. 2 is a schematic diagram showing the data structure of the BD-ROM disc 100. As shown in FIG. 2, a BCA (Burst Cutting Area) 201 is provided at the innermost portion of the data recording area on the BD-ROM disc 100. Only the BD-ROM drive 111 is permitted to access the BCA 201, and access by application programs is prohibited. In this way, the BCA 201 can be used as technology for copyright protection. In the data recording area outside of the BCA 201, a track 202 is formed spiraling from the inner to the outer circumference. In FIG. 2, the track 202 is virtually extended in a transverse direction. The left side of track 202 represents the inner radiuses of the disc 100, and the right side represents the outer radiuses. As shown in FIG. 2, the track 202 contains a lead-in area 211, a volume area 212, and a lead-out area 213 in order, starting from the inner radius. The lead-in area 211 is provided immediately on the outside edge of the BCA 201. The lead-in area 211 includes information necessary to access the volume area 212, such as the size, the physical address, etc. of the data recorded in the volume area 212. The lead-out area 213 is provided on the outermost portion of the data recording area and indicates the end of the volume area 212. The volume area 212 includes application data such as video, audio, etc.

The volume area 212 is divided into small areas called "sectors." Sectors are consecutively assigned serial numbers in order from the top of the volume area 212. These serial numbers are called logical addresses (or logical block numbers). Data is read from the BD-ROM disc 100 by designating a logical address to the sector storing that data. In this way, the volume area 212 can be accessed in units of sectors. In the BD-ROM disc 100, logical addresses are furthermore substantially equivalent to physical addresses on the disc. That is to say, in an area where the logical addresses are consecutive, the physical addresses are also substantially consecutive. Accordingly, the BD-ROM drive 111 can consecutively read data pieces having consecutive logical addresses without making the optical pickup perform a seek.

UDF (Universal Disc Format) is used as the file system for the volume area 212. Alternatively, the file system may be ISO9660. The data recorded on the volume area 212 is represented in a directory/file format in accordance with the file system. In other words, the data is accessible in units of directories or files.

<<Directory/File Structure of BD-ROM Disc>>

As further shown in FIG. 2, in the directory/file structure 214 on the BD-ROM disc 100, a BD movie (BDMV) directory 230 and a CERTIFICATE directory 240 are located immediately below a ROOT directory 220. The BDMV directory 230 stores the body of the content. The CERTIFICATE directory 240 stores information necessary for authentication of the content.

Below the BDMV directory 230 are an index file (index.bdmv) 231 and a movie object file (MovieObject.bdmv) 232. The index file 231 contains information for managing as a whole the content recorded on the BD-ROM disc 100. The movie object file 232 generally stores a plurality of movie objects. Each "movie object" stores a sequence of instructions for causing the playback device 110 to execute playback processes in a similar manner to general DVD players. Especially, the movie object file 232 includes a movie object for causing the playback device 110 to execute the playback process for 2D video images, and a movie object for causing the playback device 110 to execute the playback process of 3D video images.

The BDMV directory 230 further contains a playlist (PLAYLIST) directory 233; a clip information (CLIPINF) directory 234; a stream (STREAM) directory 235; a BD-J object (BDJO: BD Java™ Object) directory 236; and a Java archive (JAR: Java Archive) directory 237.

AV stream files (01000.m2ts) 235A and (02000.m2ts) 235B are located in the STREAM directory 235. An "AV stream file" is the body of a video content and represents video, audio, subtitles, etc. The types of AV stream files include a 2D/AV stream file, a left-view AV stream file, and a right-view AV stream file. A "2D/AV stream file" refers to an AV stream file that can be used alone for playback of 2D video images. A "left-view stream file" refers to an AV stream file representing the left-view of 3D video images. A "right-view stream file" refers to an AV stream file representing the right-view of 3D video images. A left-view stream file and a right-view stream file are used as a pair to display 3D video images. In the example shown in FIG. 2, the first AV stream file (01000.m2ts) 235A is a 2D/AV stream file and is also a left-view stream file. The second AV stream file (02000.m2ts) 235B is a right-view stream file, and is used in combination with the first AV stream file 235A for playback of 3D video images.

Clip information files (01000.clpi) 234A and (02000.clpi) 234B are located in the CLIPINF directory 234. Each "clip information file" is assigned one-to-one to an AV stream file, and mainly represents the correspondence between the presentation times of the video images shown by the AV stream file and the logical addresses in the AV stream file. The types of clip information files include a 2D clip information file, a left-view clip information file, and a right-view clip information file, which are clip information files respectively corresponding to a 2D/AV stream file, a left-view stream file, and a right-view stream file. In the example shown in FIG. 2, the first clip information file (01000.clpi) 234A is a 2D clip information file and is also a left-view clip information file corresponding to the first AV stream file (01000.m2ts) 235A. The second clip information file (02000.clpi) 234B is a right-view clip information file corresponding to the second AV stream file (02000.m2ts) 235B.

Playlist files, (00001.mpls) 233A and (00002.mpls) 233B are located in the PLAYLIST directory 233. A "playlist file" specifies the playback path of an AV stream file, namely, the portion of an AV stream file to decode, and the order of decoding. The types of playlist files include a 2D playlist file and a 3D playlist file. A "2D playlist file" refers to a playlist file specifying the playback path of a 2D/AV stream file. A "3D playlist file" refers to a playlist file that specifies the playback path of a combination of a left-view stream file and a right-view stream file. In the example shown in FIG. 2, the first playlist file (00001.mpls) 233A is a 2D playlist file, and the second playlist file (00002.mpls) 233B is a 3D playlist file.

BD-J object files (XXXXX.bdjo) 236A and (yyyyy.bdjo) 236B are located in the BDJO directory 236. The "BD-J object file" includes a single BD-J object. The "BD-J object" is a bytecode program that specifies (i) an application program to be executed by a Java virtual machine implemented in the playback device 110, and (ii) the execution time of the application program. The application program causes the playback device 110 to execute the title playback process and the graphics image rendering process. In the example shown in FIG. 2, the BD-J object stored in the first BD-J object file (XXXXX.bdjo) 236A causes the playback device 110 to execute the 2D image playback process. On the other hand, the BD-J object stored in the second BD-J object file (yyyyy.bdjo) 236B causes the playback device 110 to execute the 3D image playback process.

JAR files (XXXXX.jar) 237A and (yyyyy.jar) 237B are located in the JAR directory 237. The "JAR file" includes bodies of more than one application programs, in general, that the BD-J object specifies to be executed.

Below the CERTIFICATE directory 240, an application certificate file (app.discroot.crt) 241 is located. The application certificate file 241 is unique to the content provider recorded on the BD-ROM disc 100. The "application certificate file" is what is called a digital certificate, and is used for signature verification of the application program. In the signature verification, it is checked whether or not the application program has been tampered with, and the supply source thereof is authenticated. With the signature verification, it is possible to cause the Java virtual machine to activate only the application program being permitted by the content provider, or it is possible to selectively authorize the application program to access the memory within the playback device 110.

In the following, the data structure of each of the files in the BDMV directory 230 will be described.

<<Index Table>>

The index file 231 contains information that is necessary for identification of the BD-ROM disc 100. When the BD-ROM disc 100 is inserted into the BD-ROM drive 111, the index file 231 is read first and used by the control unit of the playback device 110 to identify the BD-ROM disc 100. The index file 231 further includes an index table. The index table defines a correspondence between titles constituting the content and movie objects or BD-J objects.

FIG. 3 is a schematic diagram showing the index table 310 in the index file 231. The index table 310 stores items such as a first play 301, a top menu 302, and a title k 303 (k=1, 2, . . . , n; an integer n is equal to or greater than one). Each item is assigned to one of movie objects MVO-2D, MVO-3D, . . . , and BD-J objects BDJO-2D, BDJO-3D, . . . . On the other hand, the items are assigned to various events by the control unit of the playback device 110. The "events" include, for example, insertion/removal of a disc into/from the BD-ROM drive 111, operation of the remote control 140 by the user, and requests issued from application programs.

Each time an event occurs, the control unit of the playback device 110 refers to the index table 310, and calls an object specified by an item corresponding to the event, from the BD-ROM disc 100. The control unit further performs various processes in accordance with the called object.

The "first play" 301 specifies an object to be called when the disc 100 is loaded into the BD-ROM drive 111. The object causes the playback device 110 to, for example, execute the process for displaying a warning message to viewers and the logo of the content provider. The "top menu" 302 specifies an object for displaying a menu on the display device 120 when a command "go back to menu" is input, for example, by user operation. The object causes the playback device 110 to execute the process for displaying a menu. In the "title k" 303, objects are individually allocated to titles that constitute the content body on the disc 100. One of the objects is called when a title for playback is specified by user operation, and the called object causes the playback device 110 to execute the process for playing back an AV stream file belonging to the title.

In the example in FIG. 3, the movie object assigned to the item "title 1" and the item "title 2" are both allocated as 2D video image titles. The first movie object MVO-2D corresponding to the item "title 1" includes a group of instructions related to playback processes for 2D video images using the first playlist file 233A. When the playback device 110 refers to the item "title 1," then in accordance with the instructions in the movie object MVO-2D, the first playlist file 233A is read from the disc 100, and playback processes for 2D video images are executed in accordance with the playback path specified in the read file. On the other hand, the first BD-J object BDJO-2D assigned to the item "title 2 specifies an application program related to playback processes for 2D video images using the first playlist file 233A. When the playback device 110 refers to the item "title 2", the application program is executed in accordance with the first BD-J object BDJO-2D. Thus, the first playlist file 233A is read from the disc 100, and playback processes for 2D video images are executed in accordance with the playback path specified in the read file.

In the example in FIG. 3, the items "title 3" and "title 4" are allocated to 3D video image titles. The second movie object MVO-3D assigned to the item "title 3" contains, in addition to a group of instructions related to 2D image playback process using the first playlist file 233A, a group of instructions related to 3D image playback process using the playlist file 233B. The second BD-J object BDJO-3D assigned to the item "title 4" specifies, in addition to an application program related to 2D image playback process using the first playlist file 233A, an application program related to 3D image playback process using the playlist file 2333. For example, when the title 3 is selected by user operation, the playback device 110 refers to the item "title 3" in the index table 310, and calls the second movie object MVO-3D. After that, the playback device 110 first performs the following three types of distinguishing processes: 1) Does the playback device 110 itself support playback of 3D video images? 2) Has the user selected 3D video image playback? and 3) Does the display device 120 support playback of 3D video images? Next, the playback device 110 selects one of the playlist files 233A-B in accordance with the results of the above-described distinguishing processes, and executes the 3D image playback process in accordance with the playback path specified in the selected file. When, on the other hand, the playback device 110 refers to the item "title 4" and calls the second BD-J object BDJO-3D, the playback device 110 executes a variety of application programs in accordance with the second ED-j object BDJO-3D. In this way, the playback device 110 executes the distinguishing processes, the process of selecting a playlist file in accordance with the results thereof, and the process of playing back the 3D video image in accordance with the playback path specified in the selected playlist file.

<<Movie Object File>>

The movie object file 232 generally stores a plurality of movie objects. Each movie object stores a sequence of navigation commands. A navigation command is a control command causing the playback device to execute playback processes similarly to general DVD players. Types of navigation commands include, for example, a read command to read a playlist file corresponding to a title, a playback command to play back an AV stream file indicated by a playlist file, and a transition command to make a transition to another title. Navigation commands are written in an interpreter-type language and are interpreted by an interpreter, namely, a job control program, embedded in the playback device to make the control unit execute the desired job. A navigation command is composed of an opcode and an operand. The opcode describes the operation that the playback device is to execute, such as causing the title to branch, playing back the title, or calculating. The operand indicates identification information of a subject of the operation, such as the number of the title. The control unit of the playback device 110 calls a movie object in response, for example, to a user operation and executes navigation commands included in the called movie object in the order of the sequence. Thus, in a manner similar to general DVD players, the playback device 110 first causes the display device 120 to display a menu and allows the user to select a command. The playback device 110 then executes playback start/stop of a title, switches to another title, etc. in accordance with the selected command, thereby dynamically changing the progress of video playback. Note that the operation mode of the playback device 110 conforming to the movie object is called the HDMV (High Definition Movie) mode.

<<BD-J Object File>>

In the BD-J object files 236A and 236B, BD-J objects are written in a compiler-type language such as Java. The control unit of the playback device 110 calls a BD-J object in response to a user operation or a request from the application program. The BD-J object is interpreted by the Java platform implemented in the control unit. The control unit further causes the Java virtual machine to execute a variety of application programs in accordance with the BD-J object. Thus, the playback device 110 dynamically changes the progress of title video playback, or causes the display device 120 to display the graphics image independently of the title video image. Note that the operation mode of the playback device 110 conforming to the BD-J object is called the BD-J mode.

Figure 4A:
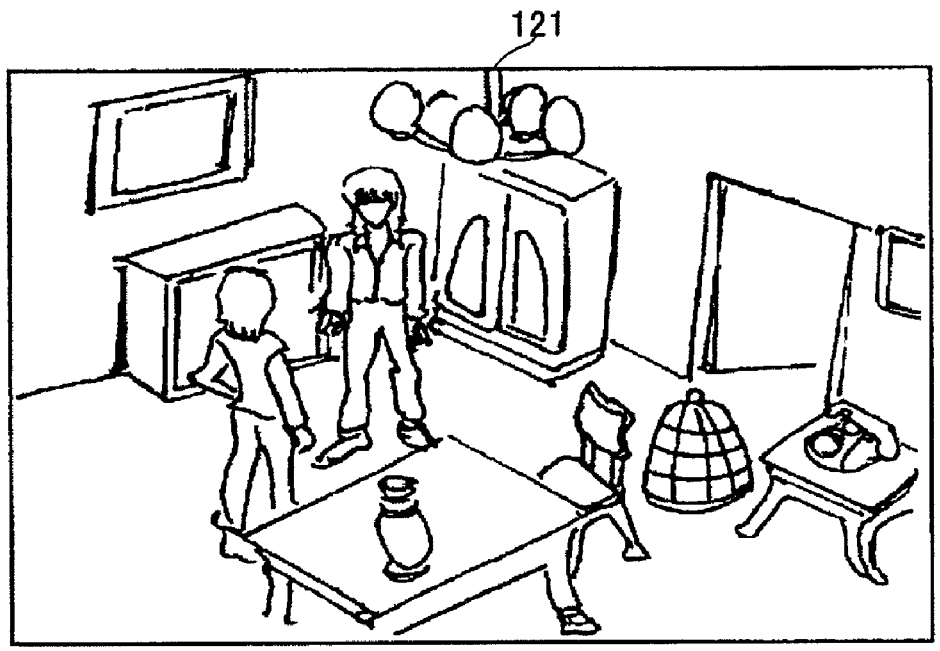
FIGS. 4A and 4B are schematic diagrams showing images displayed on the screen 121 of the display device 120 in the HDMV mode and the BD-J mode, respectively.
Figure 4B:
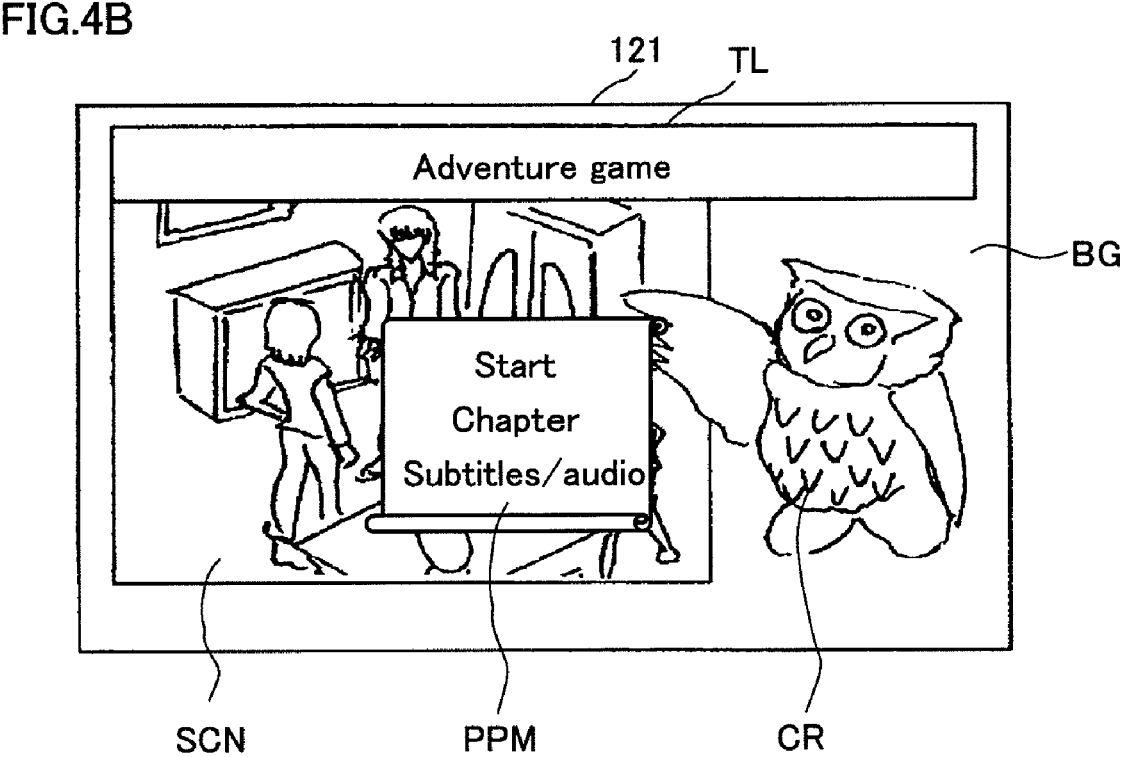

FIGS. 4A and 4B are schematic diagrams showing images displayed on the screen 121 of the display device 120 in the HDMV mode and the BD-J mode, respectively. FIG. 4A shows one scene of a video image played back in the HDMV mode. In the HDMV mode, the video images of the content body, such as the main plot of the movie, recorded on the BD-ROM disc 100 is displayed on the entirety of the screen 121, like video images to be played back from a DVD. On the other hand, FIG. 4B shows one scene of video images played back in the BD-J mode. In the BD-J mode, it is possible to cause the Java virtual machine in the playback device 110 to render graphics images in synchronization with the video images of the content body. For example, as shown in FIG. 4B, the images SCN of the main plot of the movie, the title TL of the movie, an animated image CR of an owl that comments on the movie, a background image BG, and a pop-up menu PPM can be displayed simultaneously in one screen of the screen 121.

In the BD-J mode, the BD-Live functions are further available. With the BD-Live functions, the application program can cause the playback device 110 to download additional contents such as subtitles, and interactive contents such as browser screens, from the server device 160 on the external network 150. The application program can further cause the playback device 110 to display the downloaded contents together with the images of the content body recorded on the BD-ROM disc 100, as shown in FIG. 4B.

In the BD-J mode, when both the playback device 110 and the display device 120 support display of 3D video images, it is possible to cause the Java virtual machine to render graphics images as 3D video images together with the video images of the content body. The process for playing back graphics images as 3D video images has two types of modes: a 2-plane mode and an offset mode. In the "2-plane mode", left-view image data and right-view image data are separately prepared, as is the case with the video streams of the content body, and then left-view image planes and right-view image planes are separately rendered by the Java virtual machine. In the "offset mode", the playback device 110 generates pairs of a left-view image plane and a right-view image plane from usual image data representing 2D video images.

Figure 5A:
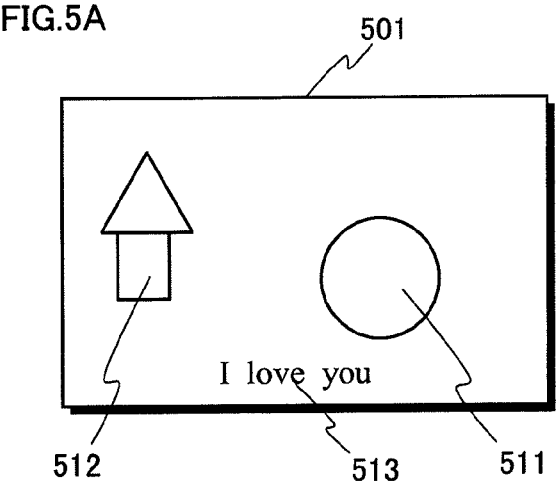
FIGS. 5A through 5D show an example of generating a left view 502L and a right view 502R from a 2D video image 501 in the offset mode.
Figure 5B:
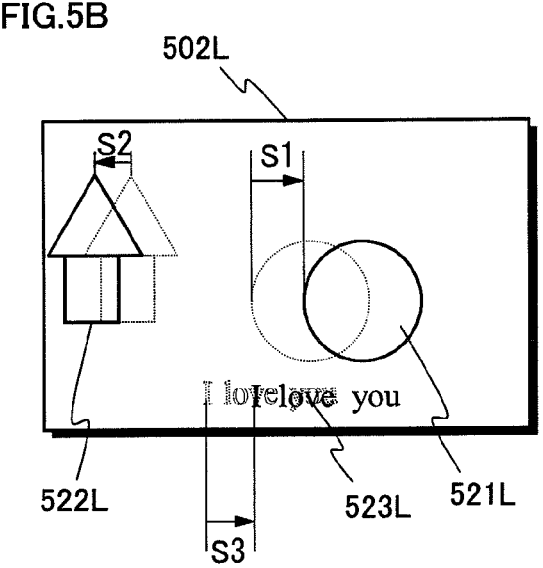
Figure 5C:
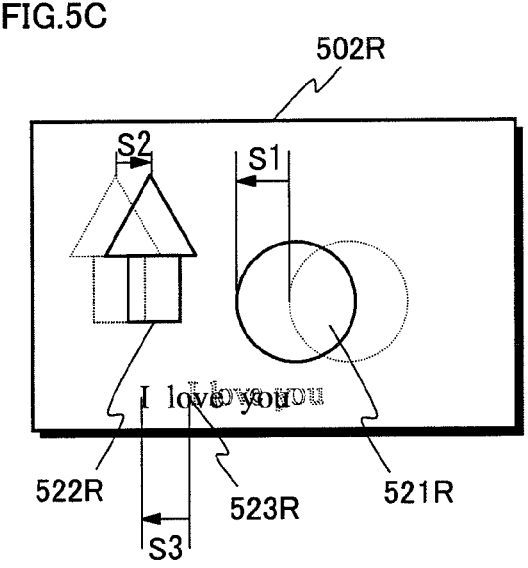
Figure 5D:
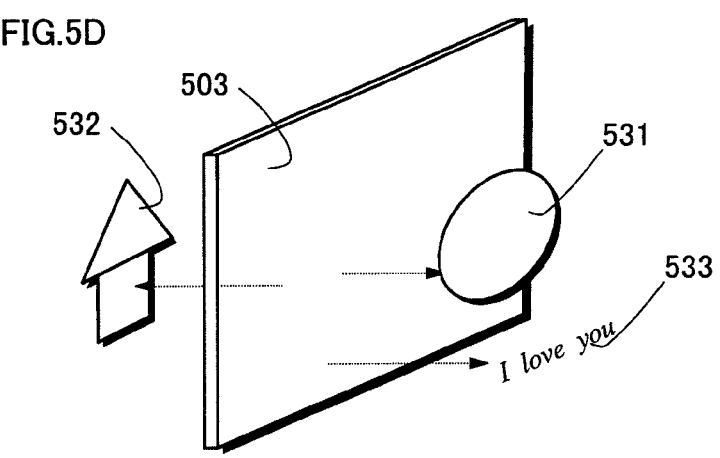

FIGS. 5A through 5D are schematic diagrams showing an example of generating a left view 502L and a right view 502R from 2D video images 501 in the offset mode. With reference to FIG. 5A, the 2D video images 501 include a circular plate 511 and subtitles 513 in a background 512. The playback device 110 processes the image data representing the 2D video images 501 to shift the display positions of elements of the 2D video images 501 horizontally. Thus, the left view 502L and the right view 502R are generated from the 2D video images 501. In the example shown in FIGS. 5B and 5C, the display positions of the circular plate 521L in the left view 502L and the circular plate 521R in the right view 502R have been shifted to the right and the left, respectively, by an offset value S1 from the display position of the circular plate 511 in the 2D video images 501. Similarly, the display positions of the subtitles 523L in the left view 502L and the subtitles 523R in the right view 502R have been shifted to the right and the left, respectively, by an offset value S3 from the display position of the subtitles 513 in the 2D video images 501. In this case, a viewer sees both the circular plate 531 and the subtitles 533 in front of a screen 503 as shown in FIG. 5D. On the other hand, the display positions of the background 522L in the left view 502L and the background 522R in the right view 502R have been shifted to the left and the right, respectively, by an offset value S2 from the display position of the background 512 in the 2D video images 501. In this case, the viewer sees the background 532 behind the screen 503.

Figure 6A:
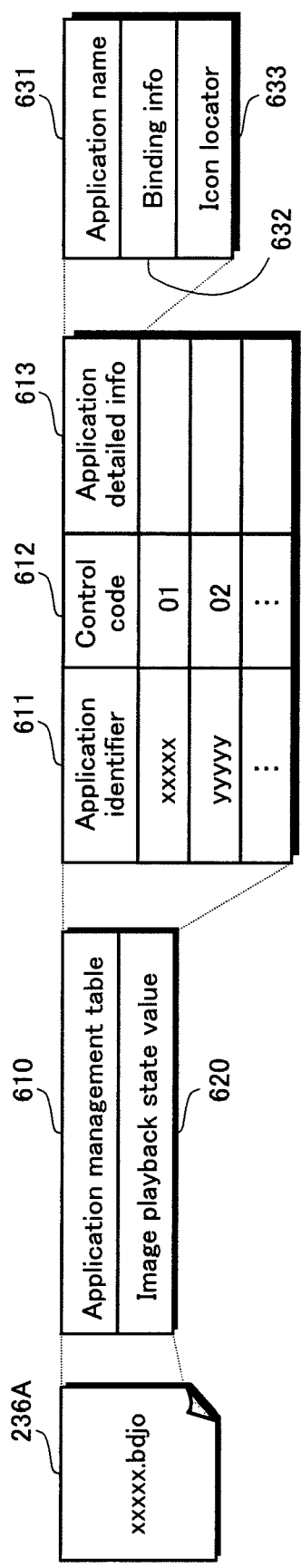
FIG. 6A is a schematic diagram showing the data structure of the BD-J object.

FIG. 6A is a schematic diagram showing the data structure of a BD-J object. With reference to FIG. 6A, the BD-J object includes an application management table 610 and an image playback state value 620.

The application management table 610 is a list of application programs to be executed and the timing of execution thereof, namely, life cycles thereof. With reference to FIG. 6A, the application management table 610 includes a plurality of combinations of an application identifier 611, a control code 612, and application detailed information 613. The application identifier 611 indicates a file name of a JAR file including an application program to be executed. The control code 612 indicates an activation mode of the application program identified by the application identifier 611. There are two types of activation modes: Auto Start and Present. "Auto Start" indicates that the application program is automatically activated at the start of playback of the title. "Present" indicates that the application program is activated in response to a call from another application program. The application detailed information 613 includes an application name 631, binding information 632, and an icon locator 633. The application name 631 indicates the name of the application program to be executed. The binding information 632 indicates a life cycle of the application program identified by the application name 631. There are three types of life cycles: title-bound, disc-bound, and disc-unbound. "Title-bound" indicates that the execution period of the application program is limited to a period of one title. "Disc-bound" indicates that the execution period of the application program is limited to a period until the BD-ROM disc is removed from the BD-ROM drive, but not limited to the period of any title contained in the BD-ROM disc. "Disc-unbound" indicates that the execution period of the application program continues after the BD-ROM disc is removed from the BD-ROM drive. The icon locator 633 indicates an address of an icon data in a JAR file; the icon data is to be associated with the application program identified by the application name 631.

Figure 6B:
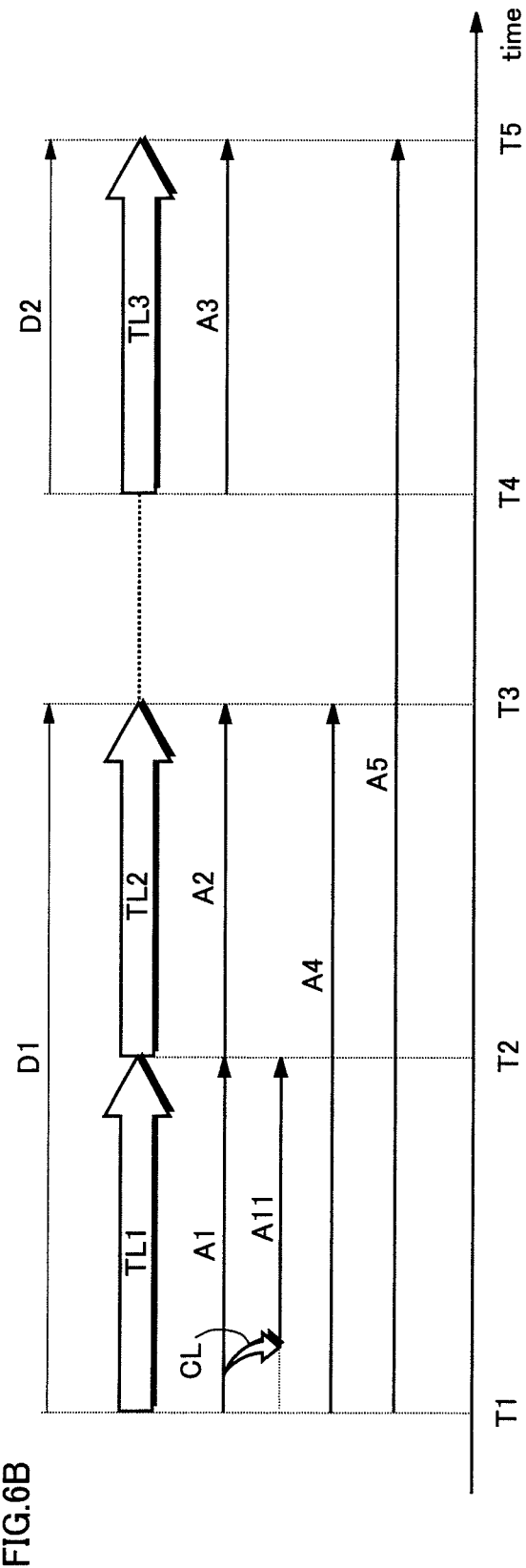
FIG. 6B is a schematic diagram showing life cycles of six types of application programs A1-A5 and A11.

FIG. 6B is a schematic diagram showing life cycles of six types of application programs A1-A5 and A11. With reference to FIG. 6B, the playback device 110 plays back a first title TL1 from a first disc D1 during the period from time T1 to time T2, and then plays back a second title TL2 during the period from time T2 to time T3. At time T3, the first disc D1 is removed from the playback device 110. After that, when a second disc D2 is inserted into the playback device 110 at time T4, the playback device 110 plays back a third title TL3 from the second disc D2 during the period from time T4. Title-bound application programs A1, A2, and A3 are executed during the playback periods of the titles TL1, TL2, and TL3, respectively. Since the activation modes of all the application programs A1, A2, and A3 are Auto Start, the life cycles of the application programs A1, A2, and A3 match the playback periods of the titles TL1, TL2, and TL3, respectively. During the playback period T1-T2 of the first title TL1, another title-bound application program A11 is executed as well. Since the activation mode of the application program A11 is Present, the application program A11 is activated in response to a call from the Auto start application program A1 executed in the same period. On the other hand, since the application program A11 is title-bound, the application program A11 is terminated at the end of the playback period of the first title TL1. During the period T1-T3 for which the first disc D1 is kept inserted in the playback device 110, a disc-bound application program A4 is executed as well. The application program A4 continues to be executed even after the first title TL1 is changed to the second title TL2 at time T2. Since the application program A4 is disc-bound, the application program A4 is terminated when the first disc D1 is removed from the playback device 110 at time T3. During the periods from time T1 to time T4 and after time T4, a disc-unbound application program A5 is executed. The application program A5 continues to be executed after the first disc D1 is removed from the playback device 110 at time T3 and after the second disc D2 is inserted into the playback device 110 at time T4.

The image playback state value 620 indicates a state of the playback device 110 with respect to playback processes of image data; the state is to be realized in the playback period of the title assigned to the BD-J object. The control unit of the playback device 110, when calling the BD-J object, changes the state of the playback device 110 such as allocation of memory areas in accordance with the image playback state value 620 presented by the BD-J object. There are four types of states of the playback device 110 with respect to playback processes of image data; States 1 through 4. In order to indicate each of the states, the image playback state value 620 can take one of four integers, 0 through 3. When the image playback state value 620 is equal to 0, 1, 2, and 3, the state of the playback device 110 is set to State 1, State 2, State 3, and State 4, respectively, during the playback period of the title.

Figure 7:
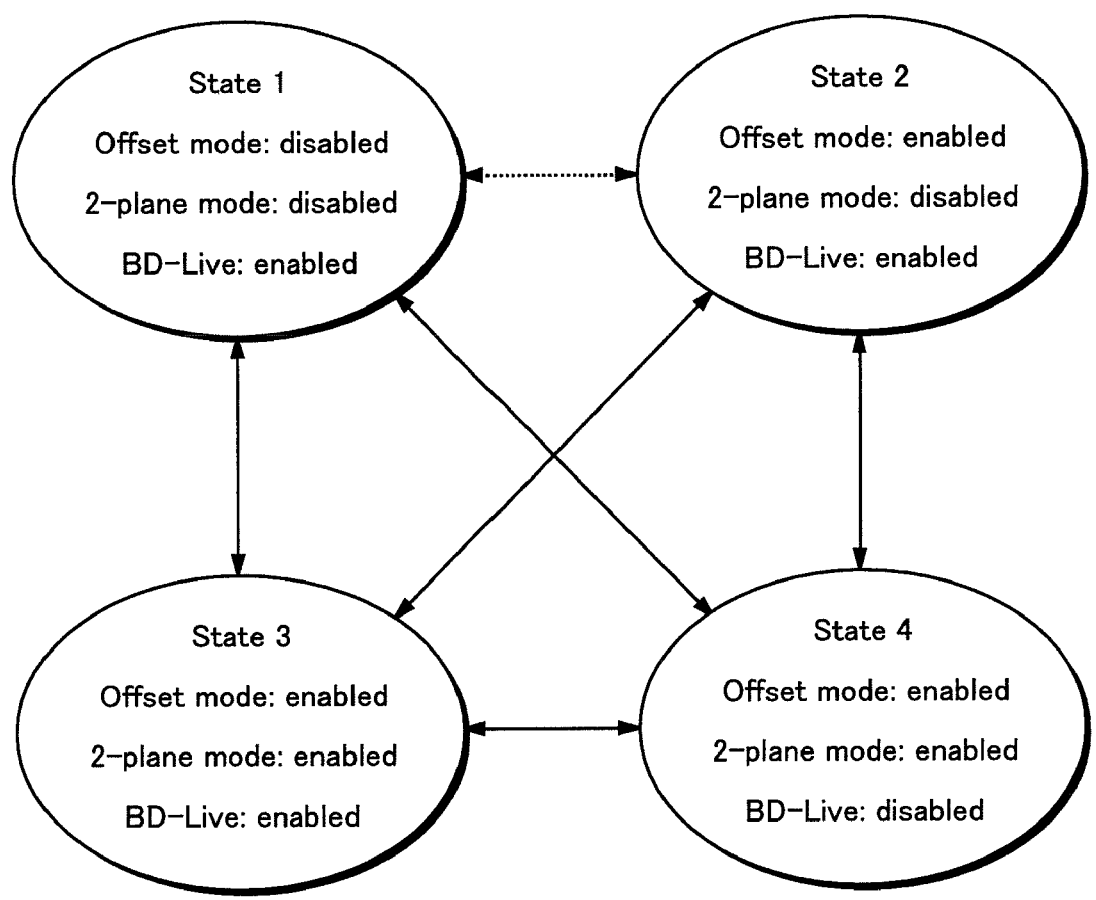
FIG. 7 shows the state transition among the states 1-4 of the playback device in Embodiment 1 of the present invention.

FIG. 7 is a state transition diagram showing States 1-4. With reference to FIG. 7, in States 1-4, application programs are permitted to use or prohibited from using different combinations of the offset mode, the 2-plane mode, and the BD-Live function.

In State 1, the playback process of 3D video images itself is disabled, and thus image data can be played back only as 2D images. That is to say, both the offset mode and the 2-plane mode are disabled. On the other hand, the BD-Live function is enabled.

In State 2, the playback process of 3D video images from video streams is enabled. However, with respect to the playback process of 3D video images from image data, the 2-plane mode is disabled, and only the offset mode is enabled. On the other hand, the BD-Live function is enabled.

In State 3, the playback process of 3D video images from video streams is enabled. In addition, with respect to the playback process of 3D video images from image data, both the 2-plane mode and the offset mode are enabled. On the other hand, the BD-Live function is enabled with a more restricted cache area for holding image data such as browser screens.

In State 4, as in State 3, the playback process of 3D video images from video streams, and in addition, the playback process of 3D video images from image data in either of the 2-plane mode and the offset mode are enabled. However, in contrast to State 3, the BD-Live function is disabled.

<<JAR File>>

Figure 8:
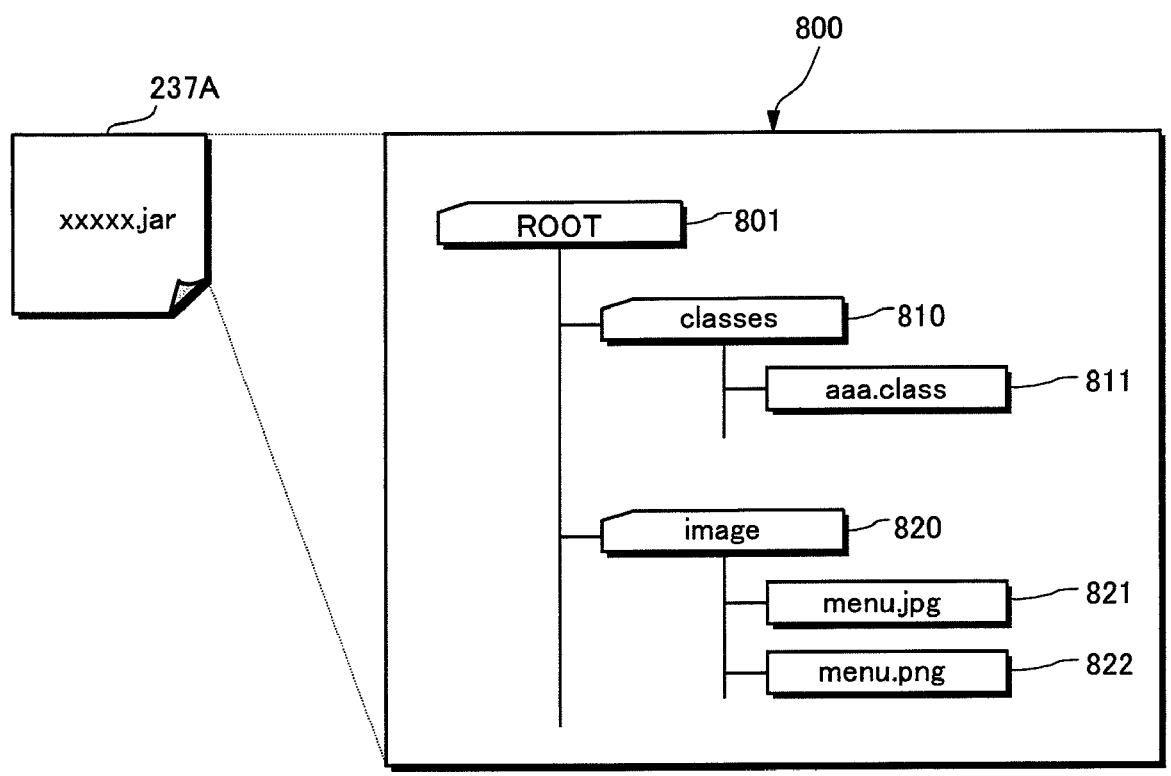
FIG. 8 is a schematic diagram showing the data structure of the JAR file 237A shown in FIG. 2.

FIG. 8 is a schematic diagram showing the data structure of the JAR file 237A. The JAR file 237A is a Java archive file. Java archive files are zip files specialized in Java to conform to the specifications recited in "http://java.sun.com/j2se/1.4.2/docs/guide/jar/jar.html." Accordingly, the contents of Java archive files can be confirmed by commercially available zip decompression software. The JAR file 237A contains a compressed directory/file group 800 having a structure shown in FIG. 8. The directory/file group 800 is decompressed by the Java virtual machine from the JAR file 237A into a heap area (also called work memory) in the Java virtual machine. In the directory/file group 800, a classes directory 810 and an image directory 820 are placed immediately below the ROOT directory 801.

The classes directory 810 includes a class file ("aaa.class") 811. The class file 811 includes an xlet program. The xlet program is a body of an application program, and its name is recited in the application management table 610 in the BD-J object. The xlet program is, like the BD-J object, a bytecode program written in a compiler language such as the Java language. Xlet programs include a type causing the Java virtual machine to execute the playback process of a title, and another type causing the Java virtual machine to execute the rendering process of graphics video images.

The image directory 820 includes image data to be used for GUI by application programs. The image data includes a JPEG file ("menu.jpg") 821 and a PNG file ("menu.png") 822. The image data represents graphic elements for GUI such as menus, and is equivalent to those used in the European Digital Video Broadcasting-Multimedia Home Platform (DVB-MHP) terminals. The image data especially includes image data that represents the left view and right view of graphic elements.

<<AV Stream File>>

Figure 9A:
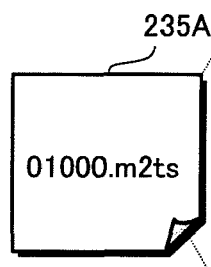
FIGS. 9A and 9B are schematic diagrams showing the elementary streams multiplexed in the first AV stream file 235A and the second AV stream file 235B shown in FIG. 2, respectively.
Figure 9B:
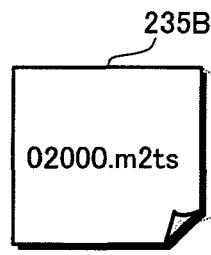

The AV stream files 235A and 235B are digital streams in the MPEG-2 transport stream (TS) format. In each of the AV stream files 235A and 235B, a plurality of elementary streams are multiplexed. FIG. 9A is a schematic diagram showing the elementary streams multiplexed in the first AV stream file 235A, and FIG. 9B is a schematic diagram showing the elementary streams multiplexed in the second AV stream file 235B. With reference to FIGS. 9A and 9B, the first AV stream file 235A includes a left-view video stream 901L, primary audio streams 902A and 902B, presentation graphics (PG) streams 903A and 903B, an interactive graphics (IG) stream 904, a secondary audio stream 905, and a secondary video stream 906. On the other hand, the second AV stream file 235B includes a right-view video stream 901R.

The left-view video stream 901L and the right-view video stream 901R are primary video streams, and respectively represent the left views and the right views of the main images of the movie. The main images mean the images representing the essential portions of the content, such as the main plot of the movie, and in the HDMV mode, it indicates an image that is displayed on the entire screen. On the other hand, the secondary video stream 906 represents the sub-images of the movie. The sub-images mean the images displayed on the screen together with the main images by using Picture-in-Picture effect, such as an image displayed in a small screen within the main images. Each video stream has been encoded by a video compression encoding method such as MPEG-2, MPEG-4, AVC, or SMPTE VC-1. Especially, the left-view video stream 901L has been compressed by the inter-picture predictive encoding between pictures of itself. On the other hand, the right-view video stream 901R has been compressed by the inter-picture predictive encoding between pictures of the left-view video stream 901L and pictures of itself, as well as between pictures of itself.

The primary audio streams 902A and 902B represent primary audios of the movie. The primary audio streams 902A and 902B differ in the language or the audio output format. The secondary audio stream 905 represents a sub-audio to be mixed with the main audio. Each audio stream has been encoded by an encoding method such as AC-3, Dolby Digital Plus ("Dolby Digital" is a trademark), MLP, DTS (Digital Theater System, which is a trademark), DTS-HD, or linear PCM (Pulse Code Modulation).

The PG streams 903A and 903B represent graphics images of subtitles of the movie. The PG streams 903A and 903B in the language for subtitle. The IG stream 904 represents graphic elements for GUI and their respective locations. The IG stream 904 is mainly used to display an interactive screen on the screen 131 of the display device 120 in the HDMV mode.

The elementary streams 901-906 are identified by the packet ID (PID). For example, a hexadecimal value "0x1011" is assigned to the left-view video stream 901L as the PID, and a hexadecimal value "0x1012" is assigned to the right-view video stream 901R as the PID. Any two values in the range from "0x1100" to "0x111F" are respectively assigned to the primary audio streams 902A and 902B as the PIDs. Any two values in the range from "0x1200" to "0x121F" are respectively assigned to the PG streams 903A and 903B as the PIDs. Any value in the range from "0x1400" to "0x141F" is assigned to the IG stream 904 as the PID. Any two values in the range from "0x1200" to "0x121F" are respectively assigned to the PG streams 903A and 903B as the PIDs. Any value in the range from "0x1B00" to "0x1B1F" is assigned to the secondary video stream 906 as the PID. Any value in the range from "0x1A00" to "0x1A1F" is assigned to the secondary audio stream 905 as the PID.

Figure 10:
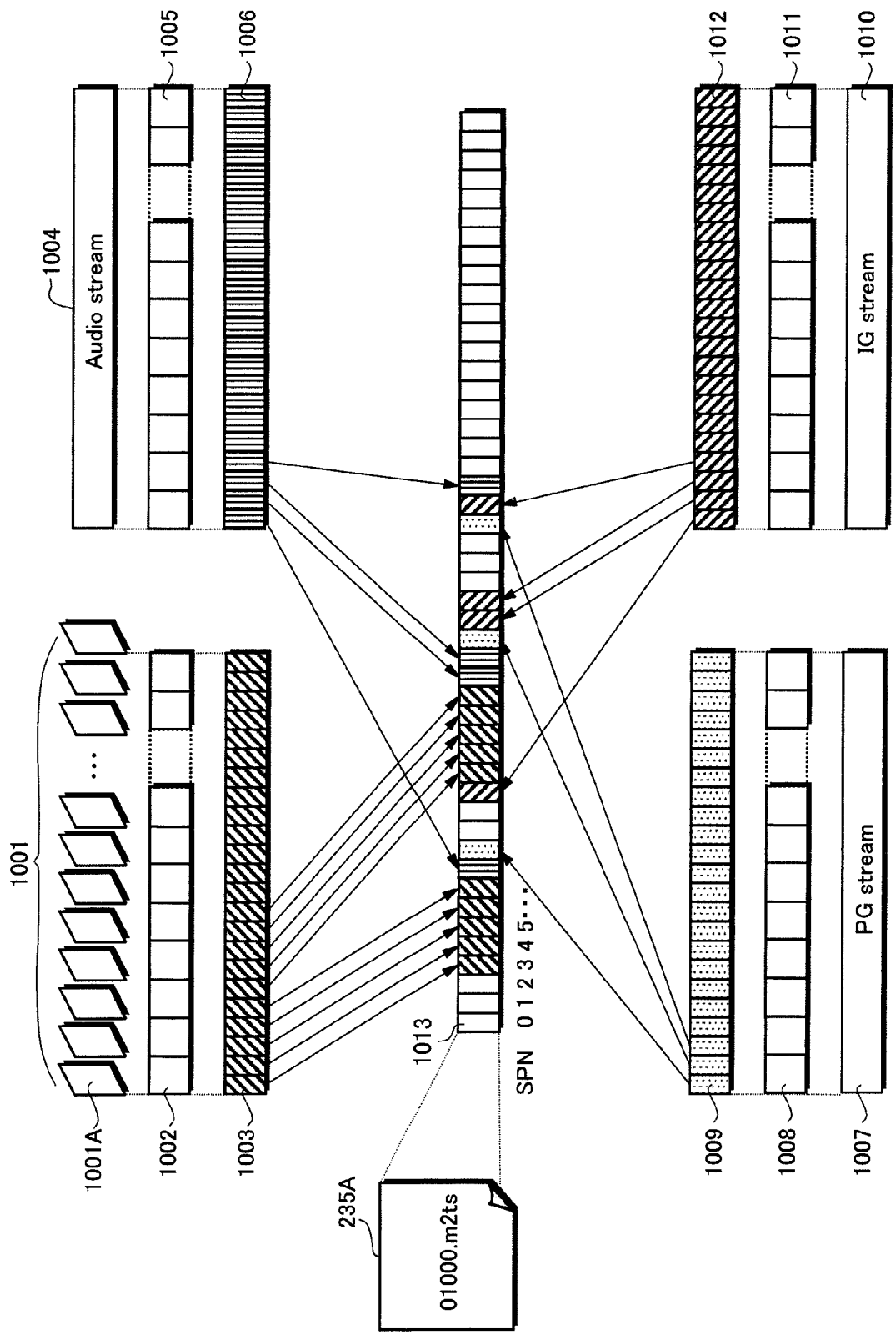
FIG. 10 is a schematic diagram showing the arrangement of the packets of the elementary streams 1001, 1004, 1007, and 1010 multiplexed in the first AV stream file 235A shown in FIG. 2.

FIG. 10 is a schematic diagram showing the arrangement of the packets of the elementary streams 1001, 1004, 1007, and 1010 multiplexed in the first AV stream file 235A. This arrangement also applies to the second AV stream file 235B. The video stream 1001, the audio stream 1004, the PG stream 1007, and the IG stream 1010 are first converted to PES (Packetized Elementary Stream) packet sequences 1002, 1005, 1008, and 1011 respectively, and then converted to TS packet sequences 1003, 1006, 1009, and 1012 respectively. After that, a header is attached to each TS packet individually. Thus, source packets 1013 are generated. Finally, the source packets 1013 are multiplexed into one stream by the time division. In this way, the first AV stream file 235A is structured. Note that, as shown in FIG. 10, in the first AV stream file 235A, the source packets 1013 are assigned with serial numbers in the order from the top one. The serial numbers are called source packet numbers (SPNs). The SPNs are used as the addresses of the source packets 1013 in the first AV stream file 235A.

For example, from the video stream 1001, the TS packet sequence 1003 is obtained as follows. First, a sequence of video frames 1001A constituting the video stream 1001 is converted to a sequence of PES packets 1002. It should be noted here that each video frame 1001A has been encoded as one picture by the above-mentioned video compression encoding method. Furthermore, the sequence of video frames 1001A has been divided into a plurality of GOPs (Groups Of Pictures). Each PES packet 1002 includes a PES header and a PES payload. Each video frame 1001A is compressed as one picture by the above-mentioned video compression encoding method, and is stored into each PES payload. On the other hand, in each PES header, the display time (PTS: Presentation Time Stamp) of the picture that is stored in the PES payload of the same PES packet is stored. The PTS indicates a time at which one frame of data, which is decoded from one elementary stream by a decoder in the playback device 110, is output from the decoder. Next, generally, each PES packet 1002 is converted into a plurality of TS packets 1003. Each TS packet 1003 is a packet having a fixed length, and includes a TS header and a TS payload. The TS header includes a PID of a video stream stored in the corresponding TS payload. Each PES packet is divided into a plurality of pieces, and they are respectively stored in a plurality of TS payloads. This structure of the TS packet also applies to the other elementary streams.

The types of the TS packets contained in the AV stream file include not only those that are converted from the elementary streams shown in FIGS. 9A and 9B, but also a PAT (ProgramAssociation Table), a PMT (Program Map Table), and a PCR (Program Clock Reference). The PCR, PMT, and PAT are defined in European Digital Broadcasting Standard and are intended to specify the partial transport stream constituting a single broadcast program. By using PCR, PMT, and PAT, the AV stream file can be specified in the same way as the partial transport stream. More specifically, the PAT indicates the PID of a PMT included in the same AV stream file. The PID of the PAT itself is 0. The PMT includes the PIDs for the elementary streams representing video, audio, subtitles, etc. included in the same AV stream file, as well as the attribute information of the elementary streams. The attribute information includes the identification information of the codec used in compressing the elementary stream, and includes the frame rate and aspect ratio of the elementary stream. The PMT also includes various descriptors relating to the AV stream file. The descriptors particularly include copy control information showing whether copying of the AV stream file is permitted or not. The PCR stores information indicating the value of an STC (System Time Clock) to be associated with an ATS of the packet. Here, the STC is a clock used as a reference for the PTS and the DTS in a decoder. With the use of PCR, the decoder synchronizes the STC with the ATC (Arrival Time Clock) that is the reference for the ATS. By using PCR, PMT, and PAT, the decoder in the playback device can be made to process the AV stream file in the same way as the partial transport stream conforming to the European Digital Broadcasting Standard. This makes it possible to ensure compatibility between a playback device for the BD-ROM disc 100 and a terminal device conforming to the European Digital Broadcasting Standard.

In an AV stream file, a portion that can be played back seamlessly is called "AV clip". The seamless playback of each AV clip over the entire display time is ensured because, for one thing, PTSs of data stored in the source packets are continuous.

<<Clip Information File>>

Figure 11:
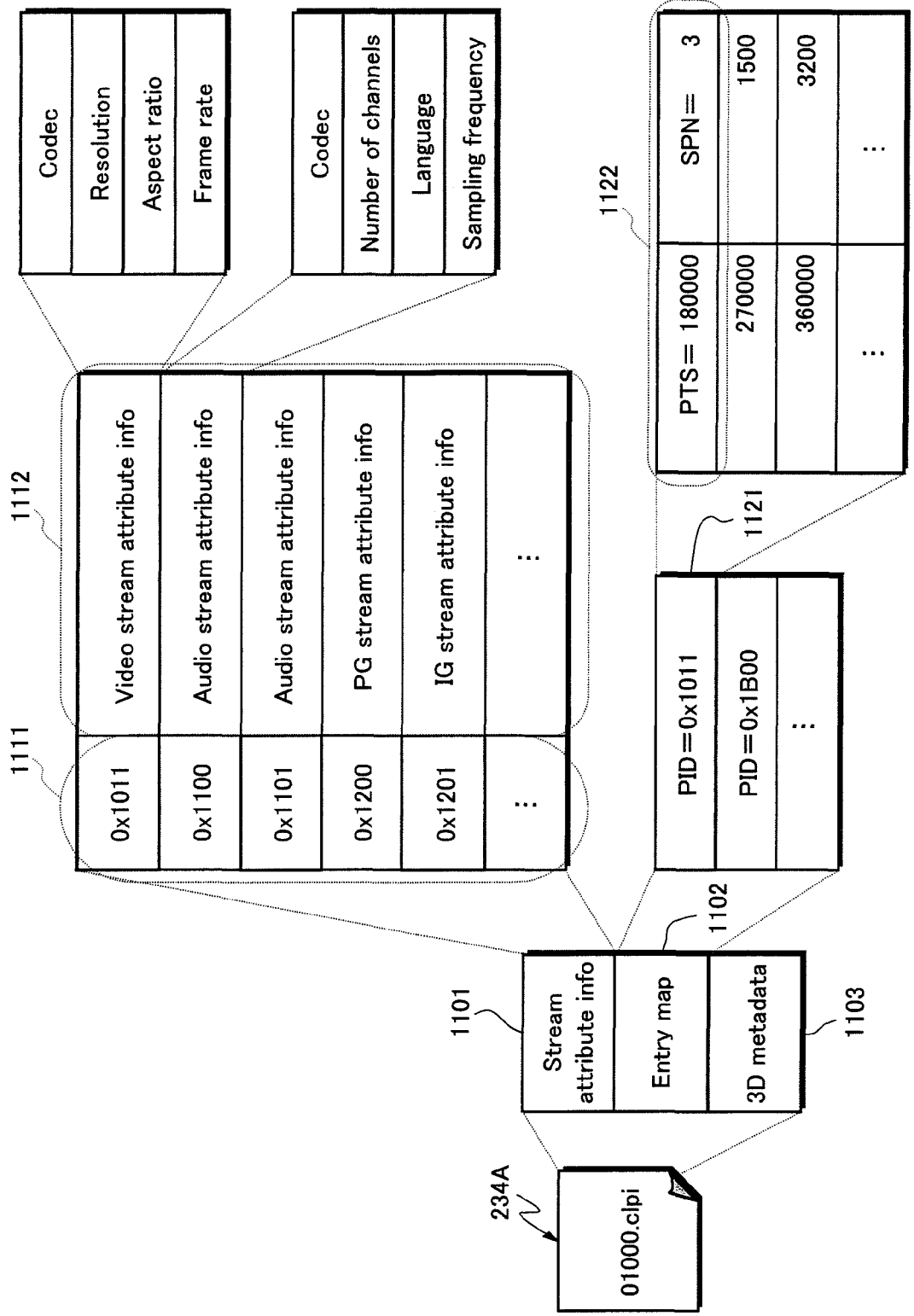
FIG. 11 is a schematic diagram showing the data structure of the first clip information file 234A shown in FIG. 2.

FIG. 11 is a schematic diagram showing the data structure of the first clip information file (01000.clpi) 234A. As shown in FIG. 11, the first clip information file 234A includes stream attribute information 1101, an entry map 1102, and 3D metadata 1103. On the other hand, second clip information file 234B has the same data structure as the first clip information file 234A except for the 3D metadata 1103.

As shown in FIG. 11, the stream attribute information 1101 is a correspondence table associating the PIDs 1111 for each elementary stream included in the first AV stream file 235A with pieces of attribute information 1112. Here, each piece of attribute information 1112 is different depending on whether it corresponds to a video stream, an audio stream, a PG stream, or an IG stream. For example, the piece of attribute information corresponding to the PID 0x1011 for the left-view video stream includes a codec type used for the compression of the video stream, as well as a resolution, an aspect ratio, and a frame rate for the pictures constituting the video stream. On the other hand, the piece of attribute information corresponding to the PID 0x1101 for the primary audio stream includes a codec type used for compressing the audio stream, the number of channels included in the audio stream, a language, and a sampling frequency. The playback device 110 uses these pieces of attribute information 1112 to initialize the decoder.

The right-view stream in the second AV stream file 235B has been compressed by using the left-view stream in the first AV stream file 235A. Therefore, the right-view stream has the same video stream attributes as the left-view stream. That is to say, the piece of attribute information corresponding to the right-view video stream (PID=0x1012) includes the same codec type, resolution, aspect ratio, and frame rate as the piece of attribute information corresponding to the left-view video stream (PID=0x1011) in the first clip information file 234A.

As shown in FIG. 11, the entry map 1102 includes tables 1121 which are respectively assigned to video streams in the first AV stream file 235A. Each table 1121 corresponds to the PID for the assigned video stream. Each table 1121 includes a plurality of entry points 1122. Each entry point 1122 is composed of a pair of PTS and SPN. The PTS is equivalent to the PTS for the top picture (I picture) of any GOP included in the assigned video stream. On the other hand, the SPN paired with the PTS in the same entry point 1122 is equivalent to the top SPN of the source packet group in which that I picture is stored. With reference to the entry map 1102, the playback device 110 can specify the SPN within the first AV stream file 235A corresponding to a scene at an arbitrary point during the playback of the video from the video stream. Especially, to execute trickplay such as fast-forward or rewind, the playback device 110 selectively extracts and decodes source packets with reference to the SPNs in each entry point 1122. As a result, the I picture can be selectively played back. Thus, the playback device 110 can efficiently process trickplays without analyzing the first AV stream file 235A itself.

The second clip information file 234B has a similar structure as the first clip information file 234A. That is to say, the entry map includes a plurality of entry points for the right-view video stream. Each entry point is composed of a pair of PTS and SPN. The PTS is equivalent to the PTS for the top picture (P picture) of any GOP included in the right-view video stream. On the other hand, the SPN paired with the PTS in the same entry point is equivalent to the top SPN of the source packet group in which that P picture is stored. The PTS in each entry point is further equivalent to the PTS in each entry point for the left-view stream indicated by the first clip information file 234A. That is to say, in a pair of corresponding left-view and right-view video streams, whenever an entry point is set in one of a pair of pictures that represent the same scene in the 3D image, an entry point is set in the other of the same pair of pictures. As a result, when the playback device begins an interrupt playback of a 3D video image, it can immediately acquire the top SPN of the source packet group to be played back from the corresponding entry point. In this way, even during playback of 3D video images, it is possible to improve response speed for processes, such as the interrupt playback, that require random access to the video stream.

Figure 12:
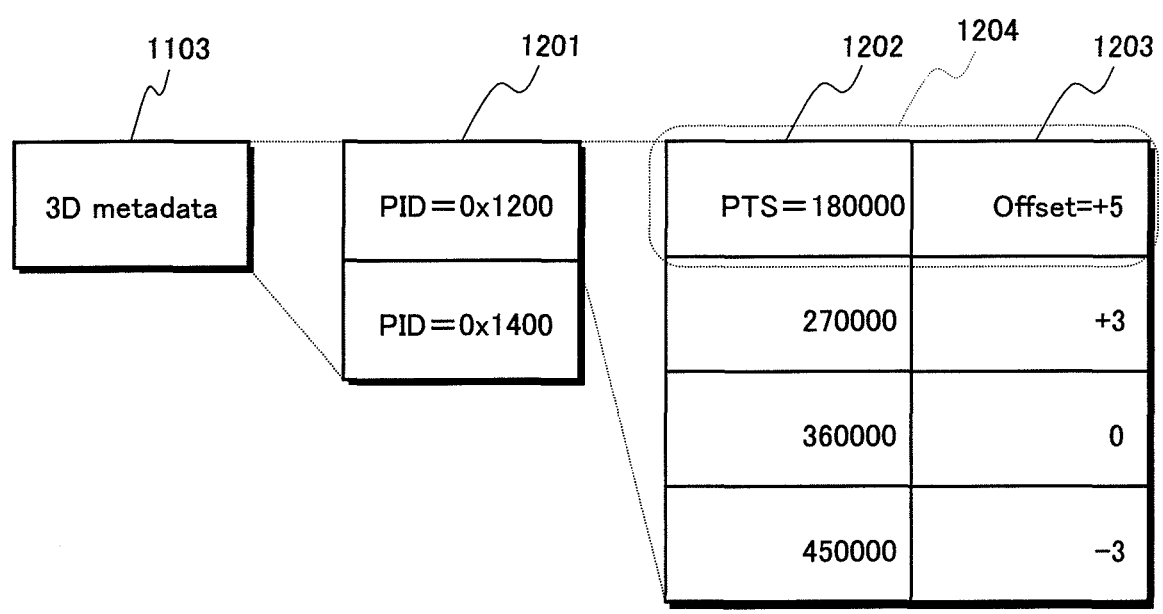
FIG. 12 is a schematic diagram showing the data structure of the 3D metadata 1103 shown in FIG. 11.

FIG. 12 is a schematic diagram showing the data structure of the 3D metadata 1103. The 3D metadata 1103 is information used for the cropping processes on the PG stream 903A and 903B, and IG stream 904 that are multiplexed in the first AV stream file 235A shown in FIG. 9. The "cropping process" refers to a process that adds depth to the 2D video images played back from each stream. During the cropping process, a pair of a left view and a right view is generated by shifting each 2D video image in a horizontal direction. The amount of shifting corresponds to the binocular parallax that generates the depth that should be given to that 2D video image. In particular, the 3D metadata 1103 includes an "offset value" which is a value that represents the amount of shifting by the number of pixels.

As shown in FIG. 12, the 3D metadata 1103 includes a table 1201 for each of (i) PID=0x1200 for the PG stream 903A and (ii) PID=0x1400 for the IG stream 904. Each table 1201 generally includes a plurality of pairs of PTS 1202 and offset value 1203, namely a plurality of offset entries 1204. The PTS 1202 is equivalent to the PTS of one picture that is included in the PG stream 903A and the IG stream 904. The offset value 1203 represents the offset value for the picture to which the PTS 1202 is allocated. The offset values 1203 may be negative values. The valid section of each offset entry 1204 ranges from the PTS of the offset entry to the PTS of the subsequent offset entry. In the example in FIG. 12, the PTS of the first offset entry is 180000, the PTS of the second offset entry is 270000, and the PTS of the third offset entry is 360000. In this case, an offset value "+5" in the first offset entry is valid in an STC range from 180000 to 270000, and an offset value "+3" in the second offset entry is valid in an STC range from 270000 to 360000.

<<Playlist File>>

Figure 13:
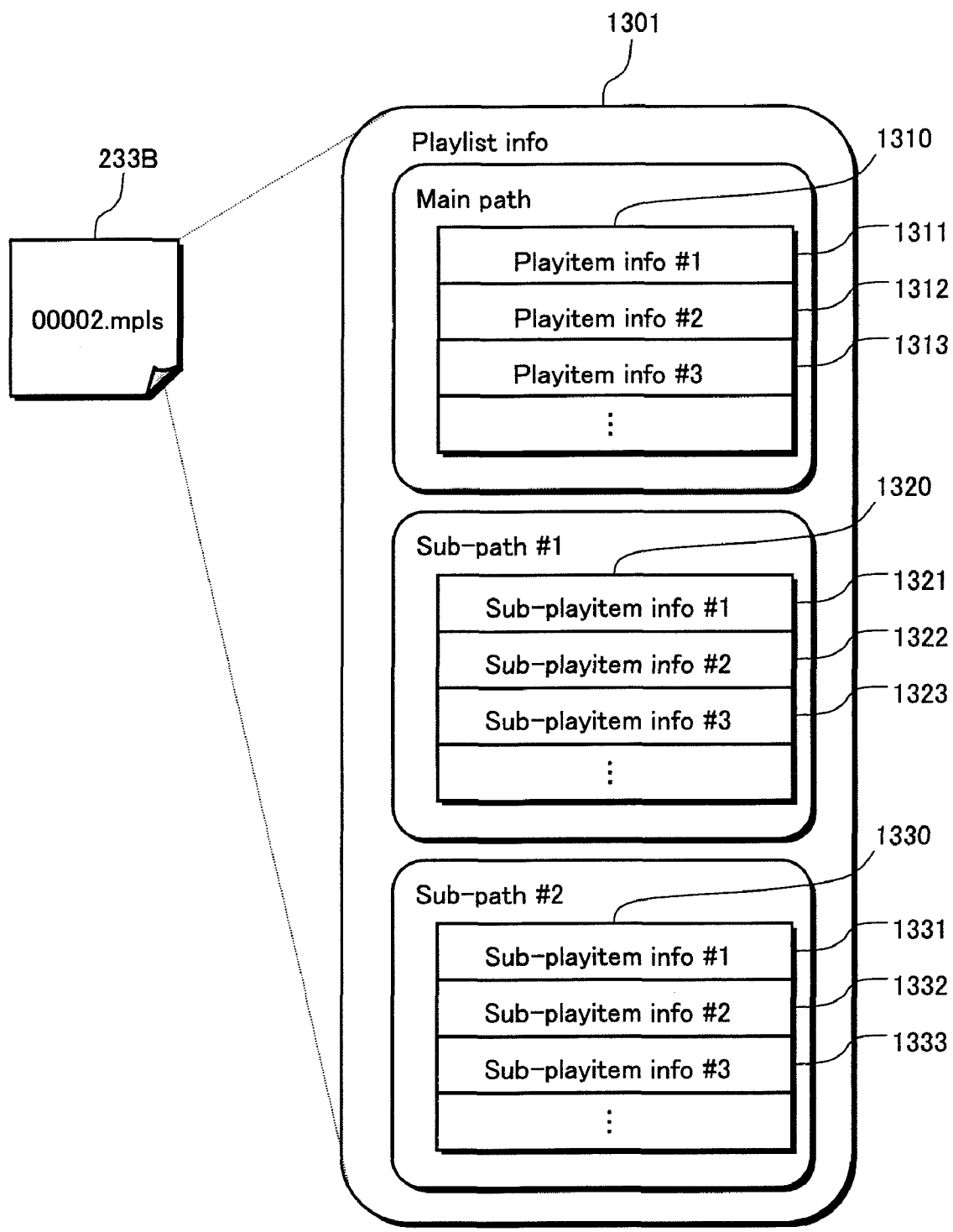
FIG. 13 is a schematic diagram showing the data structure of the second playlist file 233B shown in FIG. 2.

FIG. 13 is a schematic diagram showing the data structure of the second playlist file 233B. With reference to FIG. 13, the second playlist file 2333 includes playlist information 1301. The playlist information 1301 includes main path information 1310 and sub-path information 1320 and 1330. The main path information 1310 includes at least one piece of playitem information, and in this example, includes playitem information 1311, 1312, 1313, .... Each of the playitem information 1311-1313 defines playback sections of the first AV stream file 235A, namely, portions to be played back continuously. The playitem information 1311-1313 are further assigned with serial numbers #1, #2, #3, ... in the playback order of the playback sections. The sub-path information 1320 and 1330 are respectively assigned with unique identifiers, namely sub-path IDs "#1" and "#2". The sub-path information 1320 with sub-path ID=#1 includes at least one piece of sub-playitem information, and in this example, includes sub-playitem information 1321, 1322, 1323, .... Each of the sub-playitem information 1321-1323 defines playback sections of the second AV stream file 235B. The sub-playitem information 1321-1323 are further assigned with serial numbers #1, #2, #3, ... in the playback order of the playback sections. The sub-path information 1330 with sub-path ID=#2 includes at least one piece of sub-playitem information, and in this example, includes sub-playitem information 1331, 1332, 1333, .... Each of the sub-playitem information 1331-1333 defines other playback sections of both the first AV stream file 235A and the second AV stream file 235B, or defines playback sections of another AV stream file that is different from the stream files 235A and 235B. The sub-playitem information 1331-1333 are further assigned with serial numbers #1, #2, #3, ... in the playback order of the playback sections.

Figure 14:
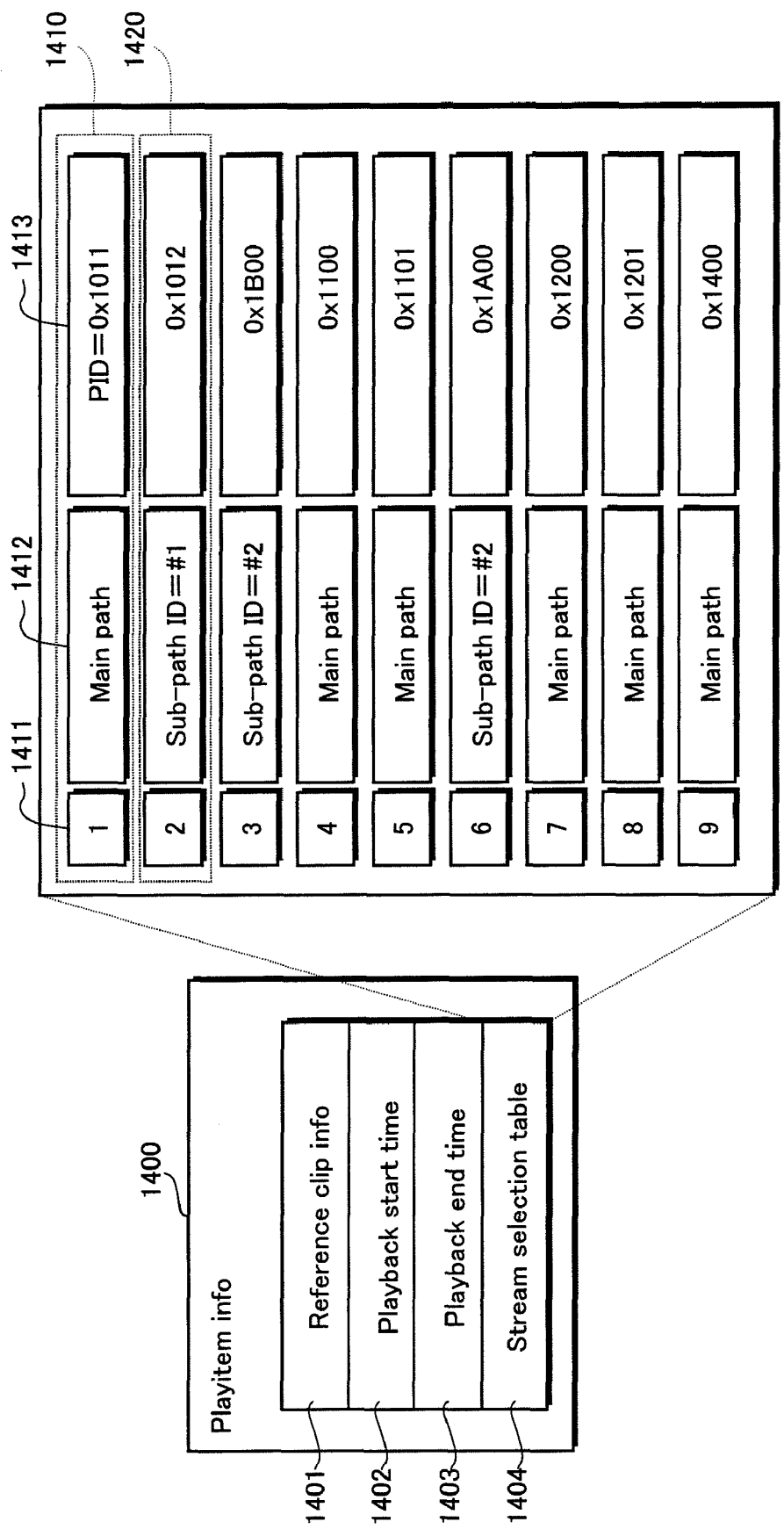
FIG. 14 is a schematic diagram showing the data structure of the playitem information 1400 shown in FIG. 13.

FIG. 14 is a schematic diagram showing the data structure of the playitem information 1400. With reference to FIG. 14, the playitem information 1400 includes reference clip information 1401, a playback start time 1402, a playback end time 1403, and a stream selection table 1404. It should be noted here that the sub-playitem information has the same data structure as the playitem information, except for the stream selection table.

The reference clip information 1401 is information for identifying a clip information file that is to be used for converting PTSs to SPNs. The playback start time 1402 and the playback end time 1403 respectively indicate the PTSs of the top and the end of the section of the AV stream file to be decoded. The playback device 110 refers to the entry map from the clip information file indicated by the reference clip information 1401, and obtains SPNs respectively corresponding to the playback start time 1402 and the playback end time 1403. From the obtained SPNs, the playback device 110 identifies the AV clip that is to be read from the AV stream file and starts to play back the AV clip.

The stream selection table 1404 shows a list of elementary streams that the decoder in the playback device 110 can select from the AV stream file during the time between the playback start time 1402 and the playback end time 1403. The stream selection table 1404 particularly includes a plurality of stream entries 1410, 1420, .... Each of the stream entries 1410, 1420, ... includes a stream selection number 1411, stream path information 1412, and stream identification information 1413. The stream identification information 1413 indicates the PID of a corresponding one of the elementary streams that can be selected during the time between the playback start time 1402 and the playback end time 1403. The stream selection number 1411 is a serial number assigned to the stream entry 1410, and used by the playback device 110 to identify elementary streams to be selected. Each piece of stream path information 1412 shows a clip information file assigned to an AV stream file to which an elementary stream specified by the stream identification information 1413 belongs. For example, if the stream path information 1412 shows "main path," the corresponding clip information file is indicated by the reference clip information 1401. If the stream path information 1412 shows "sub-path ID=#1, the corresponding clip information file is indicated by the reference clip information of a piece of sub-playitem information included in the sub-path information whose sub-path ID=#1. Here, the piece of sub-playitem information defines a playback section included between the playback start time 1402 and the playback end time 1403. Especially, since the second playlist file 233B is a 3D playlist file, the playitem information thereof includes, without fail, (i) the stream entry 1410 that indicates PID=0x1011 of the left-view video stream and (ii) the stream entry 1420 that indicates PID=0x1012 of the right-view video stream. Note that, although not shown in FIG. 14, each of the stream entries 1410 and 1420 stores attribute information of each elementary stream. For example, the attribute information of the video stream indicates the resolution and the frame rate, and the attribute information of the audio stream, PG stream, and IG stream indicates a language type.

Figure 15:
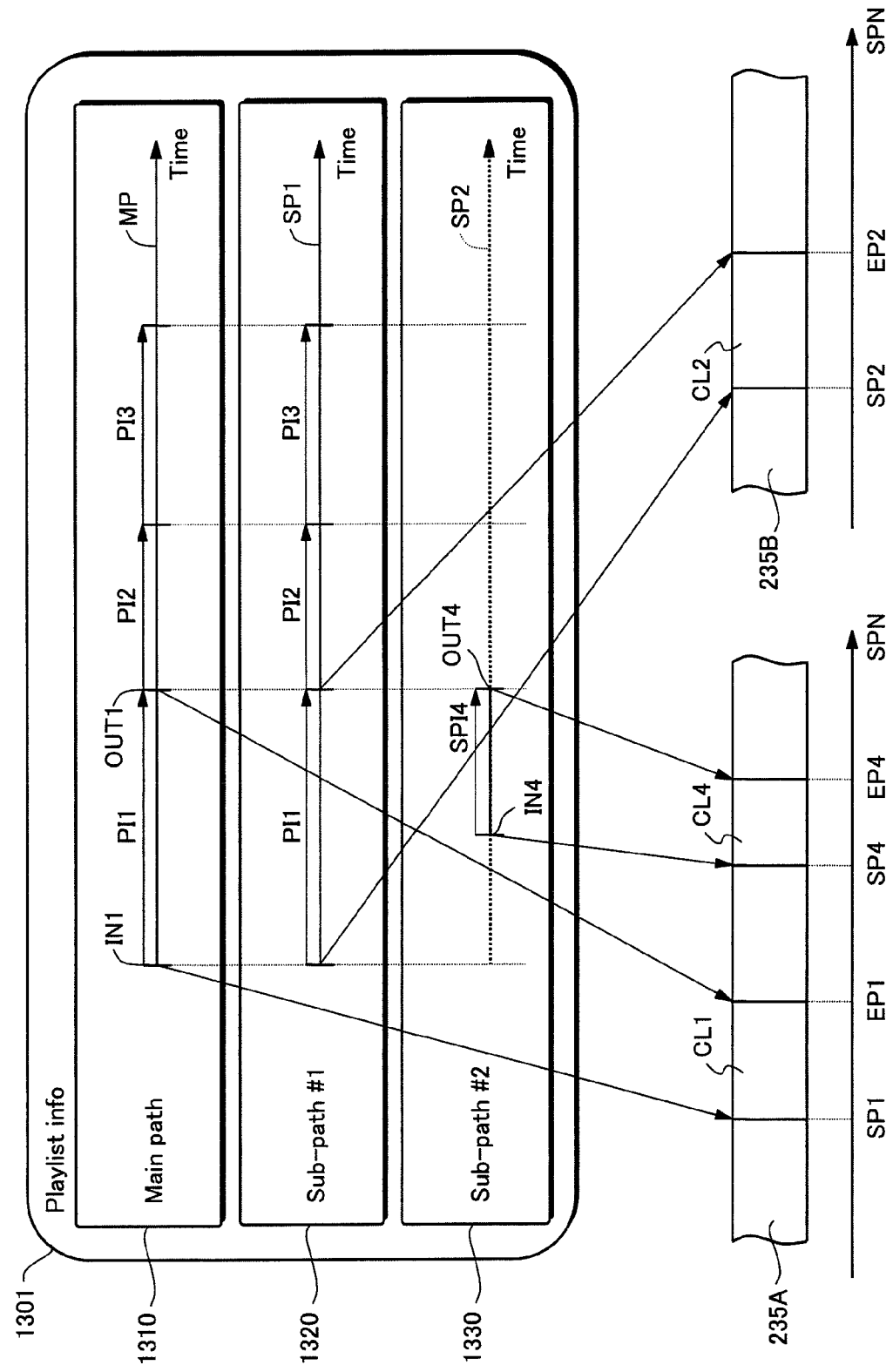
FIG. 15 is a schematic diagram showing the playlist information 1301 shown in FIG. 13 and the AV clips CL1, CL2, and CL4 that are to be played back in accordance with the playlist information 1301.

FIG. 15 is a schematic diagram showing the playlist information 1301 shown in FIG. 13 and the AV clips CL1, CL2, and CL4 that are to be played back in accordance with the playlist information 1301. The three time axes MP, SP1 and SP2 shown in FIG. 15 respectively represent playback times of the video streams that are respectively played back in accordance with the main path information 1310, the sub-path information #1 1320, and the sub-path information #2 1330.

In the playback process in accordance with the playlist information 1301, first the playitem information 1311-1313 are referenced in the order of the serial numbers #1 to #3. For example, when the playitem information #1 1311 is referenced, from the entry map of the first clip information file 234A indicated by the reference clip information 1401 thereof, an entry point including a PTS that is equivalent to the playback start time IN1 is detected. Then the SPN of the entry point is identified as the start address SP1. Similarly, an entry point including a PTS that is equivalent to the playback end time OUT1 is detected, and the SPN of the entry point is identified as the end address EP1. In this way, in the playback section PI1 ranging from the playback start time IN1 to the playback end time OUT1, the portion ranging of the first AV stream file 235A from the start address SP1 to the end address EP1, namely the first AV clip CL1 is identified as the subject to be played back. Following this, by using the stream attribute information 1101 of the first clip information file 234A, elementary streams that can be played back by both the playback device 110 and the display device 120 are detected from among the elementary streams recorded in the stream selection table 1404 of the playitem information #1 1311. Then, an elementary stream having the smallest value of the stream selection number 1411 is selected from among the detected elementary streams, and the PID described in the stream identification information 1413 in the stream entry 1410 indicated by the stream selection number 1411 is set in the decoder in the playback device 110. As a result of this, a source packet with the set PID in the first AV clip CL1 is decoded by the decoder. Similarly, playitem information #2 1312, #3 1313, ... are referenced in the stated order, and the source packets are decoded from the AV clip belonging to the first AV stream file 235A, in the playback sections P12, P13, . . . each from the playback start time to the playback end time.

In the stream selection table 1404 in each of the playitem information 1311-1313, the stream entry 1420 including PID=0x1012 of the right-view video stream indicates "sub-path ID=#1" as the stream path information. This enables the playback device 110 to reference the sub-play item information 1321-1323 in the sub-path information 1320 in the order of the serial numbers #1-#3, in parallel with the playback process in accordance with the main path information 1310. It should be noted here that the sub-play item information 1321-1323 correspond to the playitem information 1311-1313 on a one-to-one basis. Furthermore, the sub-play item information 1321-1323 and the corresponding playitem information 1311-1313 have the playback start time and the playback end time in common. For example, when the sub-playitem information 1321 is to be referenced, first an entry point including a PTS equivalent to the playback start time IN1 is detected from the entry map of the second clip information file 234B indicated by the reference clip information thereof. Next, the SPN of the entry point is identified as the start address SP2. Similarly, the SPN of an entry point including the PTS equivalent to the playback end time OUT1 is identified as the end address EP2. In this way, in the playback section PI1 ranging from the playback start time IN1 to the playback end time OUT1, the portion of the second AV stream file 235B ranging from the start address SP2 to the end address EP2, namely the second AV clip CL2 is identified as the subject to be played back. Following this, by using the stream attribute information of the second clip information file 234B, elementary streams that can be played back by both the playback device 110 and the display device 120 are detected from among the elementary streams recorded in the stream selection table 1404 of the playitem information #1 1311. Then, an elementary stream having the smallest value of the stream selection number is selected from among the detected elementary streams, and the PID described in the stream identification information in the stream entry indicated by the stream selection number is set in the decoder in the playback device 110. As a result of this, a source packet with the set PID in the second AV clip CL2 is decoded by the decoder. It should be noted here that the decoding process is performed in parallel with the decoding process of the source packet from the first AV clip CL1. Similarly, sub-playitem information #2 1322, #3 1323, . . . are referenced in the stated order, and the source packets are decoded from the AV clip belonging to the second AV stream file 235B, in correspondence with the playback sections P12, P13, . . . .

When the stream selection table 1404 of the playitem information 1311 includes a stream entry that indicates "sub-path ID=#2" as the stream path information, the sub-playitem information #1 1331 included in the sub-path information #2 1330 is referenced. Here, the sub-playitem information #1 1331 is detected based on the condition: "playback section SPI4 from the playback start time IN4 to the playback end time OUT4 is included in the playback section PI1 of the playitem information #1". Next, in a similar manner in which the first AV clip CL1 is identified from the playback section PI1 of the playitem information #1 1311, the start address SP4 and the end address EP4 of the fourth AV clip CL4 are identified from the playback section SPI4 of the sub-playitem information #1 1331. Thus, in the playback section SPI4 of the sub-playitem information #1 1331, a source packet is decoded from the fourth AV clip CL4, as well as from the first AV clip CL1 and the second AV clip CL2.

As described above, in the second playlist file 233B, the main path information 1310 defines the playback path of the first AV stream file 235A as a permutation of the playitem information 1311-1313, and the sub-path information 1320 defines the playback path of the second AV stream file 235B as a permutation of the sub-playitem information 1321-1323. In this way, the 3D playlist file defines the playback paths of the AV stream files for the left view and the right view, by the combination of the main path information and the sub-path information. The playlist file may further include the sub-path information such as the sub-path information 1330 shown in FIG. 13. The sub-path information defines another playback path of the AV stream file that is to be played back in correspondence with the playback path of the AV stream file defined by the main path information 1310, or defines a playback path of another AV stream file. Note that the first playlist file 233A has a similar data structure to the second playlist file 233B, except that it does not include the sub-path information defining the playback path of the right-view AV stream file.

<<Hardware Structure of Playback Device>>

Figure 16:
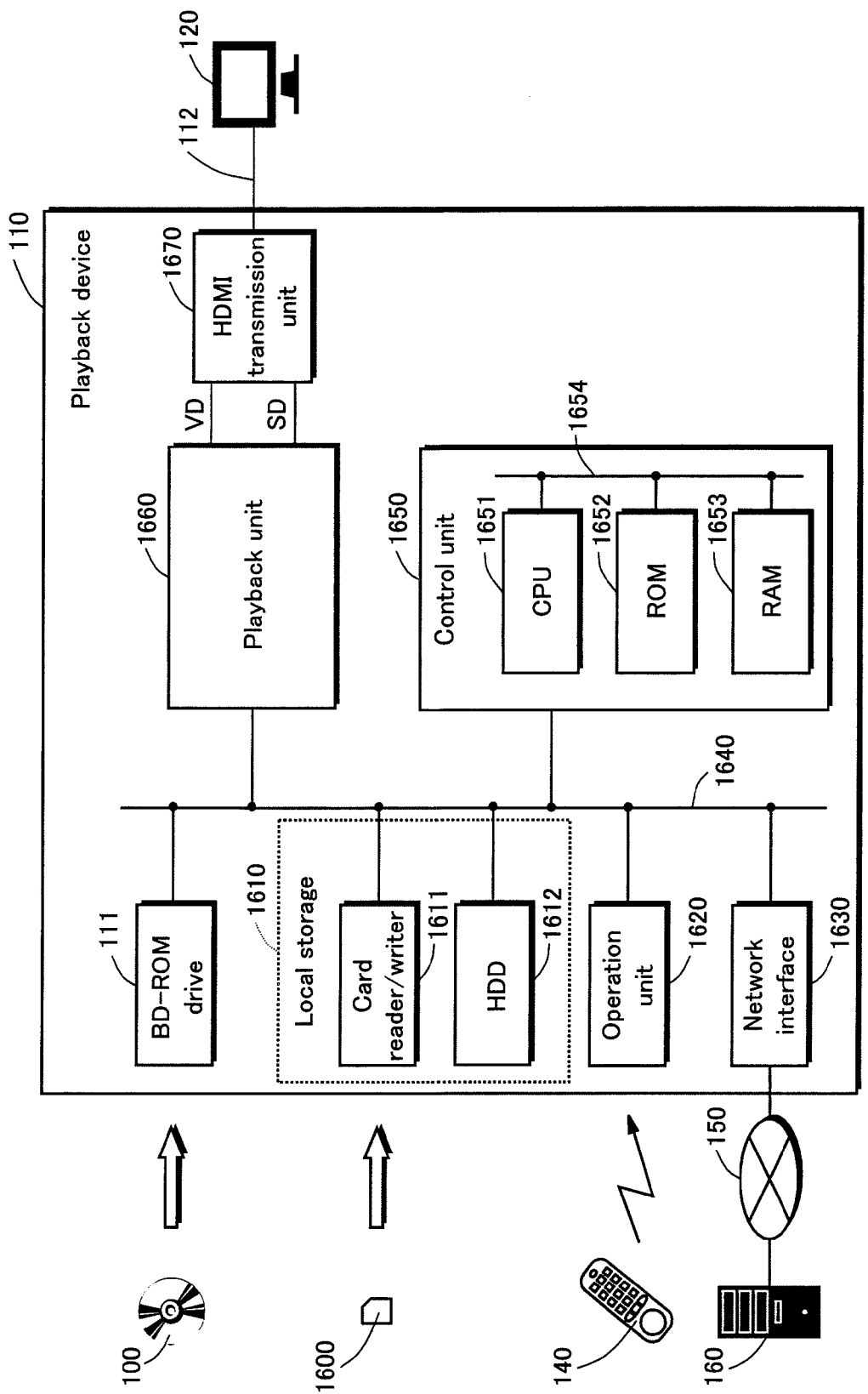
FIG. 16 is a block diagram showing the hardware structure of the playback device 110 in Embodiment 1 of the present invention.

FIG. 16 is a block diagram showing the hardware structure of the playback device 110. As shown in FIG. 16, the playback device 110 includes a BD-ROM drive 111, a local storage 1610, a card reader/writer 1611, an operation unit 1620, a network interface 1630, a bus 1640, a control unit 1650, a playback unit 1660, and an HDMI transmission unit 1670. The BD-ROM drive 111, local storage 1610, operation unit 1620, and network interface 1630 can communicate with the control unit 1650 and the playback unit 1660 via the bus 1640. Also, the control unit 1650 and the playback unit 1660 can communicate with each other via the bus 1640. The control unit 1650 and the playback unit 1660 are implemented on different integrated circuits, respectively. Not limited to this, however, the control unit 1650 and the playback unit 1660 may be implemented on the same single integrated circuit.

The BD-ROM disc 100 can be loaded into the BD-ROM drive 111. While the BD-ROM disc 100 is loaded in the BD-ROM drive 111, the BD-ROM drive 111 reads data from the BD-ROM disc 100 in accordance with an instruction from the control unit 1650. More specifically, the BD-ROM drive 111 is equipped with an optical pickup, namely an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the BD-ROM disc 100. The collected beam is reflected and diffracted by the recording layer. The reflected and diffracted light passes the objective lens, the beam splitter, and the collecting lens to be collected onto the optical detector. The optical detector generates a playback signal at a level in accordance with the amount of the collected light. Furthermore, data recorded on the BD-ROM disc 100 is demodulated from the playback signal. Specifically, the BD-ROM drive 111 reads data from the volume area 212 of the BD-ROM disc 100, and transfers the data to the local storage 1610, control unit 1650, or playback unit 1660.

The local storage 1610 is a rewritable storage device embedded in the playback device 110. In the example shown in FIG. 16, the local storage 1610 includes a card reader/writer 1611 and an HDD 1612. A memory card 1600 can be inserted into the card reader/writer 1611. The card reader/writer 1611 can write data onto and read data from the memory card 1600 inserted therein. The HDD 1612 is embedded in the playback device 110. Not limited to the structure, the HDD 1612 may be portable. Furthermore, although not shown in FIG. 16, an external HDD may be connected with the bus 1640 via a predetermined interface to be used as the local storage 1610. The local storage 1610 stores additional contents or browser screens that are downloaded by the BD-Live function from the server device 160 on the external network 150. Other than these, the local storage 1610 may store parameters, tables and the like to be used by the control unit 1650.

The operation unit 1620 detects various types of events, and notifies the control unit 1650 of the contents of the detected events. For example, the operation unit 1620 receives a command, that has been transmitted wirelessly via infrared rays or the like, from the remote control 140, decodes the contents of the received command, and notifies the control unit 1650 of the decoded contents. The operation unit 1620 further detects an operation of pressing a button such as a playback start, pause, fast-forward, or winding provided on the front panel of the playback device 110, identifies an instruction corresponding to the pressed button, and notifies the control unit 1650 of the identified instruction. The operation unit 1620 still further detects an operation of inserting or removing the recording medium 100 into/from the BD-ROM drive 111, and notifies the control unit 1650 of the detected operation.

The network interface 1630 connects between the external network 150 and the bus 1640 such that they can communicate with each other. The control unit 1650 can communicate with the server device 160 on the external network 150 via the network interface 1630. This communication function is used for the BD-Live function.

The control unit 1650 is a micro computer system, and includes a CPU 1651, a ROM 1652, and a RAM 1653. These elements are connected with each other via an internal bus 1654. The ROM 1652 stores programs for controlling the basic operations of the playback device 110, namely stores firmware. The firmware includes device drivers of the elements 111 and 1610-1660 connected with the bus 1640. The CPU 1651, for example, reads the firmware from the ROM 1652 when the power is turned on, and executes the firmware. This enables the elements 111 and 1610-1660 to be initialized, and the Java platform, namely, an environment for executing BD-J objects to be prepared. The RAM 1653 provides the CPU 1651 with a work area. The control unit 1650 executes the firmware and application programs by using the combination of the elements 1651-1653, and then controls the other elements in accordance with the firmware and application programs.

The control unit 1650 especially reads a desired title from the content recorded in the recording medium 100 or the local storage 1610, and causes the external network 150 to play back the title. More specifically, the control unit 1650 first reads the playlist information corresponding to the title to be played back, namely, reads the current playlist information from the recording medium 100 or the control unit 1650. The control unit 1650 then selects a playback-target AV clip, namely a current AV clip, in accordance with the current playlist information. Next, the control unit 1650 causes the BD-ROM drive 111 or the local storage 1610 to supply the current AV clip to the playback unit 1660.

Furthermore, the control unit 1650 in the BD-J mode, in accordance with the application programs, generates graphic elements for GUI, such as menus, as image data in JPEG or PNG format, and then supplies the image data to the playback unit 1660. In the BD-J mode, the control unit 1650 also realizes the BD-Live functions in accordance with the application programs. That is to say, the control unit 1650 downloads image data representing browser screens or the likes from the server device 160 on the external network 150 via the network interface 1630, and supplies the image data to the playback unit 1660.

The playback unit 1660, in accordance with an instruction from the control unit 1650, reads the current AV clip from the BD-ROM drive 111 or the local storage 1610. The playback unit 1660 further divides an elementary stream with a predetermined PID from the AV clip, and decodes the elementary stream. The predetermined PID is preliminarily specified by the control unit 1650. As a result of the decoding process, a video plane is generated from the video stream, audio data AD is generated from the audio stream, a PG plane is generated from the PG stream, and an IG plane is generated from the IG stream. Following this, the playback unit 1660 synthesizes these planes into one video frame. Furthermore, in the BD-J mode, the image data supplied from the control unit 1650 is also synthesized into the video frame. The playback unit 1660 structures video data VD from the video frame after the synthesizing process, and transmits the video data VD to the HDMI transmission unit 1670, together with the audio data AD.

The HDMI transmission unit 1670 is connected with the display device 120 by an HDMI cable 112. The HDMI transmission unit 1670 receives the video data VD from the playback unit 1660, and converts the received video data into a video signal in the HDMI format. Especially, in the case of the video signal, both the left-view and the right-view video frames are multiplexed into the video signal in time division. On the other hand, the HDMI transmission unit 1670 receives the audio data AD from the playback unit 1660, and converts the received audio data into an audio signal in the HDMI format. The HDMI transmission unit 1670 further multiplexes a synchronization signal and attached data with the converted video and audio signals, and transmits the result of the multiplexing to the display device 120 via the HDMI cable 112. In so doing, the HDMI transmission unit 1670 encrypts the transmission data by a protocol conforming to the HDCP (High-bandwidth Digital Content Protection), and performs a mutual authentication with the display device 120. Note that the HDMI transmission unit 1670 may be embedded in the playback unit 1660. Also, the audio signal may be, separately from the video signal, transmitted to an external amplifier or speaker connected with the display device 120 as in a surround system.

<Structure of Control Unit 1650>

Figure 17:
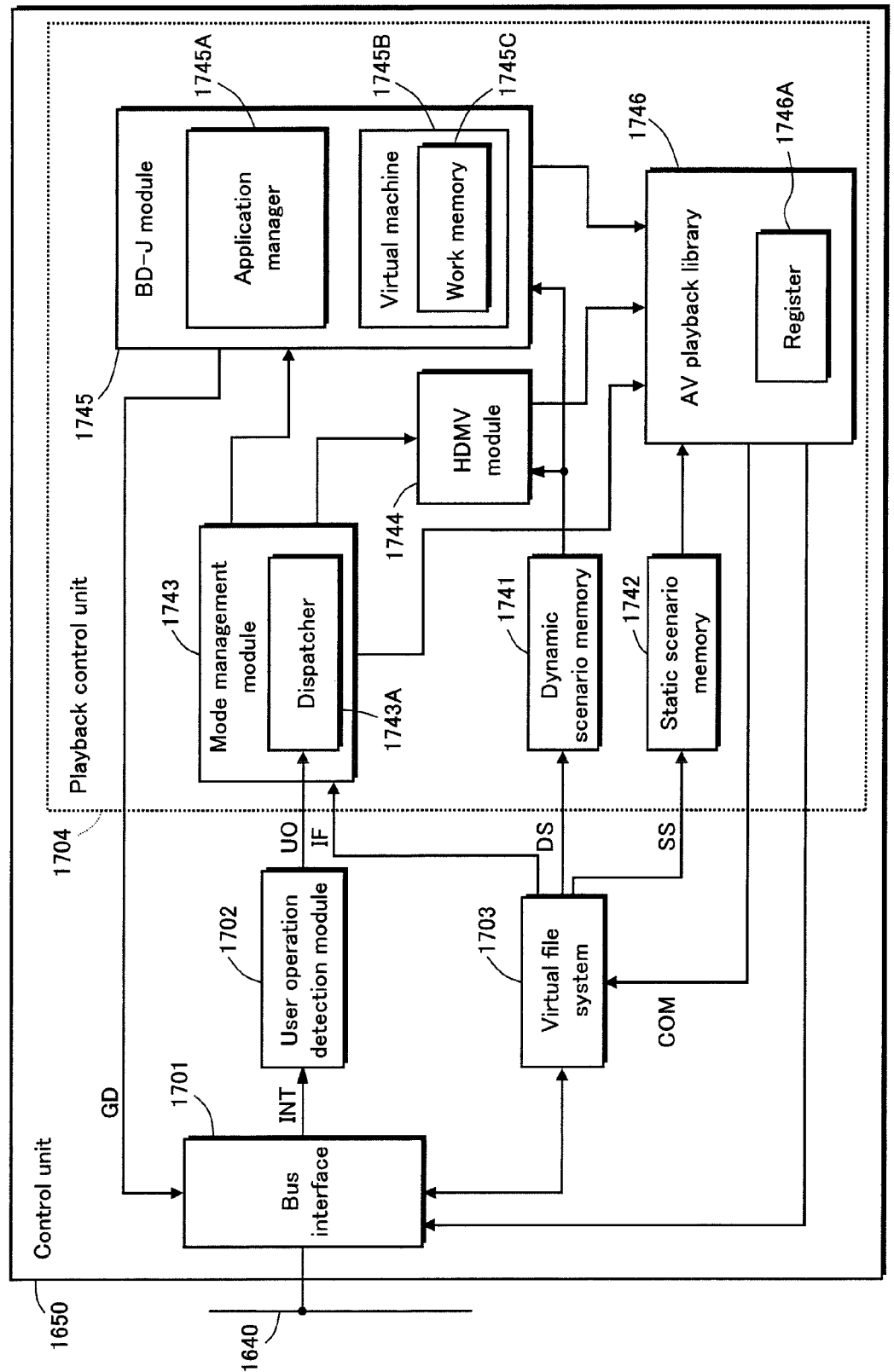
FIG. 17 is a functional block diagram showing the structure of the control unit 1650 shown in FIG. 16.

FIG. 17 is a functional block diagram showing the structure of the control unit 1650. As shown in FIG. 17, the control unit 1650 includes a bus interface 1701, a user operation detection module 1702, a virtual file system 1703, and a playback control unit 1704. The control unit 1650 realizes the functional units 1701-1704 by executing firmware embedded therein.

The bus interface 1701 connects each functional unit in the control unit 1650 with the elements 111, 1610-1640, and 1660 shown in FIG. 16 via the bus 1640 so that they can communicate with each other. Especially, the bus interface 1701, in accordance with an instruction from the virtual file system 1703, reads scenario information of the playback target, namely current scenario information DS and SS, from the BD-ROM drive 111 and passes them to the playback control unit 1704. Here, the scenario information includes dynamic scenario information DS and static scenario information SS. The dynamic scenario information DS includes a movie object file, BD-J object file, and JAR file. The static scenario information SS includes a playlist file and clip information file.

The user operation detection module 1702 receives a notification INT from the operation unit 1620, and identifies a user operation and a type of event from the notification INT. The user operation detection module 1702 further transmits an operation signal UO indicating the type of event to the playback control unit 1704. Here, the types of events include an insertion/removal of the recording medium 100 into/from the BD-ROM drive 111, and pressing a button such as a playback start, pause, fast-forward, or winding provided on the front panel of the playback device 110.

The virtual file system 1703 manages the access by the playback control unit 1704 to the files stored in the recording medium 100 and the local storage 1610. Especially, the virtual file system 1703 builds a virtual package from the contents stored in the recording medium 100 and the additional contents stored in the local storage 1610. The "virtual package" is a directory/file structure virtually built in the RAM 1653 so as to be equivalent to the directory/file structure 214 on the BD-ROM disc 100 as shown in FIG. 2. The application program accesses the recording medium 100 and the local storage 1610 via the virtual file system 1703. This makes it possible for the contents recorded on them to be treated as contents that are present in the same virtual package.

The virtual file system 1703 further reads an index file IF from the virtual package in accordance with an instruction COM from the playback control unit 1704, and passes the index file IF to the playback control unit 1704. After that, the virtual file system 1703 manages the access to the files stored in the virtual package in accordance with the instruction COM from the playback control unit 1704 and the operation signal UO from the user operation detection module 1702. For example, the virtual file system 1703 reads the current scenario information DS and SS from the virtual package, and passes them to the playback control unit 1704. Other than this, in accordance with the instruction COM from the playback control unit 1704, the virtual file system 1703 causes the BD-ROM drive 111 or the local storage 1610 to supply the current AV clip to the playback unit 1660.

The playback control unit 1704 executes the firmware to create an environment for executing an application program, and further in the environment, reads the application program from the dynamic scenario information DS and executes the application program. And in accordance with the application program, the playback control unit 1704 controls the elements of the playback device 110.

With reference to FIG. 17, the playback control unit 1704 includes a dynamic scenario memory 1741, a static scenario memory 1742, a mode management module 1743, an HDMV module 1744, a BD-J module 1745, and an AV playback library 1746.

The dynamic scenario memory 1741 and the static scenario memory 1742 are both buffer memories embedded in the control unit 1650. Different areas in the RAM 1653 are allocated to the buffer memories 1741 and 1742, respectively. Not limited to this, however, the buffer memories 1741 and 1742 may be independent memory elements. The dynamic scenario memory 1741 stores the dynamic scenario information DS, and the static scenario memory 1742 stores the static scenario information SS.

The mode management module 1743 receives the index file IF from the virtual file system 1703, and stores the index file IF. The mode management module 1743 further uses the index file IF to control switching between operation modes of the playback device 110 which follows switching between titles. More specifically, the mode management module 1743 first selects an item from the index table in the index file IF, in accordance with the operation signal UO from the user operation detection module 1702. When the selected item specifies a movie object, the mode management module 1743 assigns the current dynamic scenario information DS to the HDMV module 1744. Thus, the operation mode of the playback device 110 transits to the HDMV mode. On the other hand, when the selected item specifies a BD-J object, the mode management module 1743 assigns the current dynamic scenario information DS to the BD-J module 1745. Thus, the operation mode of the playback device 110 transits to the BD-J mode. Furthermore, when the operation signal UO from the user operation detection module 1702 indicates switching between the operation modes, or when a request to switch between operation modes is received from the HDMV module 1744 or the BD-J module 1745, the mode management module 1743 switches the module to which the current dynamic scenario information DS is assigned, between the HDMV module 1744 and the BD-J module 1745.

The mode management module 1743 includes a dispatcher 1743A. The dispatcher 1743A receives operation signals UO from the user operation detection module 1702, selects, from the received operation signals UO, operation signals UO that suit for the current operation mode, and passes the selected operation signals UO to the HDMV module 1744 or the BD-J module 1745 to which the current dynamic scenario information DS is assigned. For example, when a received operation signal UO indicates the fast-forward/rewind playback, the dispatcher 1743A passes the operation signal UO to the HDMV module 1744 in the HDMV mode, and to the BD-J module 1745 in the BD-J mode. On the other hand, when a received operation signal UO indicates the insertion of the recording medium 100 into the BD-ROM drive 111, the dispatcher 1743A transmits the instruction COM to the virtual file system 1703 via the AV playback library 1746, which instructs the virtual file system 1703 to read the index file IF. When the index file IF is read in accordance with the instruction, the index file IF is stored in the mode management module 1743.

The HDMV module 1744 is a virtual DVD player, and controls the process of playing back a title from the recording medium 100 in the same manner as a general DVD player controls the playback process. More specifically, the HDMV module 1744 reads a movie object from the dynamic scenario information DS in the dynamic scenario memory 1741, and executes the navigation commands contained in the movie object in the arrangement order thereof. With this operation, the HDMV module 1744 specifies processes indicated by the navigation commands, to the AV playback library 1746 in order.

The BD-J module 1745 is a Java platform, and includes an application manager 1745A and a virtual machine 1745B.

The BD-J module 1745, in response to an instruction from the mode management module 1743, reads a BD-J object from the dynamic scenario information DS in the dynamic scenario memory 1741. The application manager 1745A, in accordance with the application management table 410 in the BD-J object, instructs the virtual machine 1745B to start or terminate the application programs.

The virtual machine 1745B is a Java virtual machine, and has a work memory 1745C embedded therein. An area of the RAM 1653 is allocated to the work memory 17450. When the virtual machine 1745B is instructed from the application manager 1745A to start an application program, the virtual machine 1745B reads a JAR file that contains the application program from the dynamic scenario information DS, and expands the JAR file in the work memory 1745C. The virtual machine 1745B further reads an xlet program to be activated from a class file that has been expanded in the work memory 17450, and then executes the xlet program. Thus, methods contained in the xlet program are converted into native codes for the CPU 1651, and the native codes are passed to the AV playback library 1746. As a result, instructions on processes in accordance with the application program are provided to the AV playback library 1746. On the other hand, the virtual machine 1745B, when instructed by the application manager 1745A to terminate an application program, deletes an xlet program that is the body of the application program from the work memory 1745C after the termination process of the application program or forcibly.

Processes in accordance with application programs include BD-Live processes and graphics processes, as well as the processes for playing back titles.

In the BD-Live processes, the virtual machine 1745B, in accordance with an application program, causes the network interface 1630 to download additional contents from the server device 160 to the local storage 1610, or download browser screens to the playback unit 1660.

In the graphics processes, the virtual machine 1745B generates image data GD in accordance with an application program. The image data GD represents graphics images; graphic elements for GUI such as menus, background images, animated images, and the likes. In the process of generating the image data GD, especially a JPEG file 821 or a PNG file 822 is used. The JPEG file 821 and the PNG file 822 have been expanded in the work memory 17450 from a JAR file in the dynamic scenario information DS. The BD-J module 1745 further, in accordance with an application program, transmits the image data GD to the playback unit 1660 via the bus interface 1701 and the bus 1640.

Especially when 3D video images are played back from the image data GD in the 2-plane mode, the virtual machine 1745B first generates and passes both the left-view and right-view image data GD to the playback unit 1660. The virtual machine 1745B then transmits rendering instructions to the playback unit 1660 with appropriate timing. Thus, the virtual machine 1745B controls the playback unit 1660 to synthesize the left-view and the right-view image data GD with the left-view and the right-view video frames, respectively. On the other hand, when 3D video images are played back from the image data GD in the offset mode, the virtual machine 1745B transmits the image data GD representing usual 2D video images and the offset value thereof to the playback unit 1660. The playback unit 1660 generates the left-view and the right-view image data from the image data GD based on the offset value, and then synthesizes the left-view and the right-view image data with the left-view and the right-view video frames, respectively.

Each time the virtual machine 1745B reads a BD-J object from the dynamic scenario information DS, the virtual machine 1745B compares the image playback state value 620 presented by the BD-J object with a current image playback state value. Note that the current image playback state value is held in the AV playback library 1746. When the compared two image playback state values are different, the BD-J module 1745 changes the state of the playback device 110 according to the image playback state value 620 presented by the BD-J object. More specifically, the BD-J module 1745 changes the state as follows.

When the image playback state value 620 indicates State 1, the BD-J module 1745 prohibits application programs from performing the processes for playing back 3D video images. Especially, both the offset mode and the 2-plane mode are disabled. On the other hand, the BD-J module 1745 permits application programs to perform the BD-Live processes.

When the image playback state value 620 indicates State 2, the BD-J module 1745 prohibits application programs from using the 2-plane mode, but permits application programs to perform the processes for playing back 3D video images from video streams, use the offset mode, and perform the BD-Live processes.

When the image playback state value 620 indicates State 3, the BD-J module 1745 permits application programs to perform the processes for playing back 3D video images from video streams, use the 2-plane mode and the offset mode, and perform the BD-Live processes, but restricts the cache area that can be used in the BD-Live processes.

When the image playback state value 620 indicates State 4, the BD-J module 1745 permits application programs to perform the processes for playing back 3D video images from video streams, use the 2-plane mode and the offset mode, but prohibits application programs from performing the BD-Live processes, that is to say, the connections with the external network 150.

When the compared two image playback state values indicate other than the combination of States 1 and 2, the BD-J module 1745 uses the application manager 1745A to cause the virtual machine 1745B to forcibly terminate all application programs. More specifically, as indicated by the dotted arrows shown in FIG. 7, when the playback device 110 switches between States 1 and 2, the BD-J module 1745 need not cause the virtual machine 1745B to terminate application programs. On the other hand, as indicated by the solid arrows shown in FIG. 7, when the playback device 110 switches between States 1 and 3, States 1 and 4, States 2 and 3, States 2 and 4, or States 3 and 4, the BD-J module 1745 causes the virtual machine 1745B to forcibly terminate application programs. In that case, all the application programs are terminated, regardless of whether they are title-bound, disc-bound, or disc-unbound. Therefore, all the xlet programs and all the parameters used by the xlet programs are deleted from the work memory 1745C.

Furthermore, when the compared two image playback state values indicate other than the combination of States 3 and 4, that is to say, when the two values indicate the combination of States 1 and 3, States 1 and 4, States 2 and 3, or States 2 and 4, the BD-J module 1745 causes the playback unit 1660 to change the memory area for storing image data. On the other hand, when the compared two image playback state values indicate the combination of States 3 and 4, the BD-J module 1745 causes the playback unit 1660 to allocate or free the cache area for the BD-Live processes. In the cache area, image data such as browser screens downloaded from the server device 160 on the external network 150 are stored.

The BD-J module 1745 specifies either the offset mode or the 2-plane mode to the playback unit 1660 with regard to the image data playback processes in accordance with the image playback state value 620 presented by the BD-J object. More specifically, when the image playback state value 620 indicates State 2, the BD-J module 1745 specifies the offset mode to the playback unit 1660. On the other hand, when the image playback state value 620 indicates State 3 or 4, the BD-J module 1745 specifies the offset mode or the 2-plane mode that is selected by the application program, to the playback unit 1660.

When the BD-J module 1745 changes the state in accordance with the image playback state value 620 presented by the BD-J object as described above, the BD-J module 1745 causes the AV playback library 1746 to update the original image playback state value to the image playback state value 620.

The AV playback library 1746 instructs an AV playback process or a playlist playback process in accordance with an instruction from the HDMV module 1744 or the BD-J module 1745. The "AV playback process" is a basic process of optical disc playback devices, and includes playback processes performed by general DVD players and CD players. More specifically, the AV playback process includes a start/stop of the playback process, pause and its release, release of still picture function, fast-forward and rewind, switch of audio, switch of subtitle, and switch of angle. On the other hand, the "playlist playback process" is basically a title playback process in accordance with the static scenario information SS. That is to say, in the playlist playback process, the AV playback library 1746 selects a current AV clip in accordance with the current playlist information, and causes the virtual file system 1703 to supply the current AV clip to the playback unit 1660. Other than this, the playlist playback process includes the process for building the virtual package, and the process for transferring the scenario information DS and SS from the virtual package to each of the dynamic scenario memory 1741 and the static scenario memory 1742. The functions necessary for the AV playback process and the playlist playback process are implemented in the AV playback library 1746 as the Application Program Interface (API). The AV playback library 1746 sends instructions to the BD-ROM drive 111, the local storage 1610, the playback unit 1660 and the like via the virtual file system 1703 by executing the API in correspondence with specified processes. Thus, the AV playback library 1746 causes each element to execute the specified processes.

When the current playlist information belongs to the 3D playlist file, the AV playback library 1746 reads the 3D metadata 1103 from the clip information file in the static scenario information SS, and sends the 3D metadata 1103 to the playback unit 1660.

The AV playback library 1746 includes a register 1746A. The register 1746A stores parameters indicating the current states of the playback device 110 and the display device 120, parameters indicating states that can be set in each device, and parameters indicating initial states of each device. The parameters indicating the current states include stream selection numbers of the audio stream and the PG stream that are targeted to be decoded, identifiers of the current playlist information and the current playitem information, and the current image playback state value. The parameters indicating states that can be set in each device include types of selectable audio/subtitle languages, and types of audio data encoding methods.

The AV playback library 1746 refers to the register 1746A in accordance with an instruction from the HDMV module 1744 or the BD-J module 1745. Thus, elementary streams that can be played back by both the playback device 110 and the display device 120 are detected from the elementary streams registered in the stream selection tables of each piece of play item information. The AV playback library 1746 further selects an elementary stream having the smallest stream selection number among the detected elementary streams, and stores the stream selection number into the register 1746A. Also, attributes such as the encoding format and language type, among the attributes of the elementary stream having the smallest stream selection number, are read from the stream attribute information in the clip information file, and stored into the register 1746A. The AV playback library 1746 further specifies PID for the selected elementary stream to the playback unit 1660. In so doing, the AV playback library 1746 transfers the information such as the encoding format, which is necessary for decoding the selected elementary stream, from the register 1746A to the playback unit 1660.

<Structure of Playback Unit 1660>

Figure 18:
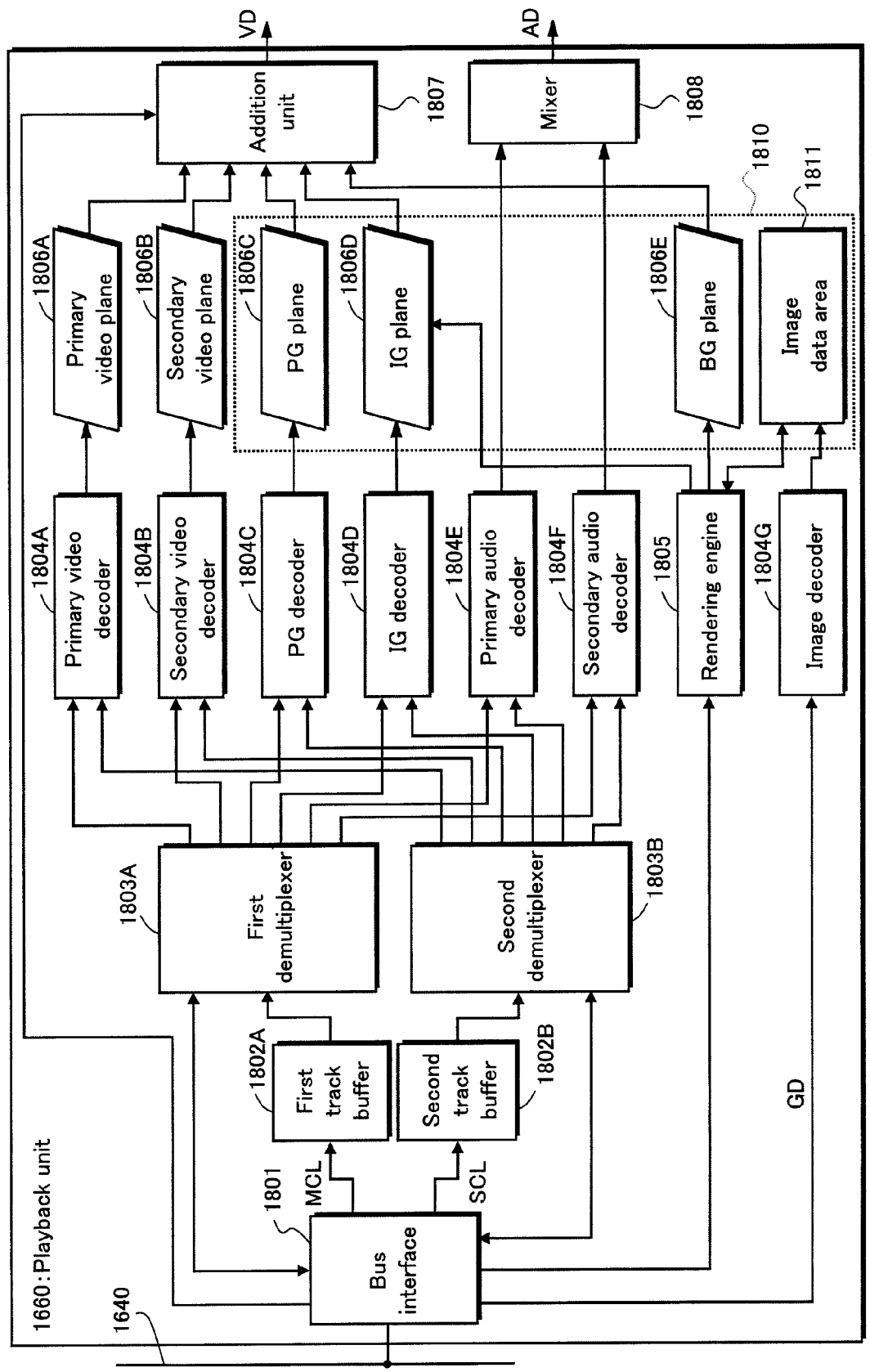
FIG. 18 is a functional block diagram showing the structure of the playback unit 1660 shown in FIG. 16.

FIG. 18 is a functional block diagram showing the structure of the playback unit 1660. As shown in FIG. 18, the control unit 1650 includes a bus interface 1801, a pair of track buffers 1802A and 1802B, a pair of demultiplexers 1803A and 1803B, a primary video decoder 1804A, a secondary video decoder 1804B, a PG decoder 1804C, an IG decoder 1804D, a primary audio decoder 1804E, a secondary audio decoder 1804F, a rendering engine 1805, an image decoder 1804G, a primary video plane memory 1806A, a secondary video plane memory 1806B, an image memory 1810, an addition unit 1807, and a mixer 1808. The image memory 1810 includes a PG plane memory 1806C, an IG plane memory 1806D, a background (BG) plane memory 1806E, and an image data area 1811. These functional units are implemented in one single chip. Not limited to this, however, some functional units may be implemented in other chips.

The bus interface 1801 connects each functional unit in the playback unit 1660 with the BD-ROM drive 111, the local storage 1610, and the control unit 1650 via the bus 1640 so that they can communicate with each other. Especially, the bus interface 1801, in accordance with an instruction from the virtual file system 1703, transfers current AV clips MCL and SCL from the BD-ROM drive 111 or the local storage 1610 to the track buffers 1802A and 1802B. Here, the AV clip MCL is an AV clip specified in the main path information (hereinafter, such AV clip is referred to as main-path AV clip), and is transferred to the first track buffer 1802A; and the AV clip SCL is an AV clip specified in the sub-path information (hereinafter, such AV clip is referred to as sub-path AV clip), and is transferred to the second track buffer 1802B.

The track buffers 1802A and 1802B are both a First-In-First-Out (FIFO) memory embedded in the playback unit 1660. The track buffers 1802A and 1802B temporarily store the AV clips MCL and SCL read from the bus interface 1801.

The first demultiplexer 1803A receives, from the AV playback library 1746, the PID for the elementary stream to be decoded from the main-path AV clip MCL. On the other hand, the first demultiplexer 1803A reads the main-path AV clip MCL in units of source packets from the first track buffer 1802A, and extracts the TS packet from each source packet. The first demultiplexer 1803A further reads the PID from the TS header of each TS packet, and compares the read PID with the PID for the elementary stream targeted to be decoded. When the both PIDs match, the first demultiplexer 1803A collects the TS packet containing the matched PID. PES packets are restored from the TS packets that are collected in this way, and each restored PES packet is sent to any of the six types of decoders 1804A through 1804F in accordance with the PID for the elementary stream targeted to be decoded. For example, when the PID of a TS packet is 0x1011, the PES packet restored from the TS packet is sent to the primary video decoder 1804A. When the PID of a TS packet is in the range from 0x1B00 to 0x1B1F, the PES packet restored from the TS packet is sent to the secondary video decoder 1804B. When the PID of a TS packet is in the range from 0x1100 to 0x111F, the PES packet restored from the TS packet is sent to the primary audio decoder 1804E. When the PID of a TS packet is in the range from 0x1A00 to 0x1A1F, the PES packet restored from the TS packet is sent to the secondary audio decoder 1804F. When the PID of a TS packet is in the range from 0x1200 to 0x121F, the PES packet restored from the TS packet is sent to the PG decoder 1804C. When the PID of a TS packet is in the range from 0x1400 to 0x141F, the PES packet restored from the TS packet is sent to the IG decoder 1804D.

Similarly, the second demultiplexer 1803B receives, from the AV playback library 1746, the PID for the elementary stream to be decoded from the sub-path AV clip SCL. On the other hand, the second demultiplexer 1803B reads the sub-path AV clip SCL in units of source packets from the second track buffer 1802B, and extracts the TS packet from each source packet. The second demultiplexer 1803B further restores PES packets from TS packets having PIDs that match the PIDs for the elementary streams targeted to be decoded, and sends each of the restored PES packets to any of the six types of decoders 1804A through 1804F in accordance with the PID. Especially, when the PID of a TS packet is 0x1012, the PES packet restored from the TS packet is sent to the primary video decoder 1804A.

It should be noted here that generally, each of the AV clips MCL and SCL includes information that is to be used as the dynamic scenario information by the application program. Such dynamic scenario information includes information concerning graphic elements for GUI such as the navigation button included in the IG stream. When the first demultiplexer 1803A or the second demultiplexer 1803B divides such information from each of the AV clips MCL and SCL, the demultiplexer transfers the information to the dynamic scenario memory 1741 in the control unit 1650 via the bus interface 1801.

The primary video decoder 1804A receives PES packets of the left-view video stream from the first demultiplexer 1803A, and PES packets of the right-view video stream from the second demultiplexer 1803B. The received PES packets are stored in the buffer memory in the primary video decoder 1804A. In parallel with this, the primary video decoder 1804A reads the PES packets from the buffer memory, removes the PES headers from the PES packets, extracts pictures from the remaining PES payloads, and decodes the pictures. The primary video decoder 1804A further writes non-compressed pictures into the primary video plane memory 1806A at the times indicated by the PTSs described in the PES headers. In the 3D video image playback process, the primary video decoder 1804A alternately decodes the left-view and right-view pictures, and writes the decoded pictures into the primary video plane memory 1806A.

The secondary video decoder 1804B has the same structure as the primary video decoder 1804A. Using the structure, the secondary video decoder 1804B receives PES packets of the secondary video stream from the first demultiplexer 1803A and the second demultiplexer 1803B, extracts pictures from the PES packets, and decodes the pictures. The secondary video decoder 1804B further writes non-compressed pictures into the secondary video plane memory 1806B at the times indicated by the PTSs described in the PES packets.

The PG decoder 1804C receives PES packets of the PG stream from the first demultiplexer 1803A and the second demultiplexer 1803B, extracts image data from the PES packets, and decodes the image data. The PG decoder 1804C further writes non-compressed image data, namely PG planes, into the PG plane memory 1806C at the times indicated by the PTSs described in the PES packets.

The IG decoder 1804D receives PES packets of the IG stream from the first demultiplexer 1803A and the second demultiplexer 1803B, extracts image data from the PES packets, and decodes the image data. The IG decoder 1804D further writes non-compressed image data, namely IG planes, into the IG plane memory 1806D at the times indicated by the PTSs described in the PES packets. The IG decoder 1804D is used in the HDMV mode. The IG decoder 1804D is not used in the BD-J mode.

The primary audio decoder 1804E receives PES packets of the primary audio stream from the first demultiplexer 1803A and the second demultiplexer 1803B, and stores the PES packets into an internal buffer memory. In parallel with this, the primary audio decoder 1804E reads the PES packets from the buffer memory, and removes the PES headers from the PES packets. The primary audio decoder 1804E further extracts audio data in the LPCM format from the remaining PES payloads, and decodes the audio data. Following this, the primary audio decoder 1804E sends non-compressed audio data to the mixer 1808 at the times indicated by the PTSs described in the PES headers.

The secondary audio decoder 1804F has the same structure as the primary audio decoder 1804E. Using the structure, the secondary audio decoder 1804F receives PES packets of the secondary audio stream from the first demultiplexer 1803A and the second demultiplexer 1803B, extracts audio data in the LPCM format from the PES packets, and decodes the audio data. Following this, the secondary audio decoder 1804F sends non-compressed audio data to the mixer 1808 at the times indicated by the PTSs described in the PES headers.

The image decoder 1804G receives the image data GD from the BD-J module 1745 in the control unit 1650, and decodes the image data GD. The image decoder 1804G further writes non-compressed image data into the image data area 1811. Furthermore, in the BD-Live processes, the image decoder 1804G uses a portion of the image data area 1811 as a cache area. The image decoder 1804G decodes image data such as browser screens downloaded from the server device 160, and stores the decoded image data into the cache area. In particular, both the current and previous image data are stored in the cache area.

Each of the video plane memories 1806A and 1806B is an area allocated in a memory element embedded in the playback unit 1660, and includes a two-dimensional array. The size of the array is equivalent to the resolution of a video frame. Each element of the array stores a piece of pixel data. Each piece of pixel data is composed of color coordinates and an α (alpha) value (opacity). The color coordinates are represented by RGB values or YCrCb values. Accordingly, the array can store one video plane. In the 3D video image playback processes, two of the two-dimensional arrays of the same size are allocated in the primary video plane memory 1806A. The left-view and right-view video planes are separately written into the two two-dimensional arrays.

The image memory 1810 is an area allocated in a memory element embedded in the playback unit 1660. Portions of the image memory 1810 are separately allocated to the PG plane memory 1806C, the IG plane memory 1806D, and the BG plane memory 1806E, and the remaining area is allocated to the image data area 1811. Each of the plane memories 1806C, 1806D, and 1806E includes two two-dimensional arrays of the same size. Each element of the array stores a piece of pixel data. Each piece of pixel data is composed of color coordinates and an α value. The color coordinates are represented by RGB values or YCrCb values. In each of the plane memories 1806C, 1806D, and 1806E, while the current plane is held in one of the two arrays, the next plane is written into the other. This can realize so-called double-buffering, and thus prevent flicker of video images played back from the planes. Note that, in general, different plane memories have different array sizes. The capacity of the area to be allocated to the IG plane memory 1806D is specified by the BD-J module 1745, and in particular, changed depending on the image playback state value 620 presented by the BD-J object. More specifically, in States 3 and 4 shown in FIG. 7, the capacity of the IG plane memory 1806D is set to double the value in States 1 and 2.

The rendering engine 1805 is provided with APIs for graphics processing such as Java 2D or OPEN-GL. The rendering engine 1805 is especially used for graphics processing by the BD-J module 1745. More specifically, the BD-J module 1745 first transfers the image data GD to the image data area 1811. The BD-J module 1745 next sends an instruction to the rendering engine 1805 in accordance with the application program. In accordance with the instruction, the rendering engine 1805 performs graphics processing such as α-blending (Porter-Duff operation) onto the image data GD in the image data area 1811. Thus, the rendering engine 1805 generates an image plane representing graphics images and a BG plane representing background images from the image data GD. The rendering engine 1805 further writes the image plane into the IG plane memory 1806D, and writes the BG plane into the BG plane memory 1806E. Furthermore, when instructed by the BD-J module 1745 to perform the process for playing back 3D video images in the 2-plane mode, the rendering engine 1805 generates both the left-view and right-view image planes from the image data GD, and writes the image planes into the IG plane memory 1806D.

In the 2D video image playback process, the addition unit 1807 synthesizes the planes written in the plane memories 1806A through 1806E into one video frame as they are. In the 3D video image playback process, the addition unit 1807 first performs the cropping process onto any of the PG, IG, image, and BG planes, and generates pairs of left-view and right-view planes from the planes having been subjected to the cropping process. In so doing, the addition unit 1807 determines the planes to which the cropping process should be performed, in accordance with an instruction from the BD-J module 1745. In the cropping process of the PG and IG planes, the offset value indicated by the 3D metadata 1103 is used. In the cropping process of the image and BG planes, the offset value passed from the BD-J module 1745 is used. Next, the addition unit 1807 synthesizes the left-view video plane, left-view PG plane, left-view IG plane (or image plane), and left-view BG plane into one left-view video frame. Similarly, the addition unit 1807 synthesizes the right-view planes into one right-view video frame. In so doing, in the 2-plane mode, the addition unit 1807 adjusts the timing at which the image plane is synthesized into the video frame, to the timing indicated by the rendering instruction from the BD-J module 1745. Thus, the left-view planes are correctly synthesized into one left-view video frame; and the right-view planes are correctly synthesized into one right-view video frame. The addition unit 1807 converts the video frames having been synthesized correctly in this way, into video data VD, and transmits the video data VD to the HDMI transmission unit 1670.

The mixer 1808 generates audio data AD representing a mixed sound by mixing the non-compressed audio data received respectively from the primary audio decoder 1804E and the secondary audio decoder 1804F. The mixer 1808 further transmits the audio data AD to the HDMI transmission unit 1670.

<Change of Areas in Image Memory 1810 Caused by Switching Between States 1-4>

Figure 19:
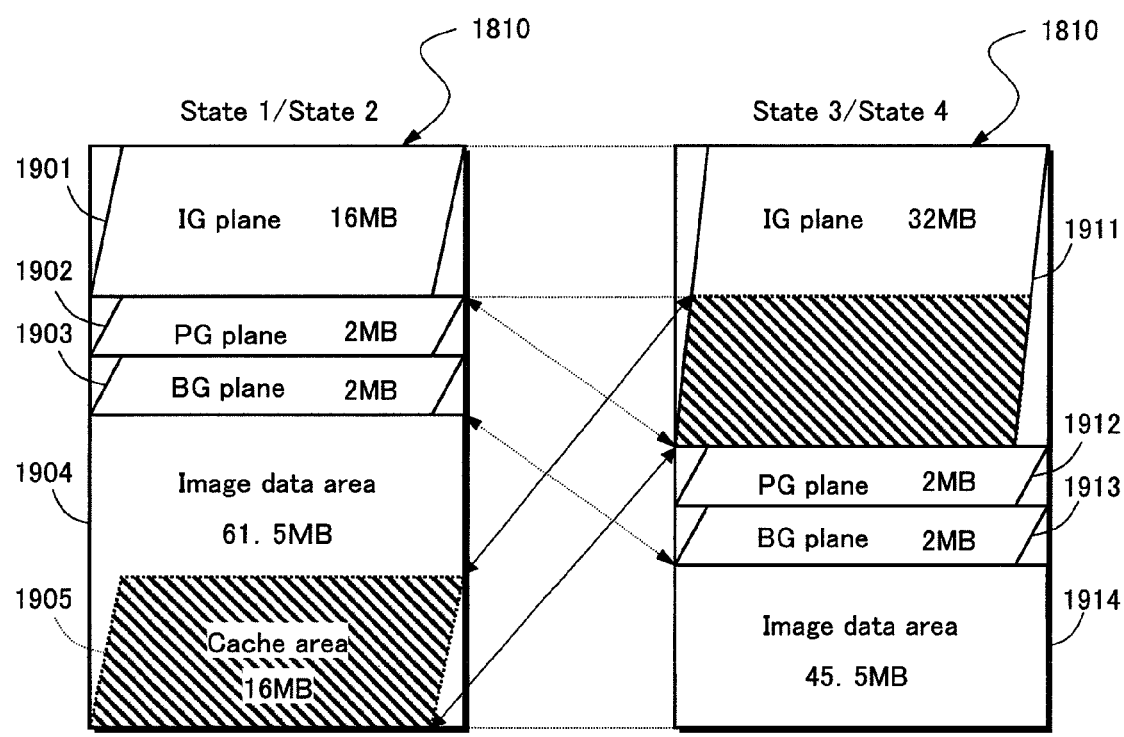
FIG. 19 is a schematic diagram showing one example of the IG plane memory area, PG plane memory area, BG plane memory area, and image data area that are ensured in the image memory 1810 shown in FIG. 18.

FIG. 19 is a schematic diagram showing an example of the IG plane memory area, the PG plane memory area, the BG plane memory area, and the image data area that are allocated in the image memory 1810. In the example shown in FIG. 19, the total capacity of the image memory 1810 is 81.5 MB.

When the image playback state value 620 presented by the BD-J object indicates State 1 or 2, the BD-J module 1745 assigns 16 MB to the IG plane memory area 1901, 2 MB to each of the PG plane memory area 1902 and the BG plane memory area 1903, and the remaining 61.5 MB to the image data area 1904. The BD-J module 1745 further allocates a 16-MB area in the image data area 1904 to the cache area 1905 for the BD-Live. Especially, since the IG plane memory area 1901 has the capacity of 16 MB, the IG plane memory area 1901 can store up to two image planes each having the resolution of 1920×1080 (=8 MB). Accordingly, in State 2, the offset mode can add depth perception to graphics images represented by an image plane having the resolution of 1920×1080.

When the image playback state value 620 presented by the BD-J object indicates State 3 or 4, the BD-J module 1745 assigns 32 MB to the IG plane memory area 1911, 2 MB to each of the PG plane memory area 1912 and the BG plane memory area 1913, and the remaining 45.5 MB to the image data area 1914. Especially, since the IG plane memory area 1911 has the capacity of 32 MB, the IG plane memory area 1911 can store up to four image planes each having the resolution of 1920×1080 (=8 MB). Accordingly, in States 3 and 4, the 2-plane mode can add depth and three-dimensional shape perception to graphics images represented by an image plane having the resolution of 1920×1080. Especially, the 2-plane mode can produce more expressive stereoscopic effects than the offset mode. Therefore, in States 3 and 4, for example, irregularities and curves of the surface of a menu can be expressed more real than in State 2.

When the BD-J module 1745 is to switch the playback device 110, for example, from State 2 to State 4, the BD-J module 1745 first frees the cache area 1905 from the image data area 1904. Next, the BD-J module 1745 allocates the free area made available by the freeing, to the IG plane memory area 1911. This increases the capacity of the IG plane memory area from 16 MB to 32 MB, and accordingly enables the 2-plane mode. On the other hand, the cache area 1905 disappears. This disables the BD-Live function with network connections. Conversely, when the playback device 110 is to be switched from State 4 to State 2, first, a 16-MB area is freed from the 32-MB IG plane memory area 1911. Next, the free area made available by the freeing is allocated to the image data area 1904 as the cache area 1905. This enables the BD-Live function with network connections. On the other hand, the capacity of the IG plane memory area decreases from 32 MB to 16 MB. This disables the 2-plane mode.

The above-described freeing and allocating of a 16-MB cache area and exchanging of a 16-MB area between the image data area and the IG plane memory area are performed similarly in switching between States 1 and 4, switching between States 1 and 3, and switching between States 3 and 4. This enables the 2-plane mode and the BD-Live function selectively.

When the image playback state value 620 presented by the BD-J object indicates State 3, the BD-J module 1745 allocates an area in the 45.5-MB image data area 1914 as the cache area for BD-Live, which is not shown in FIG. 19. Note that the cache area has a limited capacity smaller than 16 MB, the capacity of the cache area 1905 in States 1 and 2. Furthermore, the remainder of the image data area 1914 has a capacity less than 45.5 MB because of the allocation of the cache area. Accordingly, switching between State 3 and another, changes both the capacities of the image data area and the cache area. For this reason, a type of application programs cannot run in State 3; the type of application programs belongs to the application programs that are used in State 1, 2, or 4, and runs under the condition that the capacities of the image data area and the cache area be 45.5 MB and 16 MB, respectively. However, another type of application programs that can run under the condition that the capacities of the image data area and cache area are smaller than 45.5 MB and 16 MB, respectively, can realize the BD-Live functions and execute the 2-plane mode with use of the 32-MB IG plane memory area 1911. The type of application programs can, for example, display both a GUI screen built thereby and a browser screen downloaded from an external network simultaneously on the display device 120, and can add further improved depth and three-dimensional shape perception to the screens.

As described above, the playback device 110 causes application programs to dynamically switch among the four types of states, namely, States 1-4. Thus, the playback device 110 allows the application programs to selectively use the 2-plane mode and the BD-Live functions while maintaining the total capacity of the image memory at a constant level. The playback device 110 further allows application programs to simultaneously use the 2-plane mode and the BD-Live functions when the application programs can run under the condition that the image data area and cache area have the reduced capacities.

<Operation of Rendering Engine 1805 in 2-Plane Mode>

Figure 20:
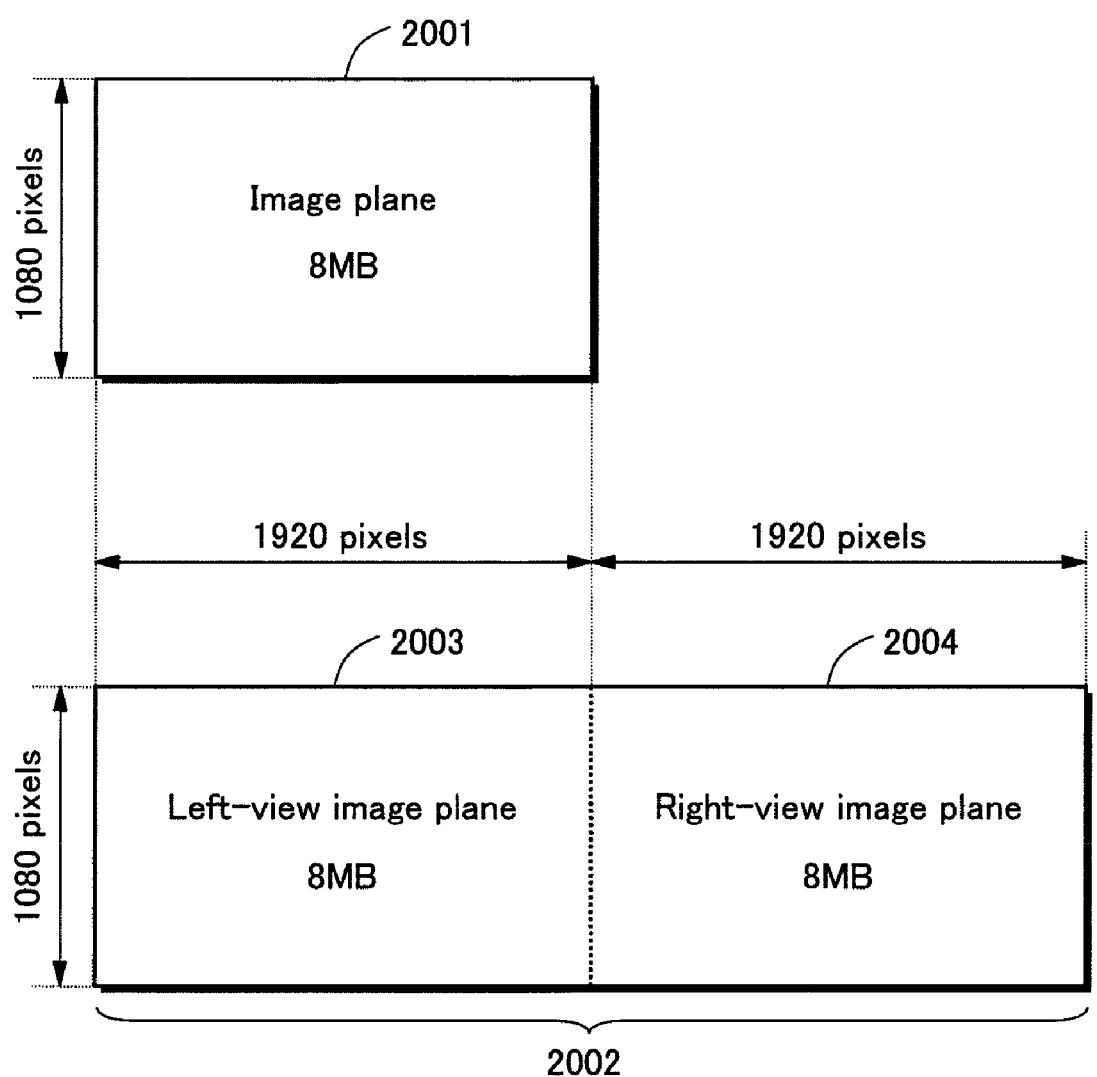
FIG. 20 is a schematic diagram showing the image planes stored in the IG plane memory area 1911 shown in FIG. 19 in the offset mode and 2-plane mode.

FIG. 20 is a schematic diagram showing the image planes stored in the IG plane memory area 1911 in the offset mode and 2-plane mode. The rendering engine 1805 in the offset mode, like the one in the playback process of 2D video images, writes an image plane 2001 of 1920×1080 (=8 MB) into the IG plane memory area 1911. Accordingly, the rendering engine 1805 requires only one handle for the image plane 2001. On the other hand, the rendering engine 1805 in the 2-plane mode writes two image planes of 1920×1080 into the IG plane memory area 1911. One of them is a left-view image plane 2003 and the other is a right-view image plane 2004. In this case, the rendering engine 1805 logically connects the two image planes 2003 and 2004 in a horizontal direction to constitute an image plane 2002 having double the number of the horizontal pixels, namely, the image plane of 3840×1080, and then provides one handle to the image plane 2002. Thus, the rendering engine 1805 allows application programs to operate the left-view image plane 2003 and the right-view image plane 2004 as left- and right-halves of the single image plane 2002, respectively. For example, when an instruction from the BD-J module 1745 specifies a rendering operation in the left half of the image plane 2002, the rendering engine 1805 writes the left-view image plane 2003 into the IG plane memory area 1911. On the other hand, when an instruction from the BD-J module 1745 specifies a rendering operation in the right half of the image plane 2002, the rendering engine 1805 writes the right-view image plane 2004 into the IG plane memory area 1911. Furthermore, when an instruction from the BD-J module 1745 specifies a rendering operation in the entirety of the image plane 2002, the rendering engine 1805 writes both the left-view image plane 2003 and the right-view image plane 2004 into the IG plane memory area 1911. Thus, the rendering engine 1805 allows application programs to operate the image planes with one handle in both the offset mode and the 2-plane mode.

<Synthesizing Process by Addition Unit 1807>

Figure 21:
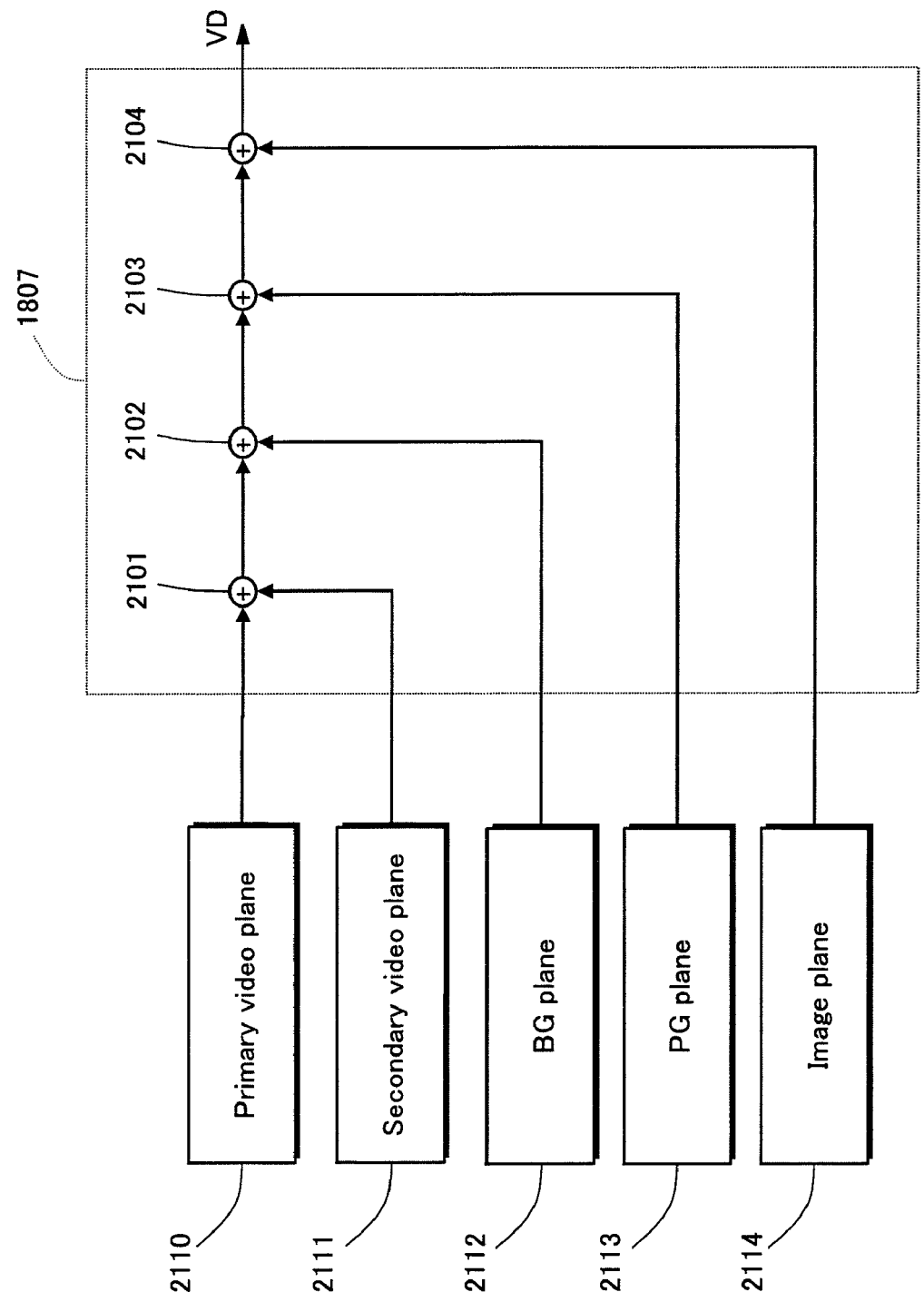
FIG. 21 is a functional block diagram showing the addition unit 1807 shown in FIG. 18 in the state 1.

FIG. 21 is a functional block diagram showing the addition unit 1807 in the state 1, namely, in the playback process of 2D video image. In the state 1, the addition unit 1807 includes four adders 2101-2104. The first adder 2101 synthesizes a primary video plane 2110 with a secondary video plane 2111 and sends the synthesized video plane to the second adder 2102. The second adder 2102 synthesizes the video plane received from the first adder 2101 with a BG plane 2112 and sends the synthesized video plane to the third adder 2103. The third adder 2103 synthesizes the video plane received from the second adder 2102 with a PG plane 2113 and sends the synthesized video plane to the fourth adder 2104. The fourth adder 2104 synthesizes the video plane received from the third adder 2103 with an image plane (or IG plane) 2114. The fourth adder 2104 further converts the synthesized video plane as one video frame into video data VD, and sends the video data VD to the HDMI transmission unit 1670.

Figure 22:
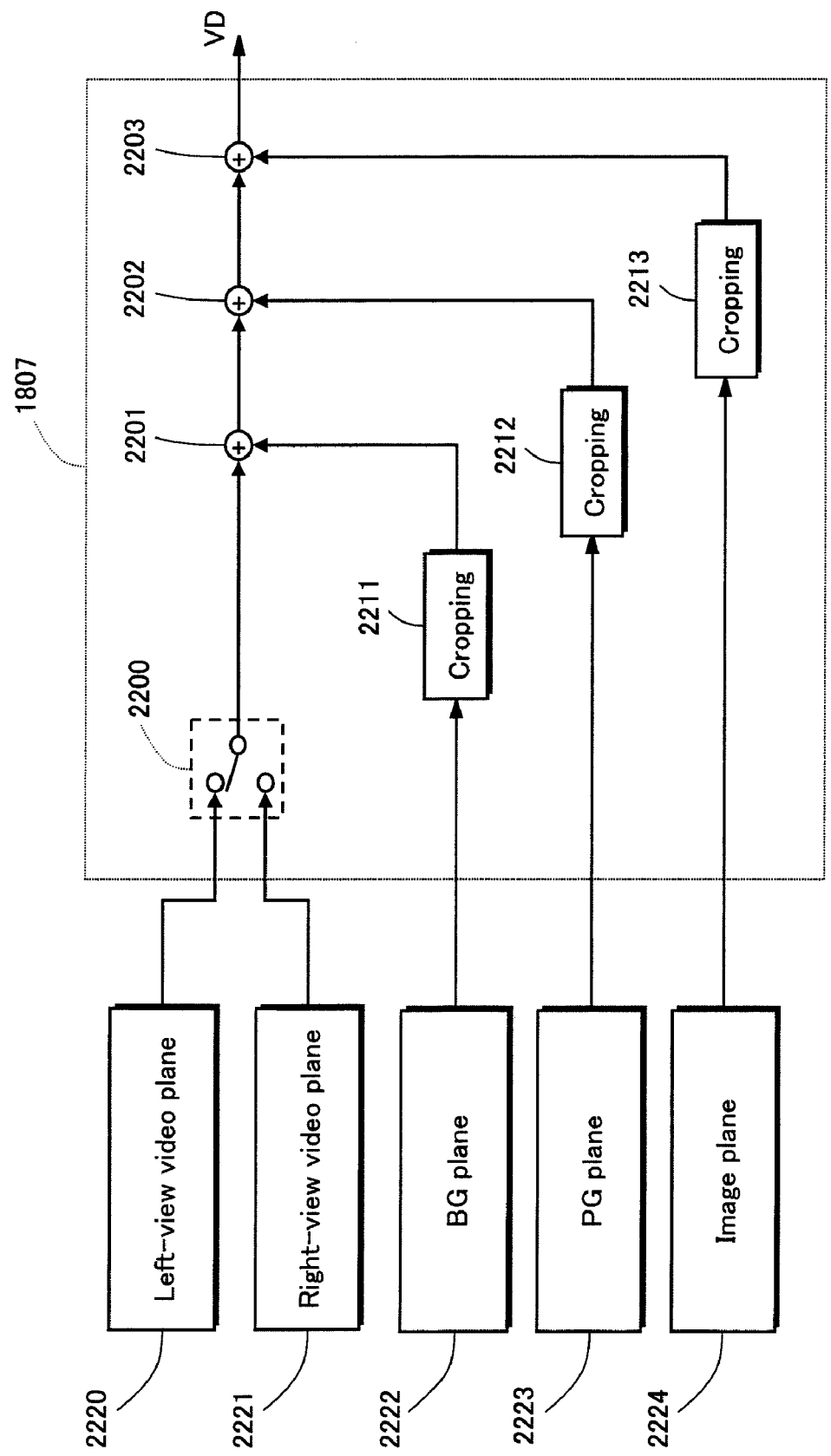
FIG. 22 is a functional block diagram showing the addition unit 1807 shown in FIG. 18 in the state 2.

FIG. 22 is a functional block diagram showing the addition unit 1807 in the state 2. In the state 2, the addition unit 1807 includes a switch 2200, three adders 2201-2203, and three cropping processors 2211-2213. The following explanation assumes the BD-J mode for convenience's sake, but the explanation is applicable to the HDMV mode as well.

The switch 2200 sends a left-view video plane 2220 and a right-view video plane 2221 to the first adder 2201 in the order of the PTS. When the PTSs of the left-view video plane 2220 and the right-view video plane 2221 are the same, the switch 2200 sends the 2220 first before the 2221. It should be noted here that although not shown in FIG. 22, when there are two types of secondary video planes, namely left-view and right-view, a similar switch is used so that the two types of secondary video planes are alternately read into the addition unit 1807 to be synthesized with a video plane output from the switch 2200.

The first adder 2201 receives alternately the left-view video plane 2220 and the right-view video plane 2221 from the switch 2200. On the other hand, the first adder 2201 receives alternately a left-view BG plane and a right-view BG plane from the first cropping processor 2211. The first adder 2201 synthesizes the left-view video plane 2220 with the left-view BG plane, and synthesizes the right-view video plane 2221 with the right-view BG plane. The two types of video planes after the synthesizing are sent to the second adder 2202 alternately.

The second adder 2202 receives alternately the left-view video plane and the right-view video plane from the first adder 2201. On the other hand, the second adder 2202 receives alternately a left-view PG plane and a right-view PG plane from the second cropping processor 2212. The second adder 2202 synthesizes the left-view video plane with the left-view PG plane, and synthesizes the right-view video plane with the right-view PG plane. The two types of video planes after the synthesizing are sent to the third adder 2203 alternately.

The third adder 2203 receives alternately the left-view video plane and the right-view video plane from the second adder 2202. On the other hand, the third adder 2203 receives alternately a left-view image plane and a right-view image plane from the third cropping processor 2213. The third adder 2203 synthesizes the left-view video plane with the left-view image plane, and synthesizes the right-view video plane with the right-view image plane. The third adder 2203 further converts the synthesized video plane as one video frame into video data VD, and sends the video data VD to the HDMI transmission unit 1670.

The first cropping processor 2211 performs a cropping process onto the BG plane 2222 by using an offset value passed from the BD-J module 1745. Thus, the BG plane 2222 is converted into the left-view BG plane and the right-view BG plane alternately.

The second cropping processor 2212 performs a cropping process onto the PG plane 2223 by using an offset value indicated by the 3D metadata 1103. Thus, the PG plane 2223 is converted into the left-view PG plane and the right-view PG plane alternately.

The third cropping processor 2213 performs a cropping process onto the image plane 2224 by using an offset value passed from the BD-J module 1745. Thus, the image plane 2224 is converted into the left-view image plane and the right-view image plane alternately.

Figure 23:
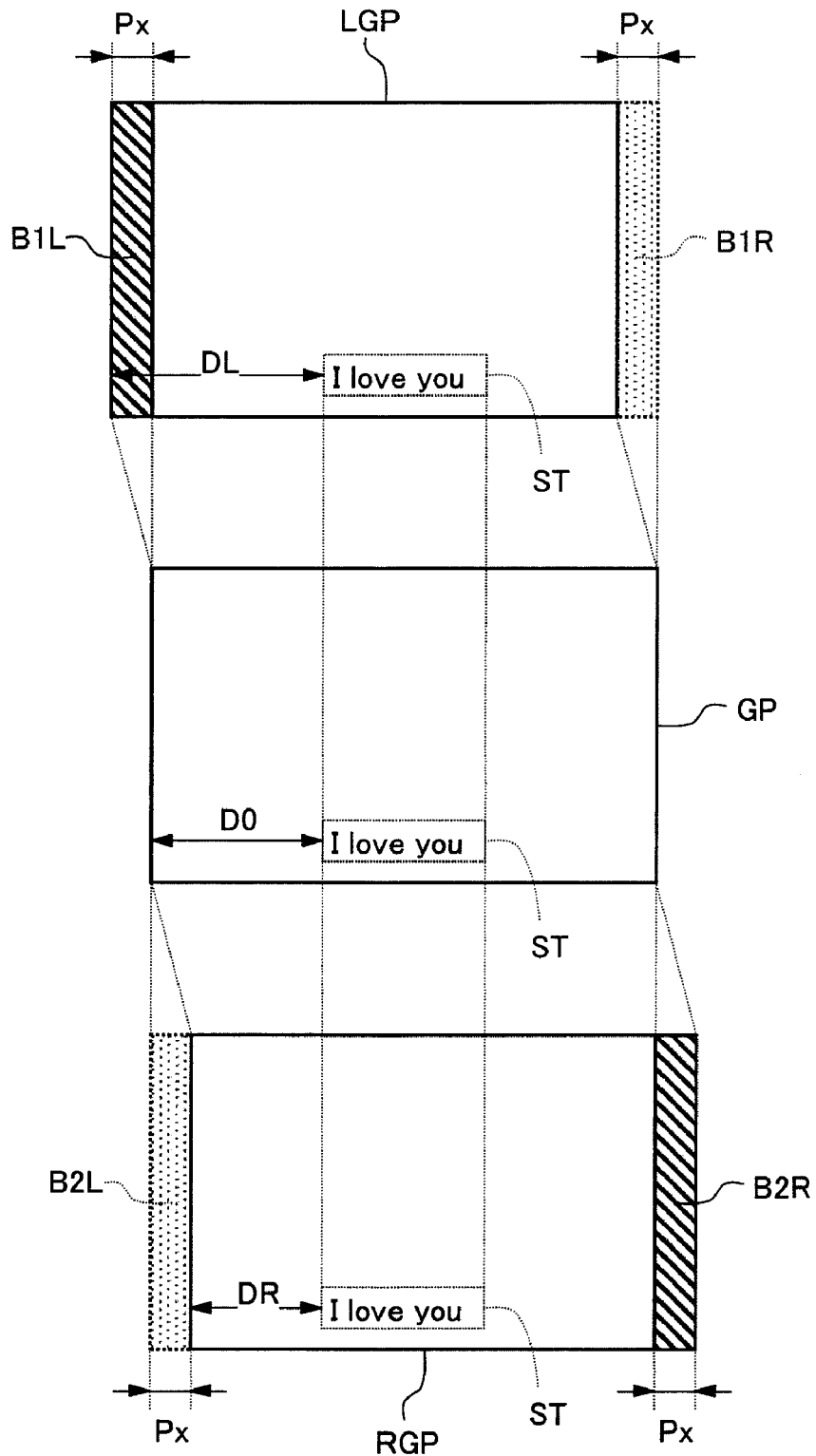
FIG. 23 is a schematic diagram showing the cropping process performed onto the PG plane GP by the second cropping processor 2212 shown in FIG. 22.

FIG. 23 is a schematic diagram showing the cropping process performed onto the PG plane GP by the second cropping processor 2212. With reference to FIG. 23, the PG plane GP includes a graphic element ST representing a subtitle "I love you". With regard to the portions other than the graphic element ST, the α value is set to "0", meaning "transparent".

The second cropping processor 2212 first searches the 3D metadata 1103 shown in FIG. 12, for a table 1201 that is assigned to PID=0x1200 of the PG stream. The second cropping processor 2212 then searches the table 1201 for an offset entry 1204 that is valid at the current point in time, and obtains an offset value 1203 of the offset entry 1204.

Next, the second cropping processor 2212 accesses the primary audio decoder 1804E and judges which of the left view and the right view is synthesized with the PG plane GP. The second cropping processor 2212 then shifts the graphic element ST in the horizontal direction by the number of pixels PX in the PG plane GP. The number of pixels PX is equivalent to the offset value 1203. On the other hand, the direction of the shifting depends on the judgment result.

When the left view is synthesized with the PG plane GP: when the offset value 1203 is positive, the graphic element ST shifts to the right; and when the offset value 1203 is negative, the graphic element ST shifts to the left. More specifically, when the offset value 1203 is positive, a transparent belt B1L having a width that is equivalent to the number of pixels PX is added to the left side of the original PG plane GP, and a transparent belt B1R having the same width is removed from the right side of the original PG plane GP. Thus, the original PG plane GP is replaced with a left-view PG plane LGP. A distance DL between the left edge of the left-view PG plane LGP and the graphic element ST is longer than a distance D0 between the left edge of the original PG plane GP and the graphic element ST, by the number of pixels PX. That is to say, the graphic element ST shifts to the right from the original position. The reverse takes place when the offset value 1203 is negative.

When the right view is synthesized with the PG plane GP: when the offset value 1203 is positive, the graphic element ST shifts to the left; and when the offset value 1203 is negative, the graphic element ST shifts to the right. More specifically, when the offset value 1203 is positive, a transparent belt B2L having a width that is equivalent to the number of pixels PX is removed from the left side of the original PG plane GP, and a transparent belt B2R having the same width is added to the right side of the original PG plane GP. Thus, the original PG plane GP is replaced with a right-view PG plane RGP. A distance DR between the left edge of the left-view PG plane RGP and the graphic element ST is shorter than the distance D0 between the left edge of the original PG plane GP and the graphic element ST, by the number of pixels PX. That is to say, the graphic element ST shifts to the left from the original position. The reverse takes place when the offset value 1203 is negative.

In this way, the second cropping processor 2212 generates the left-view PG plane LGP and the right-view PG plane RGP from one PG plane GP, and sends them alternately to the second adder 2202. The horizontal distance between the graphic elements ST in them is double the number of pixels PX, namely double the offset value 1203. The viewer recognizes the positional difference as a binocular parallax, and the viewer sees the subtitle "I love you" at a depth relative to the screen. The first cropping processor 2211 performs a similar cropping process onto the BG plane 2222, and the third cropping processor 2213 performs a similar cropping process onto the image plane 2224.

Figure 24:
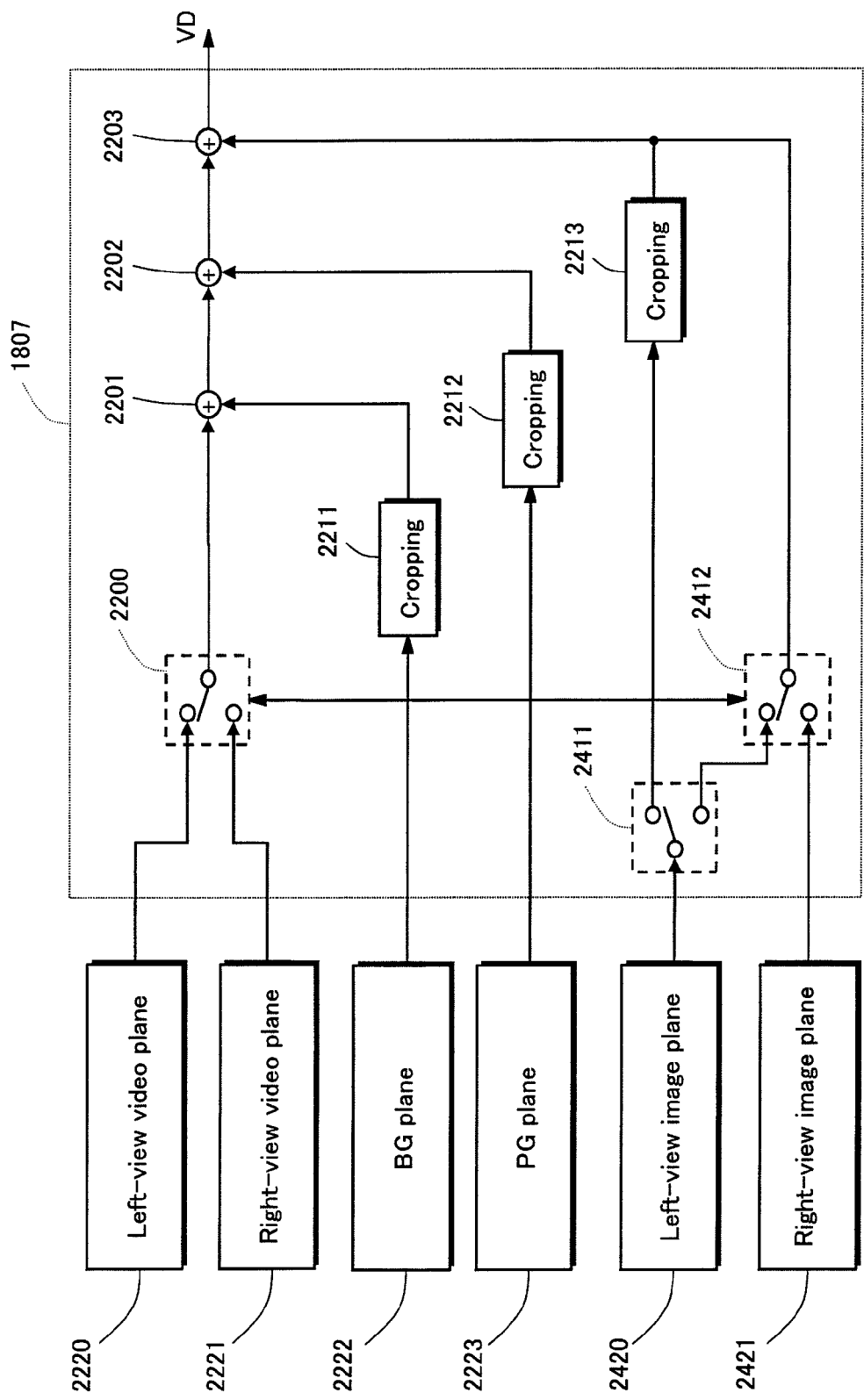
FIG. 24 is a functional block diagram showing the addition unit 1807 shown in FIG. 18 in the states 3 and 4.

FIG. 24 is a functional block diagram showing the addition unit 1807 in the states 3 and 4. In the states 3 and 4, the addition unit 1807 includes two mode switches 2411 and 2412 in addition to the functional units shown in FIG. 22.

In accordance with an instruction from the BD-J module 1745, the first mode switch 2411 switches between the destinations of a left-view image plane 2420 as the mode switches between the offset mode and the 2-plane mode. In the offset mode, the first mode switch 2411 sends the left-view image plane 2420 to the third cropping processor 2213. Thus, a pair of left-view and right-view image planes is generated from the left-view image plane 2420. In the 2-plane mode, the first mode switch 2411 sends the left-view image plane 2420 to the second mode switch 2412.

The second mode switch 2412, in conjunction with the switch 2200, sends the left-view image plane 2420 and a right-view image plane 2421 alternately to the third adder 2203. Especially, when the switch 2200 sends the 2220, the second mode switch 2412 sends the left-view image plane 2420; and when the switch 2200 sends the 2221, the second mode switch 2412 sends the right-view image plane 2421. With this structure, the third adder 2203 can synthesize the video plane and the image plane correctly.

<Switching Between States of Playback Device 110 by BD-J Module 1745>

Figure 25:
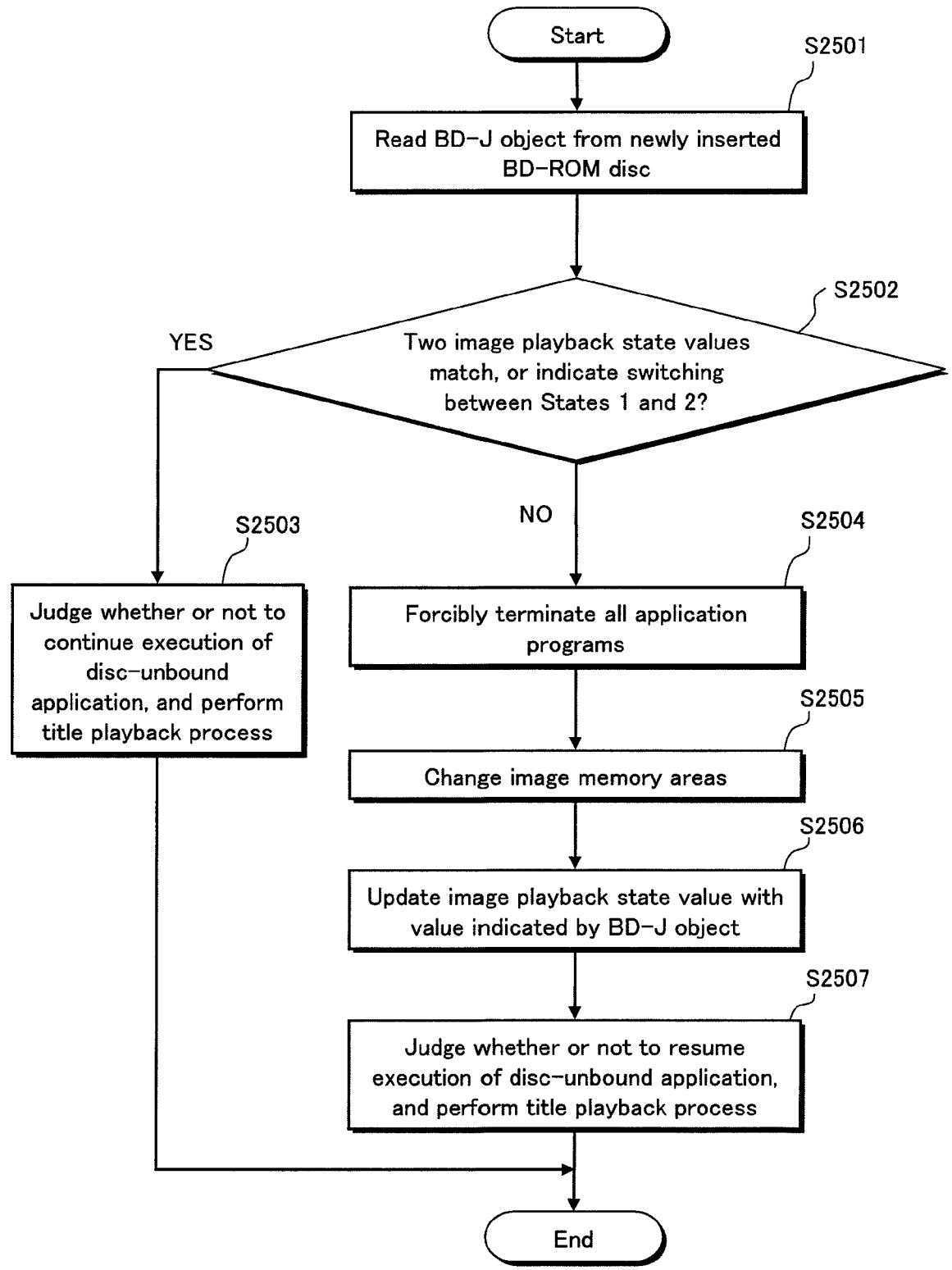
FIG. 25 is a flowchart showing the process for switching between the states of the playback device 110 by the BD-J module 1745 shown in FIG. 17.

FIG. 25 is a flowchart showing the process for switching between states of the playback device 110 by the BD-J module 1745. The following explanation assumes, for convenience's sake, that the process for switching between titles is performed when a BD-ROM disc is newly inserted into the BD-ROM drive 111. The following explanation is also applicable to the process for switching between titles that is performed in response to a user operation or a request for an application program while the recording medium 100 is inserted in the BD-ROM drive 111.

Step S2501: the operation unit 1620 detects insertion of the recording medium 100 into the BD-ROM drive 111, and sends a notification INT indicating the insertion, to the user operation detection module 1702. In accordance with the notification INT, the user operation detection module 1702 transmits an operation signal UO to the mode management module 1743. In the mode management module 1743, the dispatcher 1743A, via the AV playback library 1746, requests the virtual file system 1703 to read the index file IF. Next, the mode management module 1743 refers to the item "first play" 301 in the index table in the index file IF, and then identifies an object specified in the item. Here, the object is assumed to be the BD-J object. In this case, the mode management module 1743 sends an instruction to the virtual file system 1703 via the AV playback library 1746, thereby causing the virtual file system 1703 to transfer the BD-J object to the dynamic scenario memory 1741. On the other hand, the mode management module 1743 assigns the current dynamic scenario information DS to the BD-J module 1745. In response to that, the BD-J module 1745 reads the BD-J object from the dynamic scenario information DS in the dynamic scenario memory 1741.

Step S2502: the BD-J module 1745 reads the current image playback state value from the AV playback library 1746, and then compares it with the image playback state value 620 presented by the BD-J object. When the two image playback state values match, or when the combination thereof indicates switching between States 1 and 2, the process proceeds to Step S2503. When the combination of the two image playback state values indicates anything other than the switching between States 1 and 2, the process proceeds to Step S2504.

Step S2503: the state of the playback device 110 requested by the BD-J object and the state thereof before the insertion of the recording medium 100 are equivalent to each other or the combination of States 1 and 2. Accordingly, the BD-J module 1745 does not change the areas in the image memory 1810. On the other hand, when the BD-J object requests the switching between States 1 and 2, the BD-J module 1745, in accordance with the request, specifies either the 2D video image playback process or the 3D video image playback process to the playback device 110. After that, the BD-J module 1745 performs the playback process of a title as usual. That is to say, the application manager 1745A, in accordance with the application management table 410 in the BD-J object, instructs the virtual machine 1745B to start or terminate application programs. Especially when a disc-unbound application program is being executed, the application manager 1745A judges whether or not to continue the execution. The virtual machine 1745B, in accordance with an instruction from the application manager 1745A, starts or terminates application programs. Thus, the BD-J module 1745, in accordance with application programs, executes the playback process of the title that corresponds to the item "first play" 303.

Step S2504: the two image playback state values indicate anything other than the combination of States 1 and 2. Accordingly, the BD-J module 1745 uses the application manager 1745A to cause the virtual machine 1745B to forcibly terminate all application programs. After that, the process proceeds to Step S2505.

Step S2505: the BD-J module 1745 causes the playback unit 1660 to change the areas in the image memory 1810. More specifically, when the two image playback state values indicate switching from State 1 to State 3, from State 2 to State 3, from State 1 to State 4, or from State 2 to State 4, the BD-J module 1745 first frees the cache area 1905 for BD-Live from the image data area 1904, as shown in FIG. 19. Next, the BD-J module 1745 allocates the free area made available by the freeing, to the IG plane memory area 1911, thereby doubling the capacity of the IG plane memory area. On the other hand, when the two image playback state values indicate switching in a reversed direction such as switching from State 4 to State 2, the BD-J module 1745 first frees half the IG plane memory area 1911. Next, the BD-J module 1745 allocates the free area made available by the freeing, to the image data area 1904 as the cache area 1905 for BD-Live. Furthermore, when the two image playback state values indicate switching between States 3 and 4, the BD-J module 1745 allocates the cache area for BD-Live in the IG plane memory area 1911, or frees the cache area from the IG plane memory area 1911. After that, the process proceeds to Step S2506.

Step S2506: the BD-J module 1745 causes the AV playback library 1746 to update the current image playback state value to the image playback state value 620 indicated by the BD-J object. After that, the process proceeds to Step S2507.

Step S2507: the BD-J module 1745 switches the playback device 110 to the state requested by the BD-J object. After that, the BD-J module 1745 performs the playback process of a title as usual. That is to say, the application manager 1745A, in accordance with the application management table 410 in the BD-J object, instructs the virtual machine 1745B to start or terminate application programs. Especially when there is the disc-unbound application program that was forcibly terminated in Step S2504, the application manager 1745A judges whether or not to resume the execution. The virtual machine 1745B, in accordance with an instruction from the application manager 1745A, starts or terminates application programs. Thus, the BD-J module 1745, in accordance with application programs, executes the playback process of the title that corresponds to the item "first play" 303.

Advantageous Effects of Embodiment 1 of the Invention

When switching between titles causes switching from a BD-J object to another BD-J object having a different image playback state value, the BD-J module 1745 switches between the states of the playback device 110 in accordance with the different image playback state value. When States 1 and 3, States 1 and 4, States 2 and 3, or States 2 and 4 are switched, in the image memory 1810, the cache area 1905 is freed or allocated and an area is exchanged between the image data area and the IG plane memory area, as shown in FIG. 19. When States 3 and 4 are switched, in the image memory 1810, the cache area for BD-Live and the image data area are changed in capacity. On the other hand, disc-bound or disc-unbound application programs are not terminated in general when a title is switched to another. Accordingly, in this situation, there is a risk that the application programs erroneously recognize and access the areas in the image memory after the switching between titles as the areas before the switching.

As described above, in the playback device 110 in Embodiment 1 of the present invention, each time the BD-J object is switched to another, the BD-J module 1745 compares the image playback state value 620 presented by the BD-J object with the current image playback state value. Furthermore, when the two image playback state values indicates anything other than the switching between States 1 and 2, the BD-J module 1745 uses the application manager 1745A to cause the virtual machine 1745B to forcibly terminate all application programs. With this structure, when the areas in the image memory 1810 are to be changed, all the application programs are terminated in advance. Therefore, there is no risk that the application programs erroneously recognize and access the areas in the image memory after the switching between titles as the areas before the switching. In this way, the playback device 110 allows the application programs to selectively use the 2-plane mode and the BD-Live functions without malfunction. As a result of this, the playback device 110 can play back digital contents including graphics images with more expressive stereoscopic effects, without increasing the capacity of the image memory.

<Modifications>

(1) In Embodiment 1 of the present invention, when both the left-view and right-view image data are present, in the offset mode, the left-view image data is used. However, not limited to this, the right-view image data may be used instead of the left-view image data.

(2) The addition unit 1807 transmits left-view video frames and right-view video frames alternately in pairs after the synthesizing. As another method, when the display device 120 uses a lenticular lens to display 3D video images, the addition unit 1807 may further synthesize each pair of a left-view video frame and a right-view video frame into one video frame, by using an embedded buffer memory. More specifically, the addition unit 1807 temporarily stores in the buffer memory the left-view video plane that has been synthesized first. Subsequently, the addition unit 1807 synthesizes the right-view video plane, and further synthesizes the resultant right-view video plane with the left-view video frame stored in the buffer memory. In the synthesizing, the left-view and right-view video planes are each divided into small rectangular areas that are thin and long in a vertical direction, and the small rectangular areas are arranged alternately in the horizontal direction so as to re-constitute one frame. In this way, the playback device of Embodiment 1 of the present invention is also compatible with display devices that use a lenticular lens for displaying 3D video images.

(3) In the example shown in FIG. 24, in States 3 and 4, the addition unit 1807 realizes the offset mode and the 2-plane mode in a selectable manner by using the two mode switches 2411 and 2412. Alternatively, in either or both of States 3 and 4, the playback processes of 3D video images from the image data may be limited to those in the 2-plane mode. Furthermore, when there is no need to dynamically switch between the offset mode and the 2-plane mode during a playback process of 3D video images, each of States 3 and 4 may be divided into two states that are separately specialized in the two modes. For example, the states in which the original setting in State 3 is kept but the playback processes of 3D video images from image data are fixed to those in the offset mode and the 2-plane mode may be redefined as States 3 and 5, respectively. In this case, the number of types of image playback state values increases to six. Furthermore, the switching between the offset mode and the 2-plane mode can be realized only by switching between titles.

(4) In States 3 and 4, the addition unit 1807 switches between the offset mode and the 2-plane mode in accordance with an instruction from the BD-J module 1745. For the instruction, the register 1746A in the AV playback library 1746 may be used as follows. First, a flag is set in the register 1746A. Next, the BD-J module 1745 turns off and on the flag when specifying the offset mode and the 2-plane mode, respectively. On the other hand, the addition unit 1807 operates in the offset mode when the flag is off, and operates in the 2-plane mode when the flag is on.

(5) When switching from the offset mode to the 2-plane mode, the BD-J module 1745 may cause the rendering engine 1805 to copy a left-view image plane into a right-view image plane in advance. Thereby, even if no data is written into the right-view image plane due to a malfunction, no substantial difference is generated between the graphics images played back from the two planes. This prevents the graphics images from bringing a sense of discomfort to viewers. Note that the left-view image plane may be cleared, instead of copying the left-view image plane into the right-view image plane.

(6) In Embodiment 1 of the present invention, the playback processes of 3D video images from a BG plane and a PG plane are both performed in the offset mode. Not limited to this, application programs may cause the BD-J module 1745 to generate both left-view BG plane and right-view BG plane so that the playback process of 3D video images from the BG planes can be performed in the 2-plane mode. Also, both left-view PG plane and right-view PG plane may be multiplexed into an AV stream file so that the playback process of 3D video images from the PG planes can be performed in the 2-plane mode. These further improve the stereoscopic effects of graphics images of background and subtitles.

(7) At start-up immediately after power-on or the like, allocation in the image memory has not yet been determined. In this case, the BD-J module 1745, in the process for switching between states of the playback device 110, may skip Steps S2502 to S2504 among the steps shown in FIG. 25.

(8) The capacity of the cache area for BD-Live in State 3 is limited to an amount smaller than that in States 1 and 2. Accordingly, when switching from State 1 or 2 to State 3 is required by switching between titles, the BD-J module 1745 may cause the display device 120 to display a warning screen thereon before the switching. This enables the playback device 110 to previously warn viewers of a risk of slowing down the response of the BD-Live processes.

Embodiment 2

A playback device in Embodiment 2 of the present invention, in a playback process of 3D video images enables application programs to select the HDMV mode or the BD-J mode depending on embedded memory resources Except for the structure and function, the playback device in Embodiment 2 has structures and functions similar to those of the playback device in Embodiment 1. Accordingly, modified and extended components of the playback device in Embodiment 2 with respect to the playback device in Embodiment 1 will be explained below. A description of the components of the playback device in Embodiment 2 similar to those of the playback device in Embodiment 1 can be found above in the explanation about Embodiment 1.

The playback device in Embodiment 2 is classified as either of two types, namely, a lower-cost version and a normal version, depending on the size of the embedded memory resources. A "lower-cost-version of playback device" refers to a playback device equipped with smaller memory resources and thus can execute the playback process of 3D video images only in the HDMV mode. In the HDMV mode, in contrast to the BD-J mode, 3D video images can be played back from only the bodies of the contents recorded on the recording medium 100, but the graphics images of interactive contents such as pop-up menus cannot be played back. A "normal version of playback device" refers to a playback device equipped with sufficiently large memory resources and thus can execute the playback process of 3D video images in both the HDMV mode and the BD-J mode. The BD-J module 1745 can notify application programs whether the playback device in which the BD-J module 1745 is incorporated is the lower-cost version or the normal version, the application programs being read from the recording medium 100 at the switching between titles.

Figure 26:
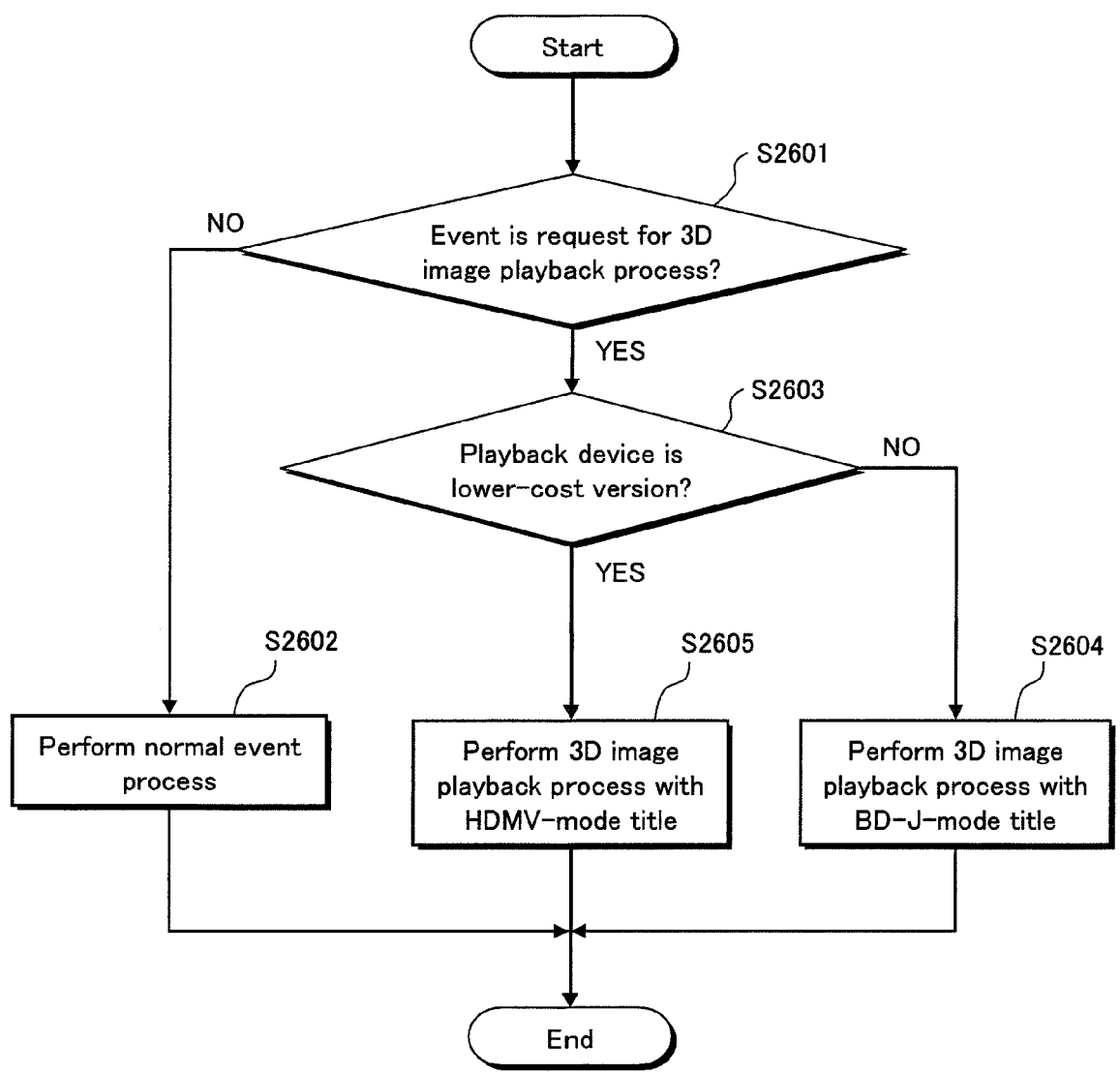
FIG. 26 is a flowchart of an event process performed by the application program in the playback device of Embodiment 2 of the present invention.

FIG. 26 is a flowchart of an event handling performed by an application program. This event handling is started when the user operation detection module 1702 receives a notification from the operation unit 1620.

Step S2601: the user operation detection module 1702 determines the type of the event indicated by the notification from the operation unit 1620, and then sends an operation signal indicating the type of the event to the mode management module 1743. In the mode management module 1743, the dispatcher 1743A passes the operation signal to the BD-J module 1745. The BD-J module 1745 interprets the operation signal and notifies the application program of the meaning of the operation signal. The application program judges whether or not the meaning of the operation signal indicates a request for a 3D image playback process. When the judgment is negative, the process proceeds to Step S2602; and when the judgment is affirmative, the process proceeds to Step S2603.

Step S2602: the user operation does not indicate any request for 3D image playback process, and accordingly the application program performs a normal event handling.

Step S2603: the user operation indicates a request for a 3D image playback process, and accordingly the application program inquires of the BD-J module 1745 whether or not the playback device is the lower-cost version. When the answer to the inquiry is negative, the process proceeds to Step S2604; and when the answer is affirmative, the process proceeds to Step S2605.

Step S2604: the playback device is the normal version, and accordingly the 3D image playback process can be executed in the BD-J mode. Hence, the application program starts the 3D image playback process in the BD-J mode.

Step S2605: the playback device is the lower-cost version, and accordingly the 3D image playback process can be executed only in the HDMV mode. Hence, the application program causes the BD-J module 1745 to switch from the title for the BD-J mode to another title for the HDMV mode. With the switching between the titles, the module to execute the playback process changes from the BD-J module 1745 to the HDMV module 1744. In the example shown in FIG. 3, the 2D image playback process executed in accordance with the first BD-J object BDJO-2D assigned to the "title 2" is changed to the 3D image playback process executed in accordance with the second movie object MVO-3D assigned to the "title 3". When the 3D image playback process ends, the title to be processed is changed back to the original title for BD-J mode, and the module to execute the playback process changes back from the HDMV module 1744 to the BD-J module 1745.

As described above, the playback device in Embodiment 2 of the present invention, regardless of whether it is the lower-cost version or the regular version, enables the application programs read from the recording medium 100 to execute the 3D-image playback processes reliably. This can reduce the loads on the authoring of the application programs.

<Supplementary Notes>
<<File System of BD-ROM Disc>>

When UDF is used as the file system of the BD-ROM disc 100, the volume area 122 shown in FIG. 2 includes a directory area, a recording area for a file set descriptor, and a recording area for a terminating descriptor. The "directory area" is ordinarily a plurality of areas, each of which is a recording area for data constituting a single directory. The "file set descriptor" indicates a logical block number (LBN) of a sector that stores the file entry of the root directory. The "terminating descriptor" indicates the termination of the file set descriptor.

Each directory area shares a common data structure. In particular, each directory area has a file entry, a directory file, and recording areas for each subordinate file.

The "file entry" includes a descriptor tag, an ICB tag, and an allocation descriptor. The "descriptor tag" indicates that the data that includes the descriptor tag is the file entry. For example, when a descriptor tag has a value of "261," that data is a file entry. The "ICB tag" indicates attribute information of the file entry itself. The "allocation descriptor" indicates the LBN of the sector in which the directory file belonging to the same directory area is recorded.

The "directory file" includes the file identification descriptor of a subordinate directory and the file identification descriptor of a subordinate file. The "file identification descriptor of a subordinate directory" is reference information used for accessing the subordinate directory located immediately below the directory recorded in the directory area. In particular, this file identification descriptor includes identification information of the subordinate directory, the length of the directory name, a file entry address, and the actual directory name. Here, the file entry address indicates the LBN of the sector on which the file entry of the subordinate directory is recorded. The "file identification descriptor of a subordinate file" is reference information for accessing the subordinate file located immediately below the directory recorded in the directory area. This file identification descriptor includes identification information of the subordinate file, the length of the file name, a file entry address, and the actual file name. Here, the file entry address indicates the LBN of the file entry of the subordinate file. By tracing the file identification descriptors of subordinate directories/files, the file entries of the subordinate directories/files can be sequentially found, starting from the file entry of the root directory.

The "subordinate file" includes the file entry and the body of the subordinate file located immediately below the directory recorded on the directory area. The "file entry" includes a descriptor tag, an ICB tag, and allocation descriptors. The "descriptor tag" indicates that the data that includes the descriptor tag is a file entry. The "ICB tag" indicates attribute information of the file entry itself. The "allocation descriptors" indicate the arrangement of the Extents constituting the body of the subordinate file. Here, "Extent" refers to a data sequence in which logical addresses are continuous. Each allocation descriptor is assigned to one of the Extents. Therefore, when the subordinate file is divided into a plurality of Extents, the file entry includes a plurality of allocation descriptors. More specifically, each allocation descriptor includes the size of an Extent and an LBN. Furthermore, the two most significant bits of each allocation descriptor indicate whether an Extent is actually recorded at the sector for that LBN. More specifically, when the two most significant bits indicate "0," an Extent has been allocated to the sector and has been actually recorded therein. When the two most significant bits indicate "1," an Extent has been allocated to the sector but has not been yet recorded therein. The logical addresses of the extents constituting each file can be found by referencing the allocation descriptors of the file entry of the file.

Like the above-described file system employing the UDF, when each file recorded on the volume area 122 is divided into a plurality of Extents, the file system for the volume area 122 also generally stores the information showing the locations of the Extents, as with the above-mentioned allocation descriptors, in the volume area 122. By referencing the information, the location of each Extent, particularly the logical address thereof, can be found.

<<Data Distribution Via Broadcasting or Communication Circuit>>

The recording medium according to Embodiment 1 of the present invention may be, in addition to an optical disc, a general removable medium available as a package medium, such as a portable semiconductor memory device including an SD memory card. Also, the embodiments describe an example of an optical disc in which data has been recorded beforehand, namely, a conventionally available read-only optical disc such as a BD-ROM or a DVD-ROM. However, the embodiments of the present invention are not limited to these. For example, when a terminal device writes a 3D video image content that has been distributed via broadcasting or a network into a conventionally available rewritable optical disc such as a BD-RE or a DVD-RAM, arrangement of the Extents according to the above-described embodiments may be used. Here, the terminal device may be incorporated in a playback device, or may be a device different from the playback device.

<<Playback of Semiconductor Memory Card>>

The following describes a data read unit of a playback device in the case where a semiconductor memory card is used, instead of the optical disc, as the recording medium in the embodiments of the present invention.

A part of the playback device that reads data from an optical disc is composed of an optical disc drive, for example. Compared with this, a part of the playback device that reads data from a semiconductor memory card is composed of a dedicated interface. In more detail, the playback device is provided with a card slot, and the dedicated interface is implemented in the card slot. When the semiconductor memory card is inserted into the card slot, the semiconductor memory card is electrically connected with the playback device via the dedicated interface. Furthermore, the data is read from the semiconductor memory card to the playback device via the dedicated interface.

<<Copyright Protection Technique for Data Recorded on BD-ROM Disc>>

Here, the mechanism for protecting copyright of data recorded on a BD-ROM disc is described as an assumption for the supplementary explanation that follows it.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decrypted in the following manner.

A device key, which is part of data necessary for generating a "key" to be used for decrypting the encrypted data recorded on the BD-ROM disc, is recorded in the playback device beforehand. On the other hand, an MKB (Media Key Block) and encrypted data of the "key" itself, namely, an encrypted title key are recorded on the BD-ROM disc, where the MKB is another part of the data necessary for generating the "key". The device key, the MKB, and the encrypted title key are associated with one another, and each are further associated with a volume ID which is an identifier written in a BCA 201 recorded on the BD-ROM disc 100 shown in FIG. 2. When the combination of the device key, the MKB, the encrypted title key, and the volume ID is not correct, the encrypted data cannot be decrypted. In other words, only when the combination is correct, the above-mentioned "key," namely the title key, can be generated. Specifically, the encrypted title key is first decrypted using the device key, the MKB, and the volume ID. Only when the title key can be obtained as a result of the decryption, the encrypted data can be decrypted using the title key as the above-mentioned "key."

When a playback device tries to play back the encrypted data recorded on the BD-ROM disc, the playback device cannot play back the encrypted data unless the playback device stores a device key that is associated beforehand with the encrypted title key, the MKB, the device, and the volume ID recorded on the BD-ROM disc. This is because a key necessary for decrypting the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded onto the BD-ROM disc. Only a playback device storing the device key to be used for generating the above-mentioned key can decrypt the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable/rewritable semiconductor memory device, in particular to a portable semiconductor memory card such as an SD card.

<<Recording Data on Recording Medium Through Electronic Distribution>>

The following describes processing of transmitting data such as an AV stream file for 3D video images (hereinafter, "distribution data") to the playback device according to the embodiments of the present invention via electronic distribution, and causing the playback device to record the distribution data on a semiconductor memory card. Note that the following operations may be performed by a terminal device specialized for performing the processing instead of the above-mentioned playback device. Also, the following description is based on the assumption that the semiconductor memory card onto which the date is written is an SD memory card.

The playback device includes the above-described card slot. An SD memory card is inserted in the card slot. The playback device in this state first transmits a transmission request of distribution data to a distribution server on a network. Here, the playback device reads identification information of the SD memory card from the SD memory card, and transmits the read identification information to the distribution server together with the transmission request. The identification information of the SD memory card is, for example, an identification number unique to the SD memory card. More specifically, it is a serial number of the SD memory card. The identification information is used as the above-described volume ID.

The distribution server stores pieces of distribution data. Distribution data that needs to be protected by encryption such as a video stream and/or an audio stream has been encrypted using a predetermined title key. Here, the encrypted distribution data can be decrypted using the same title key.

The distribution server stores a device key as a private key common with the playback device. The distribution server further stores an MKB in common with the SD memory card. Upon receiving the transmission request of distribution data and the identification information of the SD memory card from the playback device, the distribution server first generates a key from the device key, the MKB, and the identification information, and encrypts the title key using the generated key to generate an encrypted title key.

Next, the distribution server generates public key information. The public key information includes, for example, the MKB, the encrypted title key, signature information, the identification number of the SD memory card, and a device list. The signature information includes, for example, a hash value of the public key information. The device list is a list of devices that need to be invalidated, namely, devices that have risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information, and records the received distribution data and public key information onto the SD memory card via the dedicated interface provided in the card slot.

Encrypted distribution data among the distribution data recorded on the SD memory card is decrypted using the public key information in the following manner, for example. First, the following three types of checks (1) to (3) are performed as authentication of the public key information. These checks may be performed in any order.

(1) A check is performed on whether the identification information of the SD memory card included in the public key information matches the identification number stored in the SD memory card inserted in the card slot.

(2) A check is performed on whether a hash value calculated based on the public key information matches the hash value included in the signature information.

(3) A check is performed on whether the playback device is excluded from the device list indicated by the public key information, and specifically, whether the device key of the playback device is excluded from the device list.

If at least any one of the results of the checks (1) to (3) is in the negative, the playback device stops decryption processing of the encrypted data. Conversely, if all of the results of the checks (1) to (3) are in the affirmative, the playback device authorizes the public key information, and decrypts the encrypted title key included in the public key information using the device key, the MKB, and the identification information of the SD memory card, thereby to obtain a title key. The playback device further decrypts the encrypted data using the title key, thereby to obtain a video stream and/or an audio stream, for example.

The afore-mentioned mechanism has the following advantage. If a playback device, compositional elements, and a function (program) that have risk of being in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to easily realize an illegal copy of the SD memory card. In other words, if the tampering allows generation of a plurality of semiconductor memory cards having the same identification information, it is impossible to identify between authorized products and unauthorized copy products by performing the above-described check (1). Therefore, it is necessary to record the identification information of the semiconductor memory card on a recording area with high confidentiality in order to protect the identification information from being tampered with in an unauthorized manner.

The recording area with high confidentiality is, for example, structured within the semiconductor memory card in the following manner. First, as a recording area electrically disconnected from a recording area for recording normal data (hereinafter, "first recording area"), another recording area (hereinafter, "second recording area") is provided. Next, a control circuit dedicated for accessing the second recording area is provided within the semiconductor memory card. As a result, access to the second recording area can be performed only via the control circuit. For example, only encrypted data is recorded on the second recording area and a circuit for decrypting the encrypted data is incorporated only within the control circuit. Then, access to the data recorded on the second recording area can be performed only by causing the control circuit to record an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, an application program operating on the playback device acquires data from the distribution server via electronic distribution and records the acquired data in the semiconductor memory card, the following processing is performed. First, the application program issues an access request to the control circuit via the memory card interface for accessing the identification information of the semiconductor memory card recorded on the second recording area. In response to the access request, the control circuit first reads the identification information from the second recording area. Then, the control circuit transmits the identification information to the application program via the memory card interface. The application program transmits a transmission request of the distribution data together with the identification information. The application program further records, in the first recording area of the semiconductor memory card via the memory card interface, the public key information and the distribution data received from the distribution server in response to the transmission request.

Note that the above-described application program desirably checks whether the application program itself has been tampered with, before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

The embodiments of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file in a rewritable recording medium such as a BD-RE disc, a BD-R disc, a hard disk, or a semiconductor memory card (hereinafter, "BD-RE disc or the like"), and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. Here, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file onto the BD-RE disc or the like.

<<Managed Copy>>

The playback device according to the embodiments of the present invention may write a digital stream recorded on the BD-ROM disc 100 on another recording medium via a managed copy. Here, managed copy refers to a technique for permitting copy of a digital stream, a playlist file, a clip information file, and an application program from a read-only recording medium such as a BD-ROM disc to a rewritable recording medium only in the case where authentication with the server via communication succeeds. Here, the rewritable recording medium may be a rewritable optical disc such as a BD-R, a BD-RE, a DVD-R, a DVD-RW, and a DVD-RAM, and a portable semiconductor memory device such as a hard disk, an SD memory card, a Memory Stick™, a Compact Flash™, a Smart Media™, and a Multimedia Card™. A managed copy allows for limitation of the number of backups of data recorded on a read-only recording medium and for charging for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. Here, a "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in the embodiments of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in the embodiments is described using a high level programming language. Accordingly, the data structure is converted by a computer into a computer readable code via the translation process performed by a compiler, which includes "syntax analysis," "optimization," "resource allocation," and "code generation," and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<<Management of Playlist File and Clip Information File by Playback Program>>

When a playlist file and an AV stream file are recorded onto a recording medium, a playback program is recorded onto the recording medium in an executable format. The playback program makes the computer play back the AV stream file in accordance with the playlist file. The playback program is loaded from a recording medium to a memory device of a computer and is then executed by the computer. The loading process includes a compile process or link process. By these processes, the playback program is divided into a plurality of sections in the memory device. The sections include a text section, a data section, a bss section, and a stack section. The text section includes a code array of the playback program, an initial value, and non-rewritable data. The data section includes variables with initial values and rewritable data. In particular, the data section includes a file, recorded on the recording device, that can be accessed at any time. The bss section includes variables having no initial value. The data included in the bss section is referenced in accordance with commands indicated by the code in the text section. During the compile process or link process, an area for the bss section is ensured in the computer's internal RAM. The stack section is a memory area temporarily ensured as necessary. During each of the processes by the playback program, local variables are temporarily used. The stack section includes these local variables. When the program is executed, the variables in the bss section are initially set at zero, and the necessary memory area is ensured in the stack section.

As described above, the playlist file and the clip information file are already converted on the recording medium into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

<<System LSI>>

A playback device according to the embodiments of the present invention includes middleware, a system LSI, and hardware other than the system LSI. The playback device further includes an interface for the middleware, an interface between the middleware and the system LSI, an interface between the middleware and other hardware, and a user interface. When these elements are incorporated in a playback device, they operate in cooperation with one another. As a result, each element provides the playback device with a unique function. By appropriately defining the interface for the middleware and the interface between the middleware and the system LSI, it is possible to develop the user interface, middleware, and system LSI in the playback device independently, in parallel, and efficiently. Note that in each interface, there is generally a variety of such appropriate definitions.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device comprising:
a reading unit operable to read an application program, image data, a video stream, and an application management file from a recording medium;
a virtual machine unit operable to execute the application program; a memory unit including an image data area for storing the image data;
a playback unit operable to play back video data with use of the image data and the video stream in accordance with the application program;
a management unit operable to, in accordance with the application management file, instruct the virtual machine unit to start and terminate the application program, and instruct the memory unit to change the image data area, the management unit further operable to cause the virtual machine unit to forcibly terminate the application program before instructing the memory unit to change the image data area even when the application management file specifies the continuous execution of the application program;
the playback device further comprising a network interface unit operable to download data of a browser screen from a server device on an external network, wherein the playback unit is operable in a live playback mode to synthesize the browser screen with a video image played back from the recording medium, and the changing of the image data area includes one of allocating a cache area in the image data area and freeing the cache area from the image data area, the cache area being for temporarily storing data of a current browser screen and a previous browser screen;
wherein, when the image data includes left-view image data and right-view image data for a 3D menu, the changing of the image data area includes freeing the cache area from the image data area and using a free area available by freeing the cache area to store the left-view image data and the right-view image data; and
wherein the management unit, in accordance with the application program, accepts from a user an instruction specifying whether or not the 3D menu should be played back, causes the virtual machine unit to check a capacity of the memory unit when the instruction specifies that the 3D menu should be played back, provides the memory unit with an instruction when the capacity of the memory unit is larger than a predetermined threshold value, the instruction being to free the cache area and use the free area to store the left-view image data and the right-view image data, and disables playback of the 3D menu when the capacity of the memory unit is smaller than the predetermined threshold value.

2. The playback device of claim 1 further comprising:
an image decoder operable to expand the image data into the image data area; and
a rendering engine operable to perform a calculation for a graphics process on the image data, wherein
the management unit, in accordance with the application management file, instructs the image decoder to expand the image data, and instructs the rendering engine to perform the calculation.

3. The playback device of claim 1, wherein,
after the recording medium is removed from the reading unit, when the reading unit detects an insertion of a new recording medium while the virtual machine unit continues to execute the application program, the management unit causes the reading unit to read a new application management file from the new recording medium, and instructs the memory unit to change the image data area in accordance with the new application management file.

4. A playback method comprising the steps of:
reading an application program, image data, a video stream, and an application management file from a recording medium;
executing the application program;
storing the image data into an image data area in a memory unit;
playing back video data with use of the image data and the video stream in accordance with the application program;
forcibly terminating the application program even when the application management file specifies the continuous execution of the application program; and
changing the image data area after the termination of the application program;
the playback device further comprising a network interface unit operable to download data of a browser screen from a server device on an external network, wherein the playback unit is operable in a live playback mode to synthesize the browser screen with a video image played back from the recording medium, and the changing of the image data area includes one of allocating a cache area in the image data area and freeing the cache area from the image data area, the cache area being for temporarily storing data of a current browser screen and a previous browser screen;
wherein, when the image data includes left-view image data and right-view image data for a 3D menu, the changing of the image data area includes freeing the cache area from the image data area and using a free area available by freeing the cache area to store the left-view image data and the right-view image data; and
wherein the management unit, in accordance with the application program, accepts from a user an instruction specifying whether or not the 3D menu should be played back, causes the virtual machine unit to check a capacity of the memory unit when the instruction specifies that the 3D menu should be played back, provides the memory unit with an instruction when the capacity of the memory unit is larger than a predetermined threshold value, the instruction being to free the cache area and use the free area to store the left-view image data and the right-view image data, and disables playback of the 3D menu when the capacity of the memory unit is smaller than the predetermined threshold value.

5. A non-transitory computer readable medium including a program for causing a playback device to execute the steps of:
- reading an application program, image data, a video stream, and an application management file from a recording medium;
- executing the application program;
- storing the image data into an image data area in a memory unit;
- playing back video data with use of the image data and the video stream in accordance with the application program;
- forcibly terminating the application program even when the application management file specifies the continuous execution of the application program; and
- changing the image data area after the termination of the application program;
- the playback device further comprising a network interface unit operable to download data of a browser screen from a server device on an external network, wherein the playback unit is operable in a live playback mode to synthesize the browser screen with a video image played back from the recording medium, and the changing of the image data area includes one of allocating a cache area in the image data area and freeing the cache area from the image data area, the cache area being for temporarily storing data of a current browser screen and a previous browser screen;
- wherein, when the image data includes left-view image data and right-view image data for a 3D menu, the changing of the image data area includes freeing the cache area from the image data area and using a free area available by freeing the cache area to store the left-view image data and the right-view image data; and
- wherein the management unit, in accordance with the application program, accepts from a user an instruction specifying whether or not the 3D menu should be played back, causes the virtual machine unit to check a capacity of the memory unit when the instruction specifies that the 3D menu should be played back, provides the memory unit with an instruction when the capacity of the memory unit is larger than a predetermined threshold value, the instruction being to free the cache area and use the free area to store the left-view image data and the right-view image data, and disables playback of the 3D menu when the capacity of the memory unit is smaller than the predetermined threshold value.

6. An integrated circuit implemented in a playback device, the playback device including:
- a reading unit operable to read an application program, image data, a video stream, and
- an application management file from a recording medium; and
- a playback unit operable to play back video data with use of the image data and the video stream, the integrated circuit comprising:
- a virtual machine unit operable to execute the application program read by the reading unit from the recording medium;
- a memory unit including an image data area for storing the image data; and
- a management unit operable to refer to the application management file read by the reading unit from the recording medium, and in accordance with the application management file, instruct the virtual machine unit to start and terminate the application program and instruct the memory unit to change the image data area, the management unit further operable to cause the virtual machine unit to forcibly terminate the application program before instructing the memory unit to change the image data area even when the application management file specifies the continuous execution of the application program;
- the playback device further comprising a network interface unit operable to download data of a browser screen from a server device on an external network, wherein the playback unit is operable in a live playback mode to synthesize the browser screen with a video image played back from the recording medium, and the changing of the image data area includes one of allocating a cache area in the image data area and freeing the cache area from the image data area, the cache area being for temporarily storing data of a current browser screen and a previous browser screen;
- wherein, when the image data includes left-view image data and right-view image data for a 3D menu, the changing of the image data area includes freeing the cache area from the image data area and using a free area available by freeing the cache area to store the left-view image data and the right-view image data; and
- wherein the management unit, in accordance with the application program, accepts from a user an instruction specifying whether or not the 3D menu should be played back, causes the virtual machine unit to check a capacity of the memory unit when the instruction specifies that the 3D menu should be played back, provides the memory unit with an instruction when the capacity of the memory unit is larger than a predetermined threshold value, the instruction being to free the cache area and use the free area to store the left-view image data and the right-view image data, and disables playback of the 3D menu when the capacity of the memory unit is smaller than the predetermined threshold value.

* * * * *